(12) United States Patent
Cameron et al.

(10) Patent No.: US 9,888,724 B2
(45) Date of Patent: Feb. 13, 2018

(54) ELECTRONIC VAPOR DEVICE WITH INTEGRATED AUDIO

(71) Applicant: Lunatech, LLC, Encino, CA (US)

(72) Inventors: John Cameron, Encino, CA (US); Dean Becker, Fairhope, AL (US); Gene Fein, Oxnard, CA (US)

(73) Assignee: LUNATECH, LLC, Encino, CA (US)

( * ) Notice: Subject to any disclaimer, the term of this patent is extended or adjusted under 35 U.S.C. 154(b) by 12 days.

(21) Appl. No.: 15/215,176

(22) Filed: Jul. 20, 2016

(65) Prior Publication Data
US 2017/0020196 A1    Jan. 26, 2017

Related U.S. Application Data

(60) Provisional application No. 62/195,489, filed on Jul. 22, 2015.

(51) Int. Cl.
| | | |
|---|---|---|
| *A24F 11/00* | (2006.01) |
| *A24F 47/00* | (2006.01) |
| *G06F 3/16* | (2006.01) |
| *H05B 37/02* | (2006.01) |
| *H05B 33/08* | (2006.01) |

(52) U.S. Cl.
CPC ........... *A24F 47/008* (2013.01); *G06F 3/162* (2013.01); *G06F 3/165* (2013.01); *H05B 33/0842* (2013.01); *H05B 37/0227* (2013.01)

(58) Field of Classification Search
CPC .... A24F 47/008; A24F 47/002; G06F 13/162; G06F 13/165; H05B 37/0227; H05B 33/0842
USPC .................................................. 131/328, 329
See application file for complete search history.

(56) References Cited

U.S. PATENT DOCUMENTS

| | | | |
|---|---|---|---|
| 8,757,147 B2 | 6/2014 | Terry et al. | |
| 8,820,330 B2 | 9/2014 | Bellinger | |
| 8,851,083 B2 | 10/2014 | Oglesby et al. | |
| 8,955,522 B1 | 2/2015 | Bowen et al. | |
| 9,155,337 B2 * | 10/2015 | Duncan ................. | A24F 47/004 |
| 9,220,302 B2 * | 12/2015 | DePiano ............... | A24F 47/008 |
| 9,408,416 B2 | 8/2016 | Monsees et al. | |
| 9,462,832 B2 * | 10/2016 | Lord ..................... | A24F 47/008 |
| 9,498,002 B1 | 11/2016 | Soreide | |
| 9,585,981 B2 | 3/2017 | Wynalda, Jr. | |
| 2014/0157583 A1 * | 6/2014 | Ward ...................... | H05B 3/00 |
| | | | 29/611 |
| 2015/0128966 A1 * | 5/2015 | Lord ..................... | A24F 47/008 |
| | | | 131/328 |
| 2015/0237917 A1 * | 8/2015 | Lord ..................... | A24F 47/008 |
| | | | 131/328 |
| 2015/0327596 A1 * | 11/2015 | Alarcon ................ | A24F 47/008 |
| | | | 131/328 |
| 2017/0231284 A1 * | 8/2017 | Newns .................. | A24F 47/008 |
| | | | 131/328 |

* cited by examiner

*Primary Examiner* — Hae Moon Hyeon
(74) *Attorney, Agent, or Firm* — Hankin Patent Law, APC; Susan L. McCain; Sergio Becerra

(57) ABSTRACT

A method is disclosed comprising receiving a status of a vaporizer component of an electronic vapor device, determining a first audio file of a plurality of audio files based on the status, determining a first characteristic based on the status, and causing an audio output device to output the first audio file according to the first characteristic.

19 Claims, 28 Drawing Sheets

ELECTRONIC VAPOR DEVICE WITH INTEGRATED AUDIO

CROSS REFERENCE TO RELATED PATENT APPLICATION

This application claims priority to U.S. Provisional Application No. 62/195,489 filed Jul. 22, 2015, here incorporated by reference in its entirety.

BACKGROUND

Various types of personal vaporizers have been known in the art for many years. In general, such vaporizers are characterized by heating a solid to a smoldering point, vaporizing a liquid by heat, or nebulizing a liquid by heat and/or by expansion through a nozzle. Such devices are designed to release aromatic materials in the solid or liquid while avoiding high temperatures of combustion and associated formation of tars, carbon monoxide, or other harmful byproducts. Preferably, the device releases a very fine mist with a mouth feel similar to smoke, under suction. Thus, a vaporizing device can be made to mimic traditional smoking articles such as cigarettes, cigars, pipes and hookahs in certain aspects, while avoiding significant adverse health effects of traditional tobacco or other herbal consumption.

While the inhalable vapor or mist from a vaporizer mimics these traditional smoking articles, current personal vaporizers do not simulate other aspects of the smoking experience. For example, when smoking a traditional cigarette, the burning ember at the end of the cigarette releases smoke that changes in intensity as the cigarette is being drawn, as the draw is stopped, and as the time since the previous draw increases. This burning ember of the cigarette also emits a sound and emits a glow that each vary based on whether the cigarette is being drawn and the length of time since the previous draw.

It would be desirable, therefore, to develop new technologies for simulating traditional smoking articles that overcomes these and other limitations of the prior art.

SUMMARY

It is to be understood that both the following general description and the following detailed description are exemplary and explanatory only and are not restrictive. In an aspect, an apparatus is disclosed comprising a first vapor outlet, a container for storing a vaporizable material, a vaporizer component coupled to the container, configured for vaporizing the vaporizable material to generate a vapor and for providing the vapor to the first vapor outlet, a sensor coupled to the container for sensing a status of the vaporizer component, a memory, configured for storing a plurality of audio files, an audio output device, configured for outputting one or more of the plurality of audio files, and a processor, configured for, receiving the status of the vaporizer component, determining a first audio file of the plurality of audio files based on the status, determining a first characteristic based on the status, and causing the audio output device to output the first audio file according to the first characteristic.

In an aspect, a method is disclosed comprising receiving a status of a vaporizer component of an electronic vapor device, determining a first audio file of a plurality of audio files based on the status, determining a first characteristic based on the status, and causing an audio output device to output the first audio file according to the first characteristic.

Additional advantages will be set forth in part in the description which follows or can be learned by practice. The advantages will be realized and attained by means of the elements and combinations particularly pointed out in the appended claims. It is to be understood that both the foregoing general description and the following detailed description are exemplary and explanatory only and are not restrictive.

BRIEF DESCRIPTION OF THE DRAWINGS

The features, nature, and advantages of the present disclosure will become more apparent from the detailed description set forth below when taken in conjunction with the drawings, in which like reference characters are used to identify like elements correspondingly throughout the specification and drawings.

DETAILED DESCRIPTION

Figure 1:
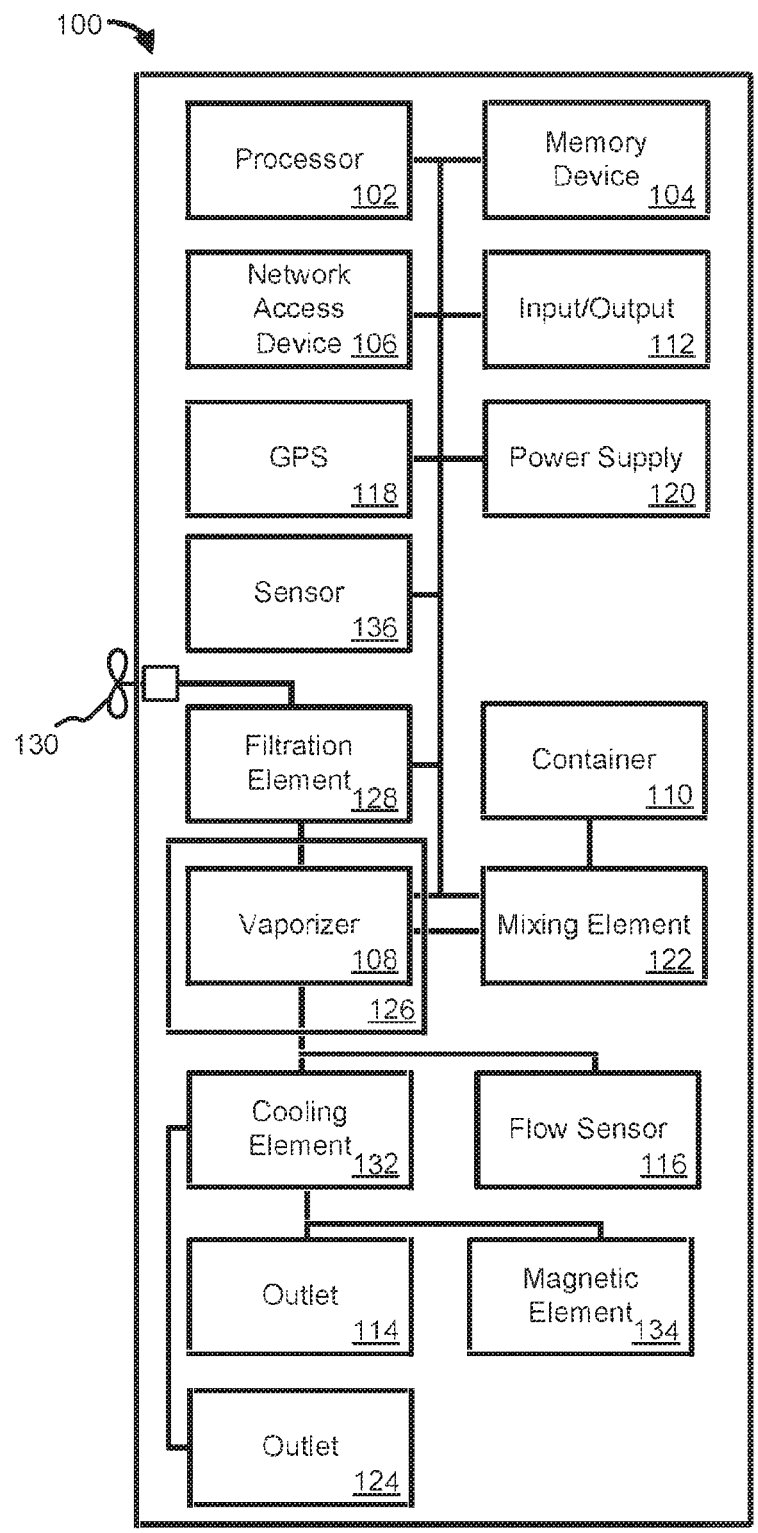
FIG. 1 illustrates a block diagram of an exemplary electronic vapor device.

Before the present methods and systems are disclosed and described, it is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges can be expressed herein as from "about" one particular value, and/or to "about" another particular value. When such a range is expressed, another embodiment includes—the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems can be understood more readily by reference to the following detailed description of preferred embodiments and the examples included therein and to the Figures and their previous and following description.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, compact discs-read only memory (CD-ROMs), optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions can be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

Various aspects are now described with reference to the drawings. In the following description, for purposes of explanation, numerous specific details are set forth in order to provide a thorough understanding of one or more aspects. It can be evident, however, that the various aspects can be practiced without these specific details. In other instances, well-known structures and devices are shown in block diagram form in order to facilitate describing these aspects.

While embodiments of the disclosure are directed to vaporizing devices, it should be appreciated that aspects of the technology can be adapted by one of ordinary skill to nebulizing devices designed to produce an inhalable mist or aerosol.

The present disclosure relates to a vaporizing or nebulizing device, such as an electronic device, that is designed to simulate light, heat and sound of a traditional smoking article.

In an aspect of the disclosure, a noise generating vapor device includes a sensor for detecting a current state of the noise generating vapor device and an audio component for outputting audio based on the detected current state of the noise generating vapor device.

In another aspect, a method for use with a noise generating vapor device includes sensing, by a sensor, a current state of the noise generating vapor device. The method also includes outputting, by an audio component, audio based on the detected current state of the noise generating vapor device.

FIG. 1 is a block diagram of an exemplary electronic vapor device 100 as described herein. The electronic vapor device 100 can be, for example, an e-cigarette, an e-cigar, an electronic vapor device, a hybrid electronic communication handset coupled/integrated vapor device, a robotic vapor device, a modified vapor device "mod," a micro-sized electronic vapor device, a robotic vapor device, and the like. The vapor device 100 can comprise any suitable housing for enclosing and protecting the various components disclosed herein. The vapor device 100 can comprise a processor 102. The processor 102 can be, or can comprise, any suitable microprocessor or microcontroller, for example, a low-power application-specific controller (ASIC) and/or a field programmable gate array (FPGA) designed or programmed specifically for the task of controlling a device as described herein, or a general purpose central processing unit (CPU), for example, one based on 80×86 architecture as designed by Intel™ or AMD™, or a system-on-a-chip as designed by ARM™. The processor 102 can be coupled (e.g., communicatively, operatively, etc. . . . ) to auxiliary devices or modules of the vapor device 100 using a bus or other coupling. The vapor device 100 can comprise a power supply 120. The power supply 120 can comprise one or more batteries and/or other power storage device (e.g., capacitor) and/or a port for connecting to an external power supply. For example, an external power supply can supply power to the vapor device 100 and a battery can store at least a portion of the supplied power. The one or more batteries can be rechargeable. The one or more batteries can comprise a lithium-ion battery (including thin film lithium ion batteries), a lithium ion polymer battery, a nickel-cadmium battery, a nickel metal hydride battery, a lead-acid battery, combinations thereof, and the like. In an aspect, the power supply 120 can receive power via a power coupling to a case, wherein the vapor device 100 is stored in the case.

The vapor device 100 can comprise a memory device 104 coupled to the processor 102. The memory device 104 can comprise a random access memory (RAM) configured for storing program instructions and data for execution or processing by the processor 102 during control of the vapor device 100. When the vapor device 100 is powered off or in an inactive state, program instructions and data can be stored in a long-term memory, for example, a non-volatile magnetic optical, or electronic memory storage device (not shown). Either or both of the RAM or the long-term memory can comprise a non-transitory computer-readable medium storing program instructions that, when executed by the processor 102, cause the vapor device 100 to perform all or part of one or more methods and/or operations described herein. Program instructions can be written in any suitable high-level language, for example, C, C++, C# or the Java™, and compiled to produce machine-language code for execution by the processor 102. In an aspect, the memory device 104 can store one or more audio files. The one or more audio files can resemble one or more sounds made by a traditional smoking apparatus when used or when at rest (smoldering) such as a cigar, a cigarette, a joint, a bong, and the like.

In an aspect, the vapor device 100 can comprise a network access device 106 allowing the vapor device 100 to be coupled to one or more ancillary devices (not shown) such as via an access point (not shown) of a wireless telephone network, local area network, or other coupling to a wide area network, for example, the Internet. In that regard, the processor 102 can be configured to share data with the one or more ancillary devices via the network access device 106. The shared data can comprise, for example, usage data and/or operational data of the vapor device 100, a status of the vapor device 100, a status and/or operating condition of one or more the components of the vapor device 100, text to be used in a message, a product order, payment information, and/or any other data. Similarly, the processor 102 can be configured to receive control instructions from the one or more ancillary devices via the network access device 106. For example, a configuration of the vapor device 100, an operation of the vapor device 100, and/or other settings of the vapor device 100, can be controlled by the one or more ancillary devices via the network access device 106. For example, an ancillary device can comprise a server that can provide various services and another ancillary device can comprise a smartphone for controlling operation of the vapor device 100. In some aspects, the smartphone or another ancillary device can be used as a primary input/output of the vapor device 100 such that data is received by the vapor device 100 from the server, transmitted to the smartphone, and output on a display of the smartphone. In an aspect, data transmitted to the ancillary device can comprise a mixture of vaporizable material and/or instructions to release vapor. For example, the vapor device 100 can be configured to determine a need for the release of vapor into the atmosphere. The vapor device 100 can provide instructions via the network access device 106 to an ancillary device (e.g., another vapor device) to release vapor into the atmosphere.

In an aspect, data can be shared anonymously. The data can be shared over a transient data session with an ancillary device. The transient data session can comprise a session limit. The session limit can be based on one or more of a number of puffs, a time limit, and a total quantity of vaporizable material. The data can comprise usage data and/or a usage profile.

In an aspect, the vapor device 100 can also comprise an input/output device 112 coupled to one or more of the processor 102, the vaporizer 108, the network access device 106, and/or any other electronic component of the vapor device 100. Input can be received from a user or another device and/or output can be provided to a user or another device via the input/output device 112. The input/output device 112 can comprise any combinations of input and/or output devices such as buttons, knobs, keyboards, touchscreens, displays, light-emitting elements, a speaker, and/or the like. In an aspect, the input/output device 112 can comprise an interface port (not shown) such as a wired interface, for example a serial port, a Universal Serial Bus (USB) port, an Ethernet port, or other suitable wired connection. The input/output device 112 can comprise a wireless interface (not shown), for example a transceiver using any suitable wireless protocol, for example WiFi (IEEE 802.11), Bluetooth®, infrared, or other wireless standard. For example, the input/output device 112 can communicate with a smartphone via Bluetooth® such that the inputs and outputs of the smartphone can be used by the user to interface with the vapor device 100. In an aspect, the input/output device 112 can comprise a user interface. The user interface user interface can comprise at least one of lighted signal lights, gauges, boxes, forms, check marks, avatars, visual images, graphic designs, lists, active calibrations or calculations, 2D interactive fractal designs, 3D fractal designs, 2D and/or 3D representations of vapor devices and other interface system functions. In an aspect, regardless of whether the vapor device 100 comprises a display, the vapor device 100 can communicate with an authorized electronic device to provide a user interface via the authorized electronic device that controls functionality of the vapor device 100.

In an aspect, the input/output device 112 can be coupled to an adaptor device to receive power and/or send/receive data signals from an electronic device. For example, the input/output device 112 can be configured to receive power from the adaptor device and provide the power to the power supply 120 to recharge one or more batteries. The input/output device 112 can exchange data signals received from the adaptor device with the processor 102 to cause the processor to execute one or more functions.

In an aspect, the input/output device 112 can comprise a touchscreen interface and/or a biometric interface. For example, the input/output device 112 can include controls that allow the user to interact with and input information and commands to the vapor device 100. For example, with respect to the embodiments described herein, the input/output device 112 can comprise a touch screen display. The input/output device 112 can be configured to provide the content of the exemplary screen shots shown herein, which are presented to the user via the functionality of a display. User inputs to the touch screen display are processed by, for example, the input/output device 112 and/or the processor 102. The input/output device 112 can also be configured to process new content and communications to the system 100. The touch screen display can provide controls and menu selections, and process commands and requests. Application and content objects can be provided by the touch screen display. The input/output device 112 and/or the processor 102 can receive and interpret commands and other inputs, interface with the other components of the vapor device 100 as required. In an aspect, the touch screen display can enable a user to lock, unlock, or partially unlock or lock, the vapor device 100. The vapor device 100 can be transitioned from an idle and locked state into an open state by, for example, moving or dragging an icon on the screen of the vapor device 100, entering in a password/passcode, and the like. The input/output device 112 can thus display information to a user such as a puff count, an amount of vaporizable material remaining in the container 110, battery remaining, signal strength, combinations thereof, and the like.

In an aspect, the input/output device 112 can comprise an audio user interface. A microphone can be configured to receive audio signals and relay the audio signals to the input/output device 112. The audio user interface can be any interface that is responsive to voice or other audio commands. The audio user interface can be configured to cause an action, activate a function, etc, by the vapor device 100 (or another device) based on a received voice (or other audio) command. The audio user interface can be deployed directly on the vapor device 100 and/or via other electronic devices (e.g., electronic communication devices such as a smartphone, a smart watch, a tablet, a laptop, a dedicated audio user interface device, and the like). The audio user interface can be used to control the functionality of the vapor device 100. Such functionality can comprise, but is not limited to, custom mixing of vaporizable material (e.g., eLiquids) and/or ordering custom made eLiquid combinations via an eCommerce service (e.g., specifications of a user's custom flavor mix can be transmitted to an eCommerce service, so that an eLiquid provider can mix a custom eLiquid cartridge for the user). The user can then reorder the custom flavor mix anytime or even send it to friends as a present, all via the audio user interface. The user can also send via voice command a mixing recipe to other users. The other users can utilize the mixing recipe (e.g., via an electronic vapor device having multiple chambers for eLiquid) to sample the same mix via an auto-order to the other users' devices to create the received mixing recipe. A custom mix can be given a title by a user and/or can be defined by parts (e.g., one part liquid A and two parts liquid B). The audio user interface can also be utilized to create and send a custom message to other users, to join eVapor clubs, to receive eVapor chart information, and to conduct a wide range of social networking, location services and eCommerce activities. The audio user interface can be secured via a password (e.g., audio password) which features at least one of tone recognition, other voice quality recognition and, in one aspect, can utilize at least one special cadence as part of the audio password.

The input/output device 112 can be configured to interface with other devices, for example, exercise equipment, computing equipment, communications devices and/or other vapor devices, for example, via a physical or wireless connection. The input/output device 112 can thus exchange data with the other equipment. A user may sync their vapor device 100 to other devices, via programming attributes such as mutual dynamic link library (DLL) 'hooks'. This enables a smooth exchange of data between devices, as can a web interface between devices. The input/output device 112 can be used to upload one or more profiles to the other devices. Using exercise equipment as an example, the one or more profiles can comprise data such as workout routine data (e.g., timing, distance, settings, heart rate, etc. . . . ) and vaping data (e.g., eLiquid mixture recipes, supplements, vaping timing, etc. . . . ). Data from usage of previous exercise sessions can be archived and shared with new electronic vapor devices and/or new exercise equipment so that history and preferences may remain continuous and provide for simplified device settings, default settings, and recommended settings based upon the synthesis of current and archival data.

In an aspect, the vapor device 100 can comprise a vaporizer 108. The vaporizer 108 can be coupled to one or more containers 110. Each of the one or more containers 110 can be configured to hold one or more vaporizable or non-vaporizable materials. The vaporizer 108 can receive the one or more vaporizable or non-vaporizable materials from the one or more containers 110 and heat the one or more vaporizable or non-vaporizable materials until the one or more vaporizable or non-vaporizable materials achieve a vapor state. In various embodiments, instead of heating the one or more vaporizable or non-vaporizable materials, the vaporizer 108 can nebulize or otherwise cause the one or more vaporizable or non-vaporizable materials in the one or more containers 110 to reduce in size into particulates. In various embodiments, the one or more containers 110 can comprise a compressed liquid that can be released to the vaporizer 108 via a valve or another mechanism. In various embodiments, the one or more containers 110 can comprise a wick (not shown) through which the one or more vaporizable or non-vaporizable materials is drawn to the vaporizer 108. The one or more containers 110 can be made of any suitable structural material, such as, an organic polymer, metal, ceramic, composite, or glass material. In an aspect, the vaporizable material can comprise one or more of, a Propylene Glycol (PG) based liquid, a Vegetable Glycerin (VG) based liquid, a water based liquid, combinations thereof, and the like. In an aspect, the vaporizable material can comprise Tetrahydrocannabinol (THC), Cannabidiol (CBD), cannabinol (CBN), combinations thereof, and the like. In a further aspect, the vaporizable material can comprise an extract from duboisia hopwoodii.

In an aspect, the vapor device 100 can comprise a mixing element 122. The mixing element 122 can be coupled to the processor 102 to receive one or more control signals. The one or more control signals can instruct the mixing element 122 to withdraw specific amounts of fluid from the one or more containers 110. The mixing element can, in response to a control signal from the processor 102, withdraw select quantities of vaporizable material in order to create a customized mixture of different types of vaporizable material. The liquid withdrawn by the mixing element 122 can be provided to the vaporizer 108.

The vapor device 100 may include a plurality of valves, wherein a respective one of the valves is interposed between the vaporizer 108 and a corresponding one of outlet 114 and/or outlet 124 (e.g., one or more inlets of flexible tubes). Each of the valves may control a flow rate through a respective one of the flexible tubes. For example, each of the plurality of valves may include a lumen of adjustable effective diameter for controlling a rate of vapor flow therethrough. The assembly may include an actuator, for example a motor, configured to independently adjust respective ones of the valves under control of the processor. The actuator may include a handle or the like to permit manual valve adjustment by the user. The motor or actuator can be coupled to a uniform flange or rotating spindle coupled to the valves and configured for controlling the flow of vapor through each of the valves. Each of the valves can be adjusted so that each of the flexible tubes accommodate the same (equal) rate of vapor flow, or different rates of flow. The processor 102 can be configured to determine settings for the respective ones of the valves each based on at least one of: a selected user preference or an amount of suction applied to a corresponding one of the flexible tubes. A user preference can be determined by the processor 102 based on a user input, which can be electrical or mechanical. An electrical input can be provided, for example, by a touchscreen, keypad, switch, or potentiometer (e.g., the input/output 112). A mechanical input can be provided, for example, by applying suction to a mouthpiece of a tube, turning a valve handle, or moving a gate piece.

The vapor device 100 may further include at least one light-emitting element positioned on or near each of the outlet 114 and/or the outlet 124 (e.g., flexible tubes) and configured to illuminate in response to suction applied to the outlet 114 and/or the outlet 124. At least one of an intensity of illumination or a pattern of alternating between an illuminated state and a non-illuminated state can be adjusted based on an amount of suction. One or more of the at least one light-emitting element, or another light-emitting element, may illuminate based on an amount of vaporizable material available. For example, at least one of an intensity of illumination or a pattern of alternating between an illuminated state and a non-illuminated state can be adjusted based on an amount of the vaporizable material within the vapor device 100. In some aspects, the vapor device 100 may include at least two light-emitting elements positioned on each of the outlet 114 and/or the outlet 124. Each of the at least two light-emitting elements may include a first light-emitting element and an outer light-emitting element positioned nearer the end of the outlet 114 and/or the outlet 124 than the first light-emitting element. Illumination of the at least two light-emitting elements may indicate a direction of a flow of vapor.

In an aspect, input from the input/output device 112 can be used by the processor 102 to cause the vaporizer 108 to vaporize the one or more vaporizable or non-vaporizable materials. For example, a user can depress a button, causing the vaporizer 108 to start vaporizing the one or more vaporizable or non-vaporizable materials. A user can then draw on an outlet 114 to inhale the vapor. In various aspects, the processor 102 can control vapor production and flow to the outlet 114 based on data detected by a flow sensor 116. For example, as a user draws on the outlet 114, the flow sensor 116 can detect the resultant pressure and provide a signal to the processor 102. In response, the processor 102 can cause the vaporizer 108 to begin vaporizing the one or more vaporizable or non-vaporizable materials, terminate vaporizing the one or more vaporizable or non-vaporizable materials, and/or otherwise adjust a rate of vaporization of the one or more vaporizable or non-vaporizable materials. In another aspect, the vapor can exit the vapor device 100 through an outlet 124. The outlet 124 differs from the outlet 114 in that the outlet 124 can be configured to distribute the vapor into the local atmosphere, rather than being inhaled by a user. In an aspect, vapor exiting the outlet 124 can be at least one of aromatic, medicinal, recreational, and/or wellness related. In an aspect, the vapor device 100 can comprise any number of outlets. In an aspect, the outlet 114 and/or the outlet 124 can comprise at least one flexible tube. For example, a lumen of the at least one flexible tube can be in fluid communication with one or more components (e.g., a first container) of the vapor device 100 to provide vapor to a user. In more detailed aspects, the at least one flexible tube may include at least two flexible tubes. Accordingly, the vapor device 100 may further include a second container configured to receive a second vaporizable material such that a first flexible tube can receive vapor from the first vaporizable material and a second flexible tube receive vapor from the second vaporizable material. For example, the at least two flexible tubes can be in fluid communication with the first container and with second container. The vapor device 100 may include an electrical or mechanical sensor configured to sense a pressure level, and therefore suction, in an interior of the flexible tube. Application of suction may activate the vapor device 100 and cause vapor to flow.

In another aspect, the vapor device 100 can comprise a piezoelectric dispersing element. In some aspects, the piezoelectric dispersing element can be charged by a battery, and can be driven by a processor on a circuit board. The circuit board can be produced using a polyimide such as Kapton, or other suitable material. The piezoelectric dispersing element can comprise a thin metal disc which causes dispersion of the fluid fed into the dispersing element via the wick or other soaked piece of organic material through vibration. Once in contact with the piezoelectric dispersing element, the vaporizable material (e.g., fluid) can be vaporized (e.g., turned into vapor or mist) and the vapor can be dispersed via a system pump and/or a sucking action of the user. In some aspects, the piezoelectric dispersing element can cause dispersion of the vaporizable material by producing ultrasonic vibrations. An electric field applied to a piezoelectric material within the piezoelectric element can cause ultrasonic expansion and contraction of the piezoelectric material, resulting in ultrasonic vibrations to the disc. The ultrasonic vibrations can cause the vaporizable material to disperse, thus forming a vapor or mist from the vaporizable material.

In some aspects, the connection between a power supply and the piezoelectric dispersing element can be facilitated using one or more conductive coils. The conductive coils can provide an ultrasonic power input to the piezoelectric dispersing element. For example, the signal carried by the coil can have a frequency of approximately 107.8 kHz. In some aspects, the piezoelectric dispersing element can comprise a piezoelectric dispersing element that can receive the ultrasonic signal transmitted from the power supply through the coils, and can cause vaporization of the vaporizable liquid by producing ultrasonic vibrations. An ultrasonic electric field applied to a piezoelectric material within the piezoelectric element causes ultrasonic expansion and contraction of the piezoelectric material, resulting in ultrasonic vibrations according to the frequency of the signal. The vaporizable liquid can be vibrated by the ultrasonic energy produced by the piezoelectric dispersing element, thus causing dispersal and/or atomization of the liquid. In an aspect, the vapor device 100 can be configured to permit a user to select between using a heating element of the vaporizer 108 or the piezoelectric dispersing element. In another aspect, the vapor device 100 can be configured to permit a user to utilize both a heating element of the vaporizer 108 and the piezoelectric dispersing element.

In an aspect, the vapor device 100 can comprise a heating casing 126. The heating casing 126 can enclose one or more of the container 110, the vaporizer 108, and/or the outlet 114. In a further aspect, the heating casing 126 can enclose one or more components that make up the container 110, the vaporizer 108, and/or the outlet 114. The heating casing 126 can be made of ceramic, metal, and/or porcelain. The heating casing 126 can have varying thickness. In an aspect, the heating casing 126 can be coupled to the power supply 120 to receive power to heat the heating casing 126. In another aspect, the heating casing 126 can be coupled to the vaporizer 108 to heat the heating casing 126. In another aspect, the heating casing 126 can serve an insulation role.

In an aspect, the vapor device 100 can comprise a filtration element 128. The filtration element 128 can be configured to remove (e.g., filter, purify, etc) contaminants from air entering the vapor device 100. The filtration element 128 can optionally comprise a fan 130 to assist in delivering air to the filtration element 128. The vapor device 100 can be configured to intake air into the filtration element 128, filter the air, and pass the filtered air to the vaporizer 108 for use in vaporizing the one or more vaporizable or non-vaporizable materials. In another aspect, the vapor device 100 can be configured to intake air into the filtration element 128, filter the air, and bypass the vaporizer 108 by passing the filtered air directly to the outlet 114 for inhalation by a user.

In an aspect, the filtration element 128 can comprise cotton, polymer, wool, satin, meta materials and the like. The filtration element 128 can comprise a filter material that at least one airborne particle and/or undesired gas by a mechanical mechanism, an electrical mechanism, and/or a chemical mechanism. The filter material can comprise one or more pieces of a filter fabric that can filter out one or more airborne particles and/or gasses. The filter fabric can be a woven and/or non-woven material. The filter fabric can be made from natural fibers (e.g., cotton, wool, etc.) and/or from synthetic fibers (e.g., polyester, nylon, polypropylene, etc.). The thickness of the filter fabric can be varied depending on the desired filter efficiencies and/or the region of the apparel where the filter fabric is to be used. The filter fabric can be designed to filter airborne particles and/or gasses by mechanical mechanisms (e.g., weave density), by electrical mechanisms (e.g., charged fibers, charged metals, etc.), and/or by chemical mechanisms (e.g., absorptive charcoal particles, adsorptive materials, etc.). In as aspect, the filter material can comprise electrically charged fibers such as, but not limited to, FILTRETE Air Filters manufactured by 3M Company (FILTRETE). In another aspect, the filter material can comprise a high density material similar to material used for medical masks which are used by medical personnel in doctors' offices, hospitals, and the like. In an aspect, the filter material can be treated with an anti-bacterial solution and/or otherwise made from anti-bacterial materials. In another aspect, the filtration element 128 can comprise electrostatic plates, ultraviolet light, a high-efficiency particulate air (HEPA) filter, combinations thereof, and the like.

In an aspect, the vapor device 100 can comprise a cooling element 132. The cooling element 132 can be configured to cool vapor exiting the vaporizer 108 prior to passing through the outlet 114. The cooling element 132 can cool vapor by utilizing air or space within the vapor device 100. The air used by the cooling element 132 can be either static (existing in the vapor device 100) or drawn into an intake and through the cooling element 132 and the vapor device 100. The intake can comprise various pumping, pressure, fan, or other intake systems for drawing air into the cooling element 132. In an aspect, the cooling element 132 can reside separately or can be integrated the vaporizer 108. The cooling element 132 can be a single cooled electronic element within a tube or space and/or the cooling element 132 can be configured as a series of coils or as a grid like structure. The materials for the cooling element 132 can be metal, liquid, polymer, natural substance, synthetic substance, air, or any combination thereof. The cooling element 132 can be powered by the power supply 120, by a separate battery (not shown), or other power source (not shown) including the use of excess heat energy created by the vaporizer 108 being converted to energy used for cooling by virtue of a small turbine or pressure system to convert the energy. Heat differentials between the vaporizer 108 and the cooling element 132 can also be converted to energy utilizing commonly known geothermal energy principles.

In an aspect, the vapor device 100 can comprise a magnetic element 134. For example, the magnetic element 134 can comprise an electromagnet, a ceramic magnet, a ferrite magnet, and/or the like. The magnetic element 134 can be configured to apply a magnetic field to air as it is brought into the vapor device 100, in the vaporizer 108, and/or as vapor exits the outlet 114.

The input/output device 112 can be used to select whether vapor exiting the outlet 114 should be cooled or not cooled and/or heated or not heated and/or magnetized or not magnetized. For example, a user can use the input/output device 112 to selectively cool vapor at times and not cool vapor at other times. The user can use the input/output device 112 to selectively heat vapor at times and not heat vapor at other times. The user can use the input/output device 112 to selectively magnetize vapor at times and not magnetize vapor at other times. The user can further use the input/output device 112 to select a desired smoothness, temperature, and/or range of temperatures. The user can adjust the temperature of the vapor by selecting or clicking on a clickable setting on a part of the vapor device 100. The user can use, for example, a graphical user interface (GUI) or a mechanical input enabled by virtue of clicking a rotational mechanism at either end of the vapor device 100.

In an aspect, cooling control can be set within the vapor device 100 settings via the processor 102 and system software (e.g., dynamic linked libraries). The memory 104 can store settings. Suggestions and remote settings can be communicated to and/or from the vapor device 100 via the input/output device 112 and/or the network access device 106. Cooling of the vapor can be set and calibrated between heating and cooling mechanisms to what is deemed an ideal temperature by the manufacturer of the vapor device 100 for the vaporizable material. For example, a temperature can be set such that resultant vapor delivers the coolest feeling to the average user but does not present any health risk to the user by virtue of the vapor being too cold, including the potential for rapid expansion of cooled vapor within the lungs and the damaging of tissue by vapor which has been cooled to a temperature which may cause frostbite like symptoms.

In an aspect, the vapor device 100 can be configured to receive air, smoke, vapor or other material and analyze the contents of the air, smoke, vapor or other material using one or more sensors 136 in order to at least one of analyze, classify, compare, validate, refute, and/or catalogue the same. A result of the analysis can be, for example, an identification of at least one of medical, recreational, homeopathic, olfactory elements, spices, other cooking ingredients, ingredients analysis from food products, fuel analysis, pharmaceutical analysis, genetic modification testing analysis, dating, fossil and/or relic analysis and the like. The vapor device 100 can pass utilize, for example, mass spectrometry, PH testing, genetic testing, particle and/or cellular testing, sensor based testing and other diagnostic and wellness testing either via locally available components or by transmitting data to a remote system for analysis.

In another aspect, the one or more sensors can determine a status of one or more components of the vapor device 100 such as the vaporizer 108. The status can be reported to the processor 102. The processor 102 can make one or more determinations and initiate one or more actions based on the status of one or more components of the vapor device 100. For example, the processor 102 can determine that the status of the vaporizer 108 is "on" but is not presently generating vapor for inhalation by a user. As a result, the vaporizer 108 can cause the vaporizer 108 to generate an amount of vapor to be expelled via the outlet 114 or the outlet 124 (whichever is not used for user inhalation). The processor 102 can thus simulate a traditional smoking experience by expelling vapor from an end of the vapor device 100 opposite the end for user inhalation. Similarly, the processor 102 can determine that the status of the vaporizer 108 is "on" and is presently generating vapor for inhalation by a user. As a result, the vaporizer 108 can cause a light element of input/output device 112 to emit light at an end of the vapor device 100 opposite that used for user inhalation. The processor 102 can thus simulate a traditional smoking experience by simulating burning material from an end of the vapor device 100 opposite the end for user inhalation. The processor 102 can further determine one or more characteristics to further customize the smoking experience. For example, a first characteristic can comprise at least one of a tone, a volume, a pitch, a number of harmonics, a frequency of harmonics, a fade in, or a fade out for one or more of the audio files whereas a second characteristic can comprise at least one of a color, an intensity, a pattern, a fade in, or a fade out for the light element.

In an aspect, a user can create a custom scent by using the vapor device 100 to intake air elements, where the vapor device 100 (or third-party networked device) analyzes the olfactory elements and/or biological elements within the sample and then formulates a replica scent within the vapor device 100 (or third-party networked device) that can be accessed by the user instantly, at a later date, with the ability to purchase this custom scent from a networked ecommerce portal.

The vapor device 100 can comprise an intake. The intake can be receptacle for receiving air from an area surrounding the intake. In another aspect, the intake can be a receptacle for receiving at least a portion of a detachable vaporizer. In an aspect, the intake can form an airtight seal with a detachable vaporizer. In another aspect, the intake can form a non-airtight seal with a detachable vaporizer. The vapor device 100 can comprise a pump (or other similar suction mechanism) coupled to the intake. The pump can be configured to draw air from an area surrounding the intake. In an aspect, one or more fan 130 can be configured to assist the pump in drawing air into the vapor device 100.

Air drawn in by the pump through the intake 138 can be passed to an analysis chamber. The analysis chamber can be a receptacle within the vapor device 100 configured for holding the drawn air and for exposing the air to one or more sensors 136 in order to at least one of analyze, classify, compare, validate, refute, and/or catalogue the same. A result of the analysis can be, for example, a performance indicator for a detachable vaporizer (any measure indicative of whether a detachable vaporizer is performing as expected), an identification of at least one of medical, recreational, homeopathic, olfactory elements, spices, other cooking ingredients, ingredients analysis from food products, fuel analysis, pharmaceutical analysis, and the like. The vapor device 100 can utilize, for example, mass spectrometry, gas chromatography, PH testing, particle and/or cellular testing, sensor based testing and other diagnostic and wellness testing either via locally available components or by transmitting data to a remote system for analysis. The mass spectrometry and/or gas chromatography systems disclosed herein can be implemented in a compact form factor, as is known in the art. Mass spectrometry is an analytical chemistry technique that identifies an amount and type of chemicals present in a sample by measuring the mass-to-charge ratio and abundance of gas-phase ions. A mass spectrum (plural spectra) is a plot of the ion signal as a function of the mass-to-charge ratio. The spectra are used to determine the elemental or isotopic signature of a sample, the masses of particles and of molecules, and to elucidate the chemical structures of molecules, such as peptides and other chemical compounds. Mass spectrometry works by ionizing chemical compounds to generate charged molecules or molecule fragments and measuring their mass-to-charge ratios.

In a typical mass spectrometry procedure, a sample of the drawn air, is ionized, for example by bombarding the air/vapor with electrons. This can cause some of the sample's molecules to break into charged fragments. These ions are then separated according to their mass-to-charge ratio, typically by accelerating them and subjecting them to an electric or magnetic field: ions of the same mass-to-charge ratio will undergo the same amount of deflection. The ions are detected by a mechanism capable of detecting charged particles, such as an electron multiplier. Results are displayed as spectra of the relative abundance of detected ions as a function of the mass-to-charge ratio. The atoms or molecules in the sample can be identified by correlating known masses to the identified masses stored on the memory device 104 or through a characteristic fragmentation pattern. Thus, a composition of the drawn air can be determined.

In another aspect, nanosensor technology using nanostructures: single walled carbon nanotubes (SWNTs), combined with a silicon-based microfabrication and micromachining process can be used. This technology provides a sensor array that can accommodate different nanostructures for specific applications with the advantages of high sensitivity, low power consumption, compactness, high yield and low cost. This platform provides an array of sensing elements for chemical detection. Each sensor in the array can comprise a nanostructure—chosen from many different categories of sensing material—and an interdigitated electrode (IDE) as a transducer. It is one type of electrochemical sensor that implies the transfer of charge from one electrode to another. This means that at least two electrodes constitute an electrochemical cell to form a closed electrical circuit. Due to the interaction between nanotube devices and gas molecules, the electron configuration is changed in the nanostructured sensing device, therefore, the changes in the electronic signal such as current or voltage were observed before and during the exposure of gas species (such as NO 2, NH 3, etc.). By measuring the conductivity change of the carbon nanotube (CNT) device, the concentration of the chemical species, such as gas molecules in the air/vapor drawn from the vapor device 100, can be measured.

In another aspect, the one or more sensors 136 can be configured to sense negative environmental conditions (e.g., adverse weather, smoke, fire, chemicals (e.g., such as CO2 or formaldehyde), adverse pollution, and/or disease outbreaks, and the like). The one or more sensors 136 can comprise one or more of, a biochemical/chemical sensor, a thermal sensor, a radiation sensor, a mechanical sensor, an optical sensor, a mechanical sensor, a magnetic sensor, an electrical sensor, combinations thereof and the like. The biochemical/chemical sensor can be configured to detect one or more biochemical/chemicals causing a negative environmental condition such as, but not limited to, smoke, a vapor, a gas, a liquid, a solid, an odor, combinations thereof, and/or the like. The biochemical/chemical sensor can comprise one or more of a mass spectrometer, a conducting/nonconducting regions sensor, a surface acoustic wave (SAW) sensor, a quartz microbalance sensor, a conductive composite sensor, a chemiresitor, a metal oxide gas sensor, an organic gas sensor, a metal-oxide-semiconductor field-effect transistor (MOSFET), a piezoelectric device, an infrared sensor, a sintered metal oxide sensor, a Pd-gate MOSFET, a metal field-effect transistor (FET) structure, a electrochemical cell, a conducting polymer sensor, a catalytic gas sensor, an organic semiconducting gas sensor, a solid electrolyte gas sensors, a piezoelectric quartz crystal sensor, and/or combinations thereof.

A semiconductor sensor can be configured to detect gases by a chemical reaction that takes place when the gas comes in direct contact with the sensor. Tin dioxide is the most common material used in semiconductor sensors, and the electrical resistance in the sensor is decreased when it comes in contact with the monitored gas. The resistance of the tin dioxide is typically around 50 kΩ in air but can drop to around 3.5 kΩ in the presence of 1% methane. This change in resistance is used to calculate the gas concentration. Semiconductor sensors can be commonly used to detect hydrogen, oxygen, alcohol vapor, and harmful gases such as carbon monoxide. A semiconductor sensors can be used as a carbon monoxide sensors. A semiconductor sensor can be used as a breathalyzers. Because the sensor must come in contact with the gas to detect it, semiconductor sensors work over a smaller distance than infrared point or ultrasonic detectors.

The thermal sensor can be configured to detect temperature, heat, heat flow, entropy, heat capacity, combinations thereof, and the like. Exemplary thermal sensors include, but are not limited to, thermocouples, such as a semiconducting thermocouples, noise thermometry, thermoswitches, thermistors, metal thermoresistors, semiconducting thermoresistors, thermodiodes, thermotransistors, calorimeters, thermometers, indicators, and fiber optics.

The radiation sensor can be configured to detect gamma rays, X-rays, ultra-violet rays, visible, infrared, microwaves and radio waves. Exemplary radiation sensors include, but are not limited to, nuclear radiation microsensors, such as scintillation counters and solid state detectors, ultra-violet, visible and near infrared radiation microsensors, such as photoconductive cells, photodiodes, phototransistors, infrared radiation microsensors, such as photoconductive infrared (IR) sensors and pyroelectric sensors The optical sensor can be configured to detect visible, near infrared, and infrared waves. The mechanical sensor can be configured to detect displacement, velocity, acceleration, force, torque, pressure, mass, flow, acoustic wavelength, and amplitude. Exemplary mechanical sensors include, but are not limited to, displacement microsensors, capacitive and inductive displacement sensors, optical displacement sensors, ultrasonic displacement sensors, pyroelectric, velocity and flow microsensors, transistor flow microsensors, acceleration microsensors, piezoresistive microaccelerometers, force, pressure and strain microsensors, and piezoelectric crystal sensors. The magnetic sensor can be configured to detect magnetic field, flux, magnetic moment, magnetization, and magnetic permeability. The electrical sensor can be configured to detect charge, current, voltage, resistance, conductance, capacitance, inductance, dielectric permittivity, polarization and frequency.

Upon sensing a negative environmental condition, the one or more sensors 136 can provide data to the processor 102 to determine the nature of the negative environmental condition and to generate/transmit one or more alerts based on the negative environmental condition. The one or more alerts can be deployed to the vapor device 100 user's wireless device and/or synced accounts. For example, the network device access device 106 can be used to transmit the one or more alerts directly (e.g., via Bluetooth®) to a user's smartphone to provide information to the user. In another aspect, the network access device 106 can be used to transmit sensed information and/or the one or more alerts to a remote server for use in syncing one or more other devices used by the user (e.g., other vapor devices, other electronic devices (smartphones, tablets, laptops, etc. . . . ). In another aspect, the one or more alerts can be provided to the user of the vapor device 100 via vibrations, audio, colors, and the like deployed from the mask, for example through the input/output device 112. For example, the input/output device 112 can comprise a small vibrating motor to alert the user to one or more sensed conditions via tactile sensation. In another example, the input/output device 112 can comprise one or more light-emitting diodes (LED's) of various colors to provide visual information to the user. In another example, the input/output device 112 can comprise one or more speakers that can provide audio information to the user. For example, various patterns of beeps, sounds, and/or voice recordings can be utilized to provide the audio information to the user. In another example, the input/output device 112 can comprise an liquid crystal display (LCD) screen/touchscreen that provides a summary and/or detailed information regarding the negative environmental condition and/or the one or more alerts.

In another aspect, upon sensing a negative environmental condition, the one or more sensors 136 can provide data to the processor 102 to determine the nature of the negative environmental condition and to provide a recommendation for mitigating and/or to actively mitigate the negative environmental condition. Mitigating the negative environmental conditions can comprise, for example, applying a filtration system, a fan, a fire suppression system, engaging a heating, ventilation, and air condition (HVAC) system, and/or one or more vaporizable and/or non-vaporizable materials. The processor 102 can access a database stored in the memory device 104 to make such a determination or the network device 106 can be used to request information from a server to verify the sensor findings. In an aspect, the server can provide an analysis service to the vapor device 100. For example, the server can analyze data sent by the vapor device 100 based on a reading from the one or more sensors 136. The server can determine and transmit one or more recommendations to the vapor device 100 to mitigate the sensed negative environmental condition. The vapor device 100 can use the one or more recommendations to activate a filtration system, a fan, a fire suppression system engaging a HVAC system, and/or to vaporize one or more vaporizable or non-vaporizable materials to assist in countering effects from the negative environmental condition.

In an aspect, the vapor device 100 can comprise a global positioning system (GPS) unit 118. The GPS 118 can detect a current location of the device 100. In some aspects, a user can request access to one or more services that rely on a current location of the user. For example, the processor 102 can receive location data from the GPS 118, convert it to usable data, and transmit the usable data to the one or more services via the network access device 106. GPS unit 118 can receive position information from a constellation of satellites operated by the U.S. Department of Defense. Alternately, the GPS unit 118 can be a Global Navigation Satellite System (GLONASS) receiver operated by the Russian Federation Ministry of Defense, or any other positioning device capable of providing accurate location information (for example, long range navigation (LORAN), inertial navigation, and the like). The GPS unit 118 can contain additional logic, either software, hardware or both to receive the Wide Area Augmentation System (WAAS) signals, operated by the Federal Aviation Administration, to correct dithering errors and provide the most accurate location possible. Overall accuracy of the positioning equipment subsystem containing WAAS is generally in the two meter range.

Figure 2:
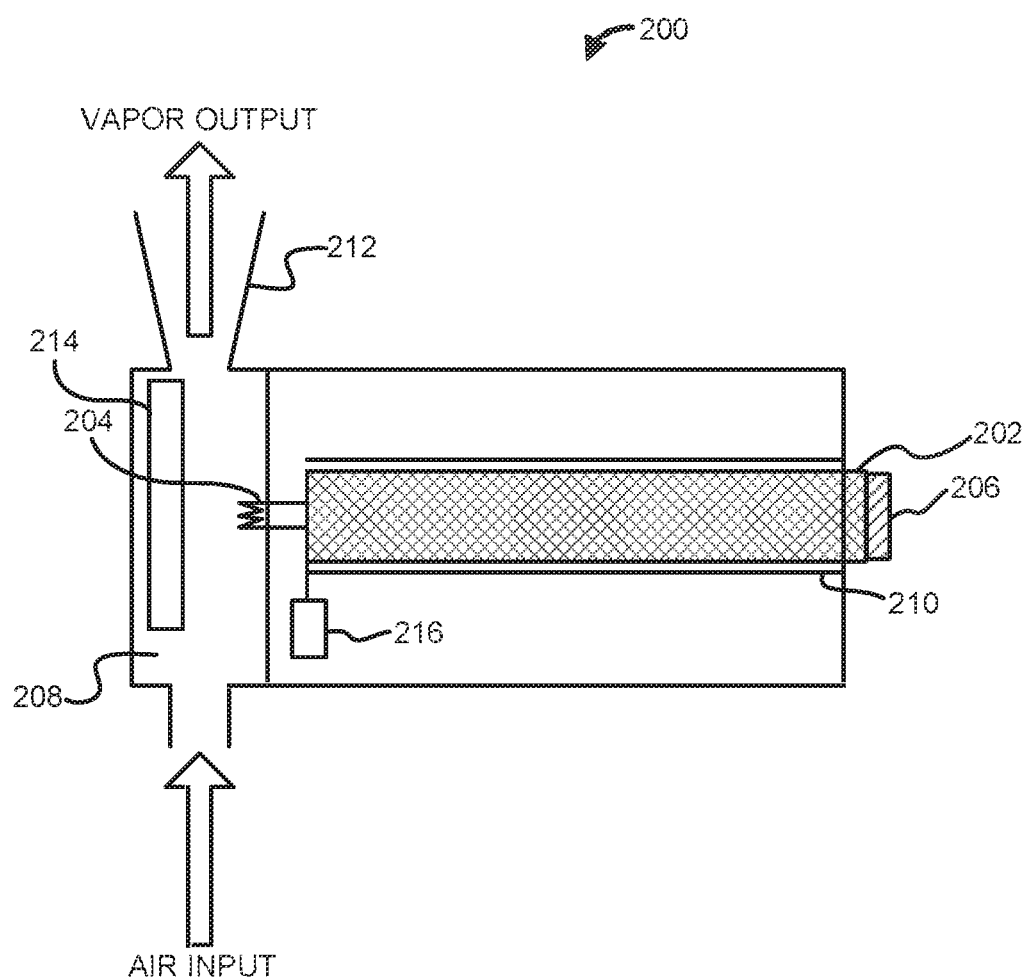
FIG. 2 illustrates an exemplary vaporizer.

FIG. 2 illustrates an exemplary vaporizer 200. The vaporizer 200 can be, for example, an e-cigarette, an e-cigar, an electronic vapor device, a hybrid electronic communication handset coupled/integrated vapor device, a robotic vapor device, a modified vapor device "mod," a micro-sized electronic vapor device, a robotic vapor device, and the like. The vaporizer 200 can be used internally of the vapor device 100 or can be a separate device. For example, the vaporizer 200 can be used in place of the vaporizer 108.

The vaporizer 200 can comprise or be coupled to one or more containers 202 containing a vaporizable material, for example a fluid. For example, coupling between the vaporizer 200 and the one or more containers 202 can be via a wick 204, via a valve, or by some other structure. Coupling can operate independently of gravity, such as by capillary action or pressure drop through a valve. The vaporizer 200 can be configured to vaporize the vaporizable material from the one or more containers 202 at controlled rates in response to mechanical input from a component of the vapor device 100, and/or in response to control signals from the processor 102 or another component. Vaporizable material (e.g., fluid) can be supplied by one or more replaceable cartridges 206. In an aspect the vaporizable material can comprise aromatic elements. In an aspect, the aromatic elements can be medicinal, recreational, and/or wellness related. The aromatic element can include, but is not limited to, at least one of lavender or other floral aromatic eLiquids, mint, menthol, herbal soil or geologic, plant based, name brand perfumes, custom mixed perfume formulated inside the vapor device 100 and aromas constructed to replicate the smell of different geographic places, conditions, and/or occurrences. For example, the smell of places may include specific or general sports venues, well known travel destinations, the mix of one's own personal space or home. The smell of conditions may include, for example, the smell of a pet, a baby, a season, a general environment (e.g., a forest), a new car, a sexual nature (e.g., musk, pheromones, etc. . . . ). The one or more replaceable cartridges 206 can contain the vaporizable material. If the vaporizable material is liquid, the cartridge can comprise the wick 204 to aid in transporting the liquid to a mixing chamber 208. In the alternative, some other transport mode can be used. Each of the one or more replaceable cartridges 206 can be configured to fit inside and engage removably with a receptacle (such as the container 202 and/or a secondary container) of the vapor device 100. In an alternative, or in addition, one or more fluid containers 210 can be fixed in the vapor device 100 and configured to be refillable. In an aspect, one or more materials can be vaporized at a single time by the vaporizer 200. For example, some material can be vaporized and drawn through an exhaust port 212 and/or some material can be vaporized and exhausted via a smoke simulator outlet (not shown).

The mixing chamber 208 can also receive an amount of one or more compounds (e.g., vaporizable material) to be vaporized. For example, the processor 102 can determine a first amount of a first compound and determine a second amount of a second compound. The processor 102 can cause the withdrawal of the first amount of the first compound from a first container into the mixing chamber and the second amount of the second compound from a second container into the mixing chamber. The processor 102 can also determine a target dose of the first compound, determine a vaporization ratio of the first compound and the second compound based on the target dose, determine the first amount of the first compound based on the vaporization ratio, determine the second amount of the second compound based on the vaporization ratio, and cause the withdrawal of the first amount of the first compound into the mixing chamber, and the withdrawal of the second amount of the second compound into the mixing chamber.

The processor 102 can also determine a target dose of the first compound, determine a vaporization ratio of the first compound and the second compound based on the target dose, determine the first amount of the first compound based on the vaporization ratio, and determine the second amount of the second compound based on the vaporization ratio. After expelling the vapor through an exhaust port for inhalation by a user, the processor 102 can determine that a cumulative dose is approaching the target dose and reduce the vaporization ratio. In an aspect, one or more of the vaporization ratio, the target dose, and/or the cumulative dose can be determined remotely and transmitted to the vapor device 100 for use.

In operation, a heating element 214 can vaporize or nebulize the vaporizable material in the mixing chamber 208, producing an inhalable vapor/mist that can be expelled via the exhaust port 212. In an aspect, the heating element 214 can comprise a heater coupled to the wick (or a heated wick) 204 operatively coupled to (for example, in fluid communication with) the mixing chamber 208. The heating element 214 can comprise a nickel-chromium wire or the like, with a temperature sensor (not shown) such as a thermistor or thermocouple. Within definable limits, by controlling power to the wick 204, a rate of vaporization can be independently controlled. A multiplexer 216 can receive power from any suitable source and exchange data signals with a processor, for example, the processor 102 of the vapor device 100, for control of the vaporizer 200. At a minimum, control can be provided between no power (off state) and one or more powered states. Other control mechanisms can also be suitable.

In another aspect, the vaporizer 200 can comprise a piezoelectric dispersing element. In some aspects, the piezoelectric dispersing element can be charged by a battery, and can be driven by a processor on a circuit board. The circuit board can be produced using a polyimide such as Kapton, or other suitable material. The piezoelectric dispersing element can comprise a thin metal disc which causes dispersion of the fluid fed into the dispersing element via the wick or other soaked piece of organic material through vibration. Once in contact with the piezoelectric dispersing element, the vaporizable material (e.g., fluid) can be vaporized (e.g., turned into vapor or mist) and the vapor can be dispersed via a system pump and/or a sucking action of the user. In some aspects, the piezoelectric dispersing element can cause dispersion of the vaporizable material by producing ultrasonic vibrations. An electric field applied to a piezoelectric material within the piezoelectric element can cause ultrasonic expansion and contraction of the piezoelectric material, resulting in ultrasonic vibrations to the disc. The ultrasonic vibrations can cause the vaporizable material to disperse, thus forming a vapor or mist from the vaporizable material.

In an aspect, the vaporizer 200 can be configured to permit a user to select between using the heating element 214 or the piezoelectric dispersing element. In another aspect, the vaporizer 200 can be configured to permit a user to utilize both the heating element 214 and the piezoelectric dispersing element.

In some aspects, the connection between a power supply and the piezoelectric dispersing element can be facilitated using one or more conductive coils. The conductive coils can provide an ultrasonic power input to the piezoelectric dispersing element. For example, the signal carried by the coil can have a frequency of approximately 107.8 kHz. In some aspects, the piezoelectric dispersing element can comprise a piezoelectric dispersing element that can receive the ultrasonic signal transmitted from the power supply through the coils, and can cause vaporization of the vaporizable liquid by producing ultrasonic vibrations. An ultrasonic electric field applied to a piezoelectric material within the piezoelectric element causes ultrasonic expansion and contraction of the piezoelectric material, resulting in ultrasonic vibrations according to the frequency of the signal. The vaporizable liquid can be vibrated by the ultrasonic energy produced by the piezoelectric dispersing element, thus causing dispersal and/or atomization of the liquid.

Figure 3:
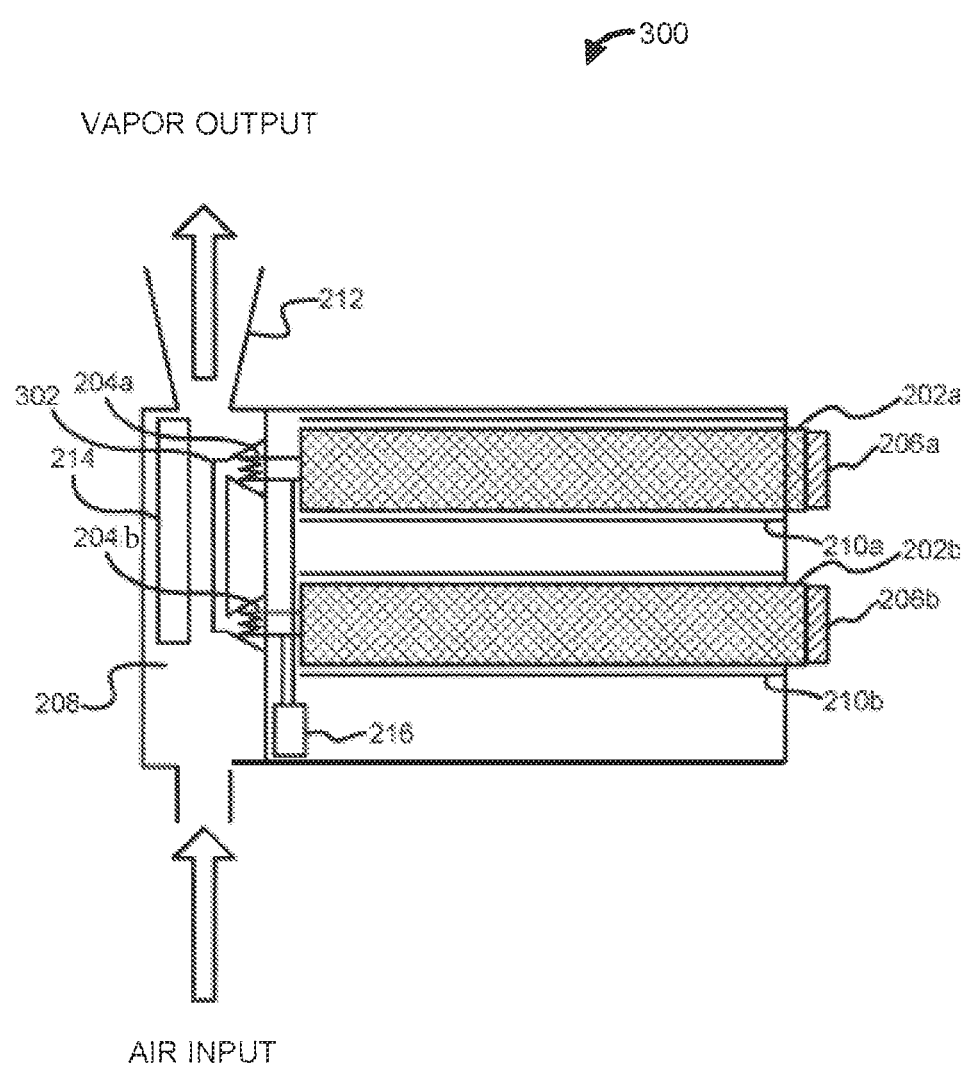
FIG. 3 illustrates an exemplary vaporizer configured for vaporizing a mixture of vaporizable material.

FIG. 3 illustrates a vaporizer 300 that comprises the elements of the vaporizer 200 with two containers 202a and 202b containing a vaporizable material, for example a fluid or a solid. In an aspect, the fluid can be the same fluid in both containers or the fluid can be different in each container. In an aspect the fluid can comprise aromatic elements. The aromatic element can include, but is not limited to, at least one of lavender or other floral aromatic eLiquids, mint, menthol, herbal soil or geologic, plant based, name brand perfumes, custom mixed perfume formulated inside the vapor device 100 and aromas constructed to replicate the smell of different geographic places, conditions, and/or occurrences. For example, the smell of places may include specific or general sports venues, well known travel destinations, the mix of one's own personal space or home. The smell of conditions may include, for example, the smell of a pet, a baby, a season, a general environment (e.g., a forest), a new car, a sexual nature (e.g., musk, pheromones, etc. . . . ). Coupling between the vaporizer 200 and the container 202a and the container 202b can be via a wick 204a and a wick 204b, respectively, via a valve, or by some other structure. Coupling can operate independently of gravity, such as by capillary action or pressure drop through a valve. The vaporizer 300 can be configured to mix in varying proportions the fluids contained in the container 202a and the container 202b and vaporize the mixture at controlled rates in response to mechanical input from a component of the vapor device 100, and/or in response to control signals from the processor 102 or another component. For example, based on a vaporization ratio. In an aspect, a mixing element 302 can be coupled to the container 202a and the container 202b. The mixing element can, in response to a control signal from the processor 102, withdraw select quantities of vaporizable material in order to create a customized mixture of different types of vaporizable material. Vaporizable material (e.g., fluid) can be supplied by one or more replaceable cartridges 206a and 206b. The one or more replaceable cartridges 206a and 206b can contain a vaporizable material. If the vaporizable material is liquid, the cartridge can comprise the wick 204a or 204b to aid in transporting the liquid to a mixing chamber 208. In the alternative, some other transport mode can be used. Each of the one or more replaceable cartridges 206a and 206b can be configured to fit inside and engage removably with a receptacle (such as the container 202a or the container 202b and/or a secondary container) of the vapor device 100. In an alternative, or in addition, one or more fluid containers 210a and 210b can be fixed in the vapor device 100 and configured to be refillable.

In an aspect, one or more materials can be vaporized at a single time by the vaporizer 300. For example, some material can be vaporized and drawn through an exhaust port 212 and/or some material can be vaporized and exhausted via a smoke simulator outlet (not shown).

Figure 4:
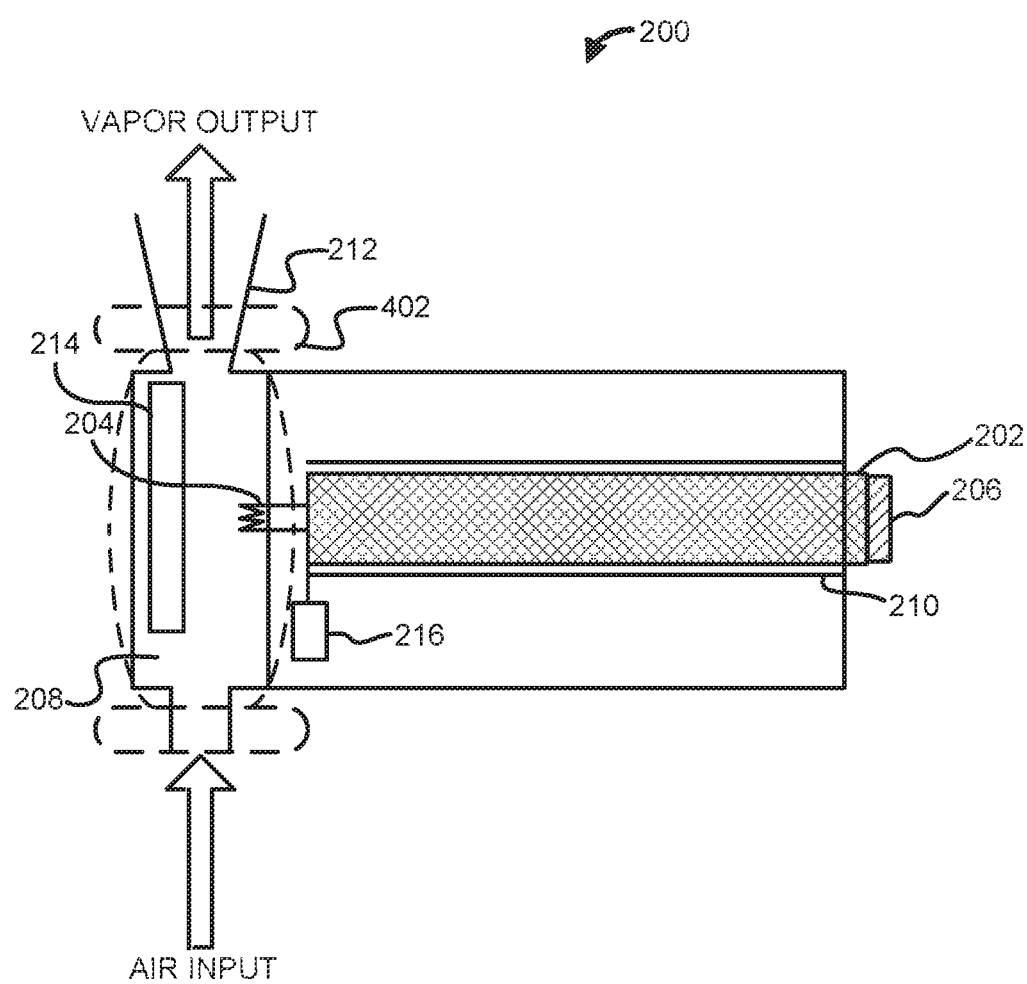
FIG. 4 illustrates an exemplary vaporizer device configured for smooth vapor delivery.

FIG. 4 illustrates a vaporizer 200 that comprises the elements of the vaporizer 200 with a heating casing 402. The heating casing 402 can enclose the heating element 214 or can be adjacent to the heating element 214. The heating casing 402 is illustrated with dashed lines, indicating components contained therein. The heating casing 402 can be made of ceramic, metal, and/or porcelain. The heating casing 402 can have varying thickness. In an aspect, the heating casing 402 can be coupled to the multiplexer 216 to receive power to heat the heating casing 402. In another aspect, the heating casing 402 can be coupled to the heating element 214 to heat the heating casing 402. In another aspect, the heating casing 402 can serve an insulation role.

Figure 5:
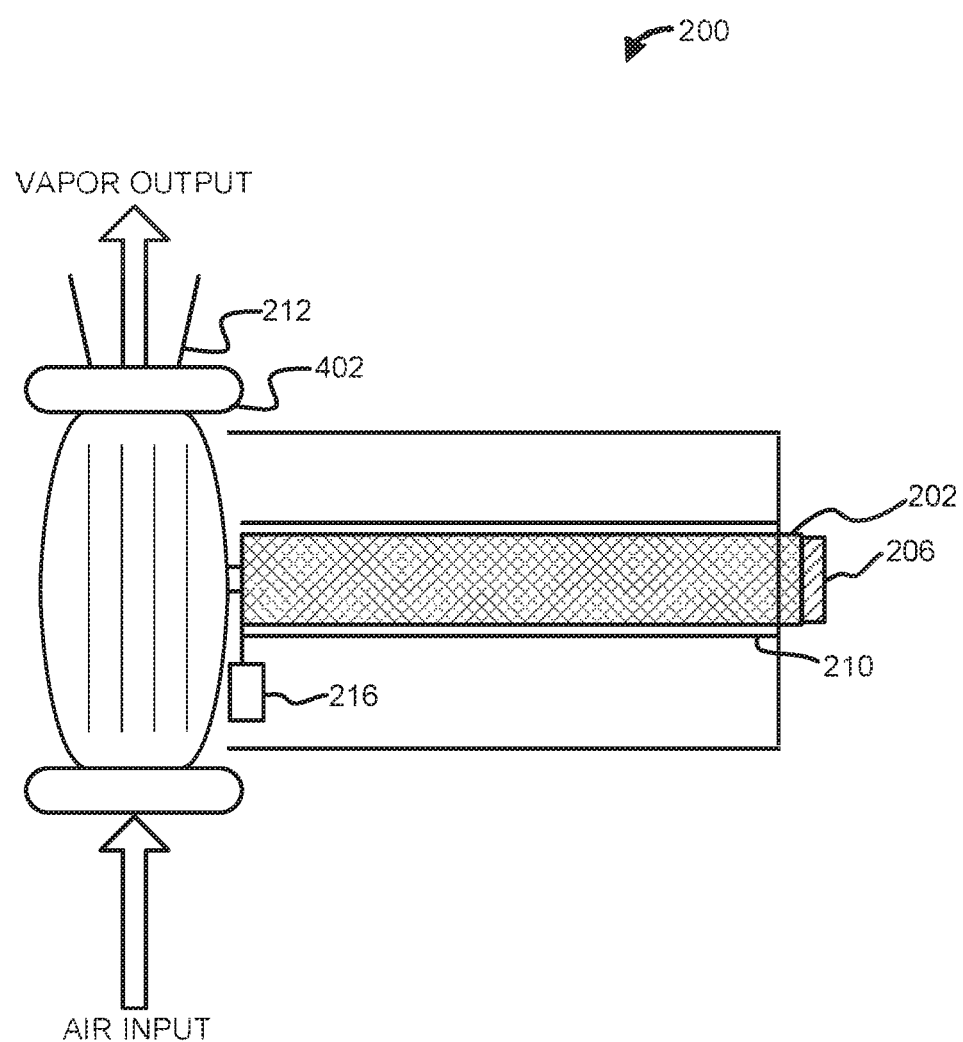
FIG. 5 illustrates another exemplary vaporizer configured for smooth vapor delivery.

FIG. 5 illustrates the vaporizer 200 of FIG. 2 and FIG. 4, but illustrates the heating casing 402 with solid lines, indicating components contained therein. Other placements of the heating casing 402 are contemplated. For example, the heating casing 402 can be placed after the heating element 214 and/or the mixing chamber 208.

Figure 6:
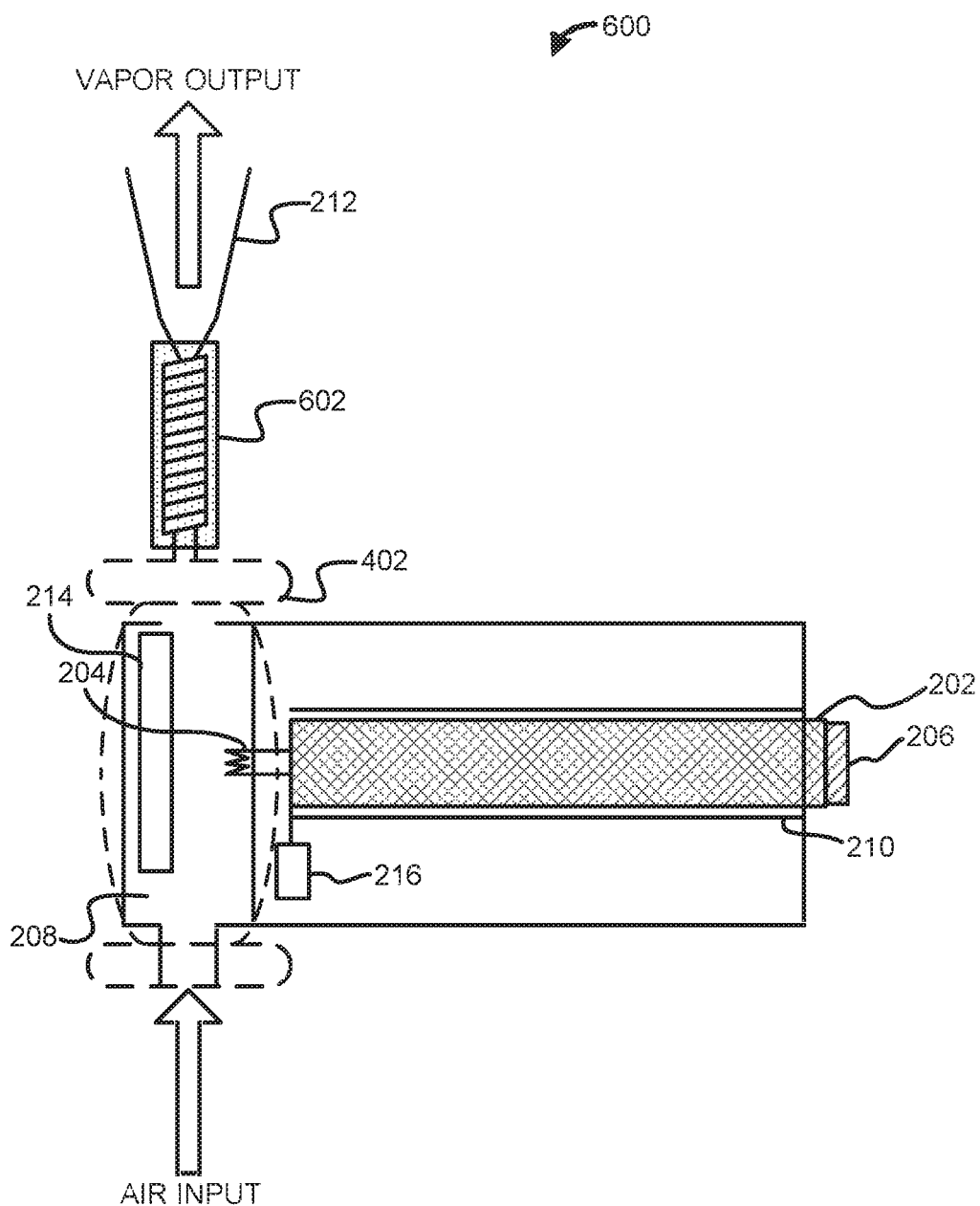
FIG. 6 illustrates another exemplary vaporizer configured for smooth vapor delivery.

FIG. 6 illustrates a vaporizer 600 that comprises the elements of the vaporizer 200 of FIG. 2 and FIG. 4, with the addition of a cooling element 602. The vaporizer 600 can optionally comprise the heating casing 402. The cooling element 602 can comprise one or more of a powered cooling element, a cooling air system, and/or a cooling fluid system. The cooling element 602 can be self-powered, co-powered, or directly powered by a battery and/or charging system within the vapor device 100 (e.g., the power supply 120). In an aspect, the cooling element 602 can comprise an electrically connected conductive coil, grating, and/or other design to efficiently distribute cooling to the at least one of the vaporized and/or non-vaporized air. For example, the cooling element 602 can be configured to cool air as it is brought into the vaporizer 600/mixing chamber 208 and/or to cool vapor after it exits the mixing chamber 208. The cooling element 602 can be deployed such that the cooling element 602 is surrounded by the heated casing 402 and/or the heating element 214. In another aspect, the heated casing 402 and/or the heating element 214 can be surrounded by the cooling element 602. The cooling element 602 can utilize at least one of cooled air, cooled liquid, and/or cooled matter.

In an aspect, the cooling element 602 can be a coil of any suitable length and can reside proximate to the inhalation point of the vapor (e.g., the exhaust port 212). The temperature of the air is reduced as it travels through the cooling element 602. In an aspect, the cooling element 602 can comprise any structure that accomplishes a cooling effect. For example, the cooling element 602 can be replaced with a screen with a mesh or grid-like structure, a conical structure, and/or a series of cooling airlocks, either stationary or opening, in a periscopic/telescopic manner. The cooling element 602 can be any shape and/or can take multiple forms capable of cooling heated air, which passes through its space.

In an aspect, the cooling element 602 can be any suitable cooling system for use in a vapor device. For example, a fan, a heat sink, a liquid cooling system, a chemical cooling system, combinations thereof, and the like. In an aspect, the cooling element 602 can comprise a liquid cooling system whereby a fluid (e.g., water) passes through pipes in the vaporizer 600. As this fluid passes around the cooling element 602, the fluid absorbs heat, cooling air in the cooling element 602. After the fluid absorbs the heat, the fluid can pass through a heat exchanger which transfers the heat from the fluid to air blowing through the heat exchanger. By way of further example, the cooling element 602 can comprise a chemical cooling system that utilizes an endothermic reaction. An example of an endothermic reaction is dissolving ammonium nitrate in water. Such endothermic process is used in instant cold packs. These cold packs have a strong outer plastic layer that holds a bag of water and a chemical, or mixture of chemicals, that result in an endothermic reaction when dissolved in water. When the cold pack is squeezed, the inner bag of water breaks and the water mixes with the chemicals. The cold pack starts to cool as soon as the inner bag is broken, and stays cold for over an hour. Many instant cold packs contain ammonium nitrate. When ammonium nitrate is dissolved in water, it splits into positive ammonium ions and negative nitrate ions. In the process of dissolving, the water molecules contribute energy, and as a result, the water cools down. Thus, the vaporizer 600 can comprise a chamber for receiving the cooling element 602 in the form of a "cold pack." The cold pack can be activated prior to insertion into the vaporizer 600 or can be activated after insertion through use of a button/switch and the like to mechanically activate the cold pack inside the vaporizer 400.

In an aspect, the cooling element 602 can be selectively moved within the vaporizer 600 to control the temperature of the air mixing with vapor. For example, the cooling element 602 can be moved closer to the exhaust port 212 or further from the exhaust port 212 to regulate temperature. In another aspect, insulation can be incorporated as needed to maintain the integrity of heating and cooling, as well as absorbing any unwanted condensation due to internal or external conditions, or a combination thereof. The insulation can also be selectively moved within the vaporizer 600 to control the temperature of the air mixing with vapor. For example, the insulation can be moved to cover a portion, none, or all of the cooling element 602 to regulate temperature.

Figure 7:
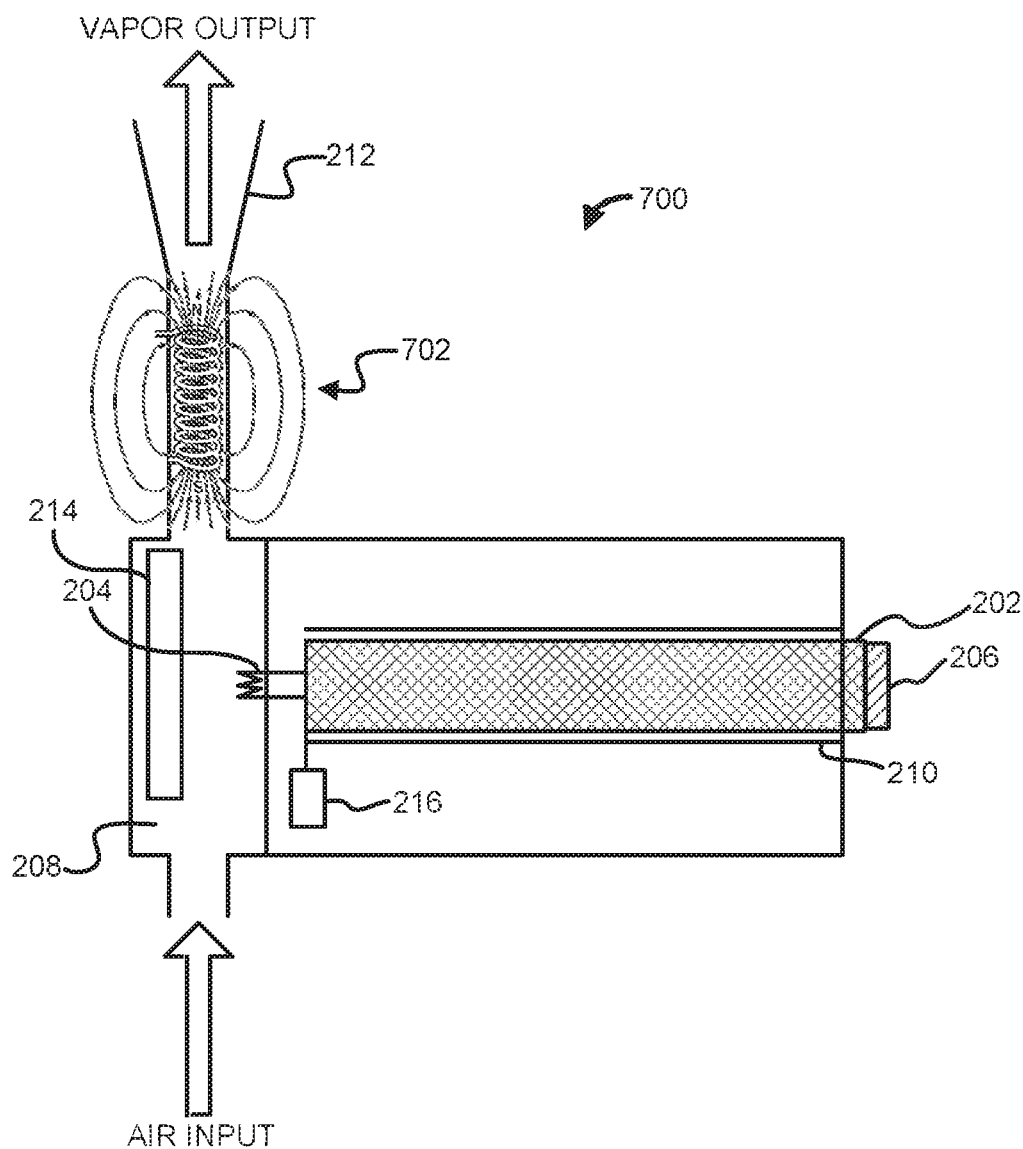
FIG. 7 illustrates another exemplary vaporizer configured for smooth vapor delivery.

FIG. 7 illustrates a vaporizer 700 that comprises elements in common with the vaporizer 200. The vaporizer 700 can optionally comprise the heating casing 402 (not shown) and/or the cooling element 602 (not shown). The vaporizer 700 can comprise a magnetic element 702. The magnetic element 702 can apply a magnetic field to vapor after exiting the mixing chamber 208. The magnetic field can cause positively and negatively charged particles in the vapor to curve in opposite directions, according to the Lorentz force law with two particles of opposite charge. The magnetic field can be created by at least one of an electric current generating a charge or a pre-charged magnetic material deployed within the vapor device 100. In an aspect, the magnetic element 702 can be built into the mixing chamber 208, the cooling element 602, the heating casing 402, or can be a separate magnetic element 702.

Figure 8:
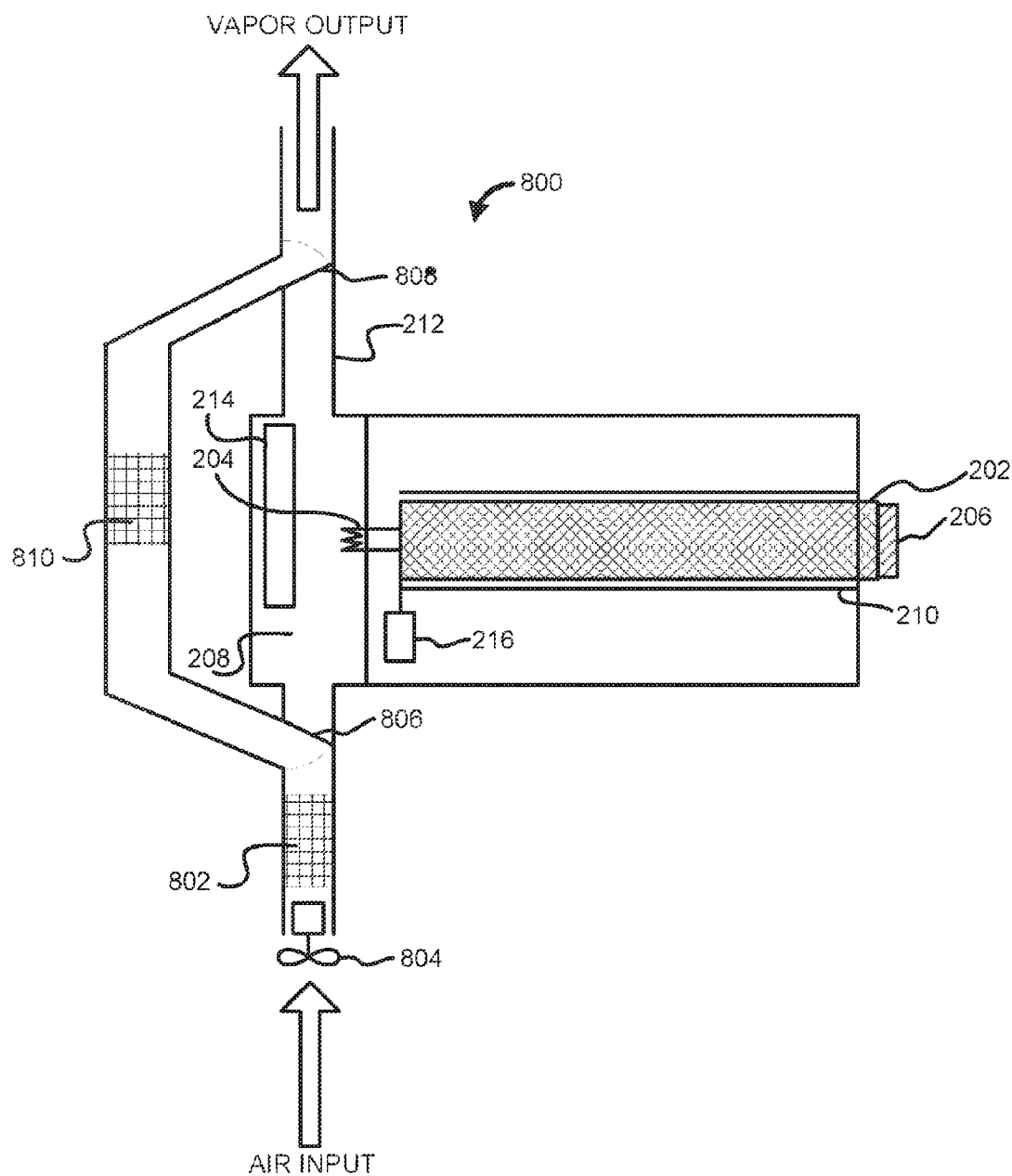
FIG. 8 illustrates an exemplary vaporizer configured for filtering air.

FIG. 8 illustrates a vaporizer 800 that comprises elements in common with the vaporizer 200. In an aspect, the vaporizer 800 can comprise a filtration element 802. The filtration element 802 can be configured to remove (e.g., filter, purify, etc) contaminants from air entering the vaporizer 800. The filtration element 802 can optionally comprise a fan 804 to assist in delivering air to the filtration element 802. The vaporizer 800 can be configured to intake air into the filtration element 802, filter the air, and pass the filtered air to the mixing chamber 208 for use in vaporizing the one or more vaporizable or non-vaporizable materials. In another aspect, the vaporizer 800 can be configured to intake air into the filtration element 802, filter the air, and bypass the mixing chamber 208 by engaging a door 806 and a door 808 to pass the filtered air directly to the exhaust port 212 for inhalation by a user. In an aspect, filtered air that bypasses the mixing chamber 208 by engaging the door 806 and the door 808 can pass through a second filtration element 810 to further remove (e.g., filter, purify, etc) contaminants from air entering the vaporizer 800. In an aspect, the vaporizer 800 can be configured to deploy and/or mix a proper/safe amount of oxygen which can be delivered either via the one or more replaceable cartridges 206 or via air pumped into a mask from external air and filtered through the filtration element 802 and/or the filtration element 810.

In an aspect, the filtration element 802 and/or the filtration element 810 can comprise cotton, polymer, wool, satin, meta materials and the like. The filtration element 802 and/or the filtration element 810 can comprise a filter material that at least one airborne particle and/or undesired gas by a mechanical mechanism, an electrical mechanism, and/or a chemical mechanism. The filter material can comprise one or more pieces of, a filter fabric that can filter out one or more airborne particles and/or gasses. The filter fabric can be a woven and/or non-woven material. The filter fabric can be made from natural fibers (e.g., cotton, wool, etc.) and/or from synthetic fibers (e.g., polyester, nylon, polypropylene, etc.). The thickness of the filter fabric can be varied depending on the desired filter efficiencies and/or the region of the apparel where the filter fabric is to be used. The filter fabric can be designed to filter airborne particles and/or gasses by mechanical mechanisms (e.g., weave density), by electrical mechanisms (e.g., charged fibers, charged metals, etc.), and/or by chemical mechanisms (e.g., absorptive charcoal particles, adsorptive materials, etc.). In as aspect, the filter material can comprise electrically charged fibers such as, but not limited to, FILTRETE by 3M. In another aspect, the filter material can comprise a high density material similar to material used for medical masks which are used by medical personnel in doctors' offices, hospitals, and the like. In an aspect, the filter material can be treated with an anti-bacterial solution and/or otherwise made from anti-bacterial materials. In another aspect, the filtration element 802 and/or the filtration element 810 can comprise electrostatic plates, ultraviolet light, a HEPA filter, combinations thereof, and the like.

Figure 9:
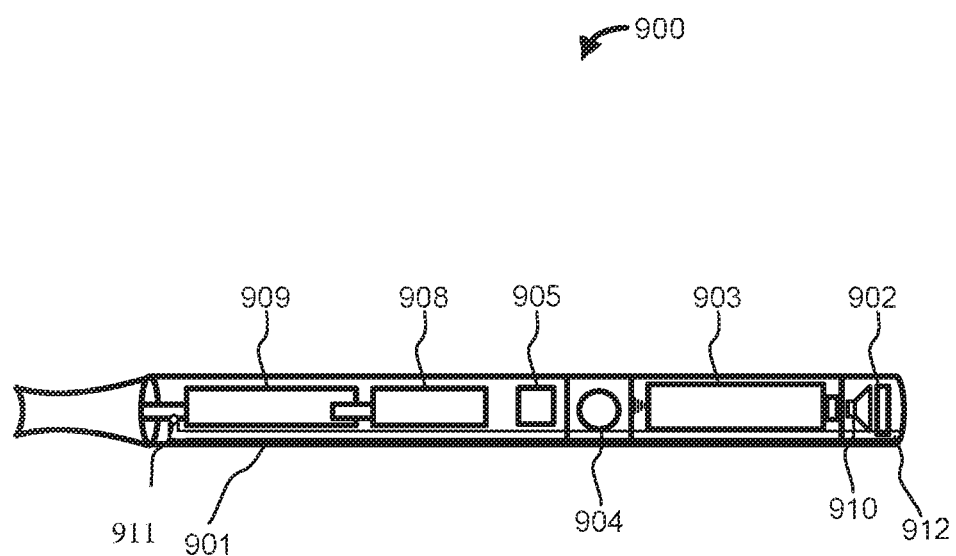
FIG. 9 illustrates an interface of an exemplary electronic vapor device.

FIG. 9 illustrates an exemplary electronic vapor device 900. The electronic vapor device 900 can comprise a housing 901. The housing 901 can be made of metal, plastic, glass, combinations thereof, and the like. The housing 901 can be made of a transparent material, for example, glass, plastic, or a combination thereof. The housing 901 can thus enable a user to view various components of the electronic vapor device 900, for example during operation of the electronic vapor device 900. The housing 901 can be configured to permit viewing of some or all components of the electronic vapor device 900. In the example, a user can view via the housing 901, an LED 902, a battery 903, at least a portion of a button 904 that resides inside the housing 901, a processor 905, a heating element 908, a container 909 for storing vaporizable material, a speaker 910, a valve 911, and a simulator outlet 912. In an aspect, the valve 911 can be operable to route vapor generated by the heating element 908 to simulator outlet 912 to simulate a traditional smoking apparatus in conjunction with the LED 902. For example, when a user is not actively inhaling vapor, the exemplary electronic vapor device 900 can cause the valve 911 to block vapor from exiting the mouthpiece, but rather to exit the simulator outlet 912 at the end of the apparatus. Similarly, the LED 902 can be a dim red/orange (or any other color) when the vapor is exiting the simulator outlet 912 and can increase brightness as the user inhales via the mouthpiece (also shutting off vapor from exiting the simulator outlet 912 via the valve 911). Moreover, the speaker 910 can be activated to play one or more sounds that simulate the sound of smoking a smoking apparatus (e.g., burning leaves and the like) when the user is inhaling via the mouthpiece and not when vapor is exiting the simulator outlet 912.

Figure 10:
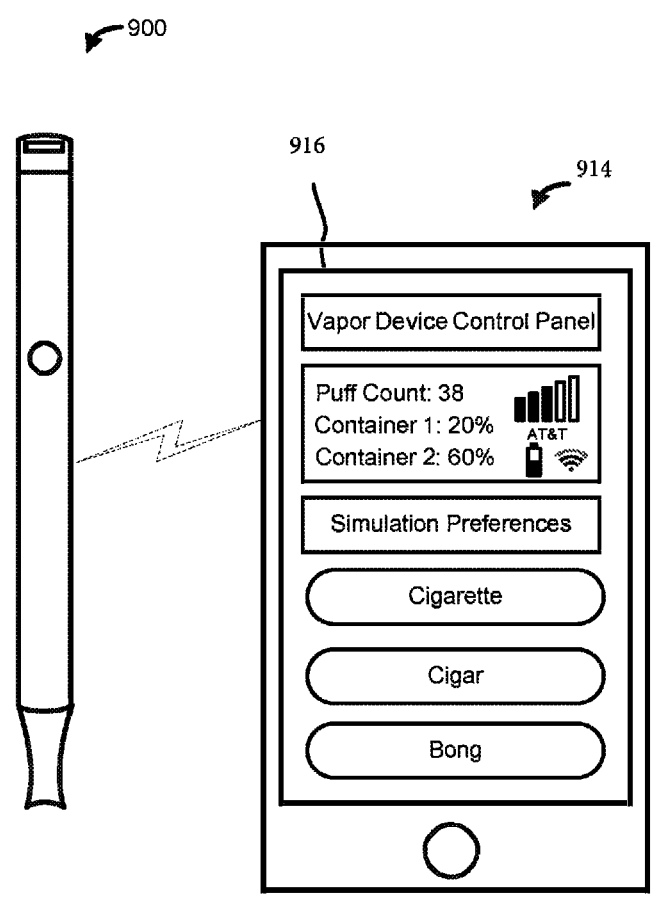
FIG. 10 illustrates another interface of an exemplary electronic vapor device.

FIG. 10 illustrates exemplary information that can be provided to a user via a display (not shown) of the exemplary vapor device 900 or via a display 916 of an electronic device 914 in communication with the exemplary vapor device 900. The display of the exemplary vapor device 900 can provide information to a user such as a puff count, an amount of vaporizable material remaining in one or more containers, battery remaining, signal strength, combinations thereof, and the like. The display 916 can provide the same or different information to the user as available on the display of the exemplary vapor device 900. In an aspect, the exemplary vapor device 900 does not comprise a display. The display 916 can provide a user interface that provides information and provides control over one or more functions of the exemplary vapor device 900. The one or more functions can comprise one or more of a simulation experience function, a community function, an e-commerce function, or a vapor device operability function.

The simulation experience function can permit a user to specify which traditional smoking apparatus the exemplary vapor device 900 should emulate in sound and/or light. The community function can comprise at least one of a social networking function, transmitting or receiving a recommendation, transmitting or receiving a message, or transmitting or receiving a location of a user. The e-commerce function can comprise at least one of purchasing a component for use with the vapor device, purchasing a vaporizable or non-vaporizable material for use with the vapor device, purchasing another vapor device or components thereof, selling a component for use with the vapor device or another vapor device, selling a vaporizable or non-vaporizable material for use with the vapor device, or selling the vapor device or another vapor device. The device operability function can comprise at least one of controlling the vapor device, displaying diagnostic information, displaying repair information, displaying calibration information, displaying usage information, or displaying information corresponding to detected constituents of material vaporized by the vapor device.

The user interface can comprise at least one of a lighted signal light, a gauge, a representation of a box, a representation of a form, a check mark, an avatar, a visual image, a graphic design, a list, an active calibration or calculation, a 2-dimensional fractal design, a 3-dimensional fractal design, a 2-dimensional representation of the vapor device or another vapor device, or a 3-dimensional representation of the vapor device or another vapor device. At least one of the 2-dimensional fractal design or the 3-dimensional fractal design can continuously or periodically expand or contract to various scales of the original fractal design.

Figure 11:
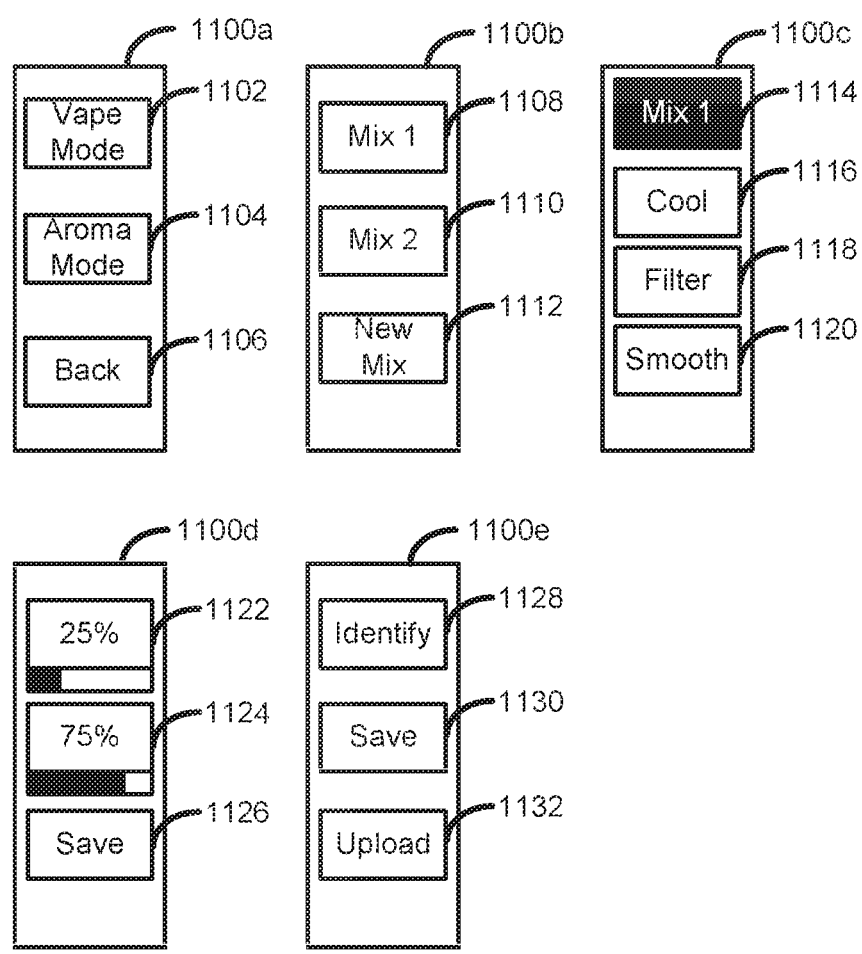
FIG. 11 illustrates several interfaces of an exemplary electronic vapor device.

FIG. 11 illustrates a series of user interfaces that can be provided via a display of the exemplary vapor device 900 or via the display 916 of the electronic device 914 in communication with the exemplary vapor device 900. In an aspect, the exemplary vapor device 900 can be configured for one or more of multi-mode vapor usage. For example, the exemplary vapor device 900 can be configured to enable a user to inhale vapor (vape mode) or to release vapor into the atmosphere (aroma mode). User interface 1100a provides a user with interface elements to select which mode the user wishes to engage, a Vape Mode 1102, an Aroma Mode 1104, or an option to go back 1106 and return to the previous screen. The interface element Vape Mode 1102 enables a user to engage a vaporizer to generate a vapor for inhalation. The interface element Aroma Mode 1104 enables a user to engage the vaporizer to generate a vapor for release into the atmosphere.

In the event a user selects the Vape Mode 1102, the exemplary vapor device 900 will be configured to vaporize material and provide the resulting vapor to the user for inhalation. The user can be presented with user interface 1100b which provides the user an option to select interface elements that will determine which vaporizable material to vaporize. For example, an option of Mix 1 1108, Mix 2 1110, or a New Mix 1112. The interface element Mix 1 1108 enables a user to engage one or more containers that contain vaporizable material in a predefined amount and/or ratio. In an aspect, a selection of Mix 1 1108 can result in the exemplary vapor device 900 engaging a single container containing a single type of vaporizable material or engaging a plurality of containers containing a different types of vaporizable material in varying amounts. The interface element Mix 2 1110 enables a user to engage one or more containers that contain vaporizable material in a predefined amount and/or ratio. In an aspect, a selection of Mix 2 1110 can result in the exemplary vapor device 900 engaging a single container containing a single type of vaporizable material or engaging a plurality of containers containing a different types of vaporizable material in varying amounts. In an aspect, a selection of New Mix 1112 can result in the exemplary vapor device 900 receiving a new mixture, formula, recipe, etc. ... of vaporizable materials and/or engage one or more containers that contain vaporizable material in the new mixture.

Upon selecting, for example, the Mix 1 1108, the user can be presented with user interface 1100c. User interface 1100c indicates to the user that Mix 1 has been selected via an indicator 1114. The user can be presented with options that control how the user wishes to experience the selected vapor. The user can be presented with interface elements Cool 1116, Filter 1118, and Smooth 1120. The interface element Cool 1116 enables a user to engage one or more cooling elements to reduce the temperature of the vapor. The interface element Filter 1118 enables a user to engage one or more filter elements to filter the air used in the vaporization process. The interface element Smooth 1120 enables a user to engage one or more heating casings, cooling elements, filter elements, and/or magnetic elements to provide the user with a smoother vaping experience.

Upon selecting New Mix 1112, the user can be presented with user interface 1100d. User interface 1100d provides the user with a container one ratio interface element 1122, a container two ratio interface element 1124, and Save 1126. The container one ratio interface element 1122 and the container two ratio interface element 1124 provide a user the ability to select an amount of each type of vaporizable material contained in container one and/or container two to utilize as a new mix. The container one ratio interface element 1122 and the container two ratio interface element 1124 can provide a user with a slider that adjusts the percentages of each type of vaporizable material based on the user dragging the slider. In an aspect, a mix can comprise 100% on one type of vaporizable material or any percent combination (e.g., 50/50, 75/25, 85/15, 95/5, etc. ... ). Once the user is satisfied with the new mix, the user can select Save 1126 to save the new mix for later use.

In the event a user selects the Aroma Mode 1104, the exemplary vapor device 900 will be configured to vaporize material and release the resulting vapor into the atmosphere. The user can be presented with user interface 1100b, 1100c, and/or 1100d as described above, but the resulting vapor will be released to the atmosphere.

In an aspect, the user can be presented with user interface 1100e. The user interface 1100e can provide the user with interface elements Identify 1128, Save 1130, and Upload 1132. The interface element Identify 1128 enables a user to engage one or more sensors in the exemplary vapor device 900 to analyze the surrounding environment. For example, activating the interface element Identify 1128 can engage a sensor to determine the presence of a negative environmental condition such as smoke, a bad smell, chemicals, etc. Activating the interface element Identify 1128 can engage a sensor to determine the presence of a positive environmental condition, for example, an aroma. The interface element Save 1130 enables a user to save data related to the analyzed negative and/or positive environmental condition in memory local to the exemplary vapor device 900. The interface element Upload 1132 enables a user to engage a network access device to transmit data related to the analyzed negative and/or positive environmental condition to a remote server for storage and/or analysis.

Figure 12:
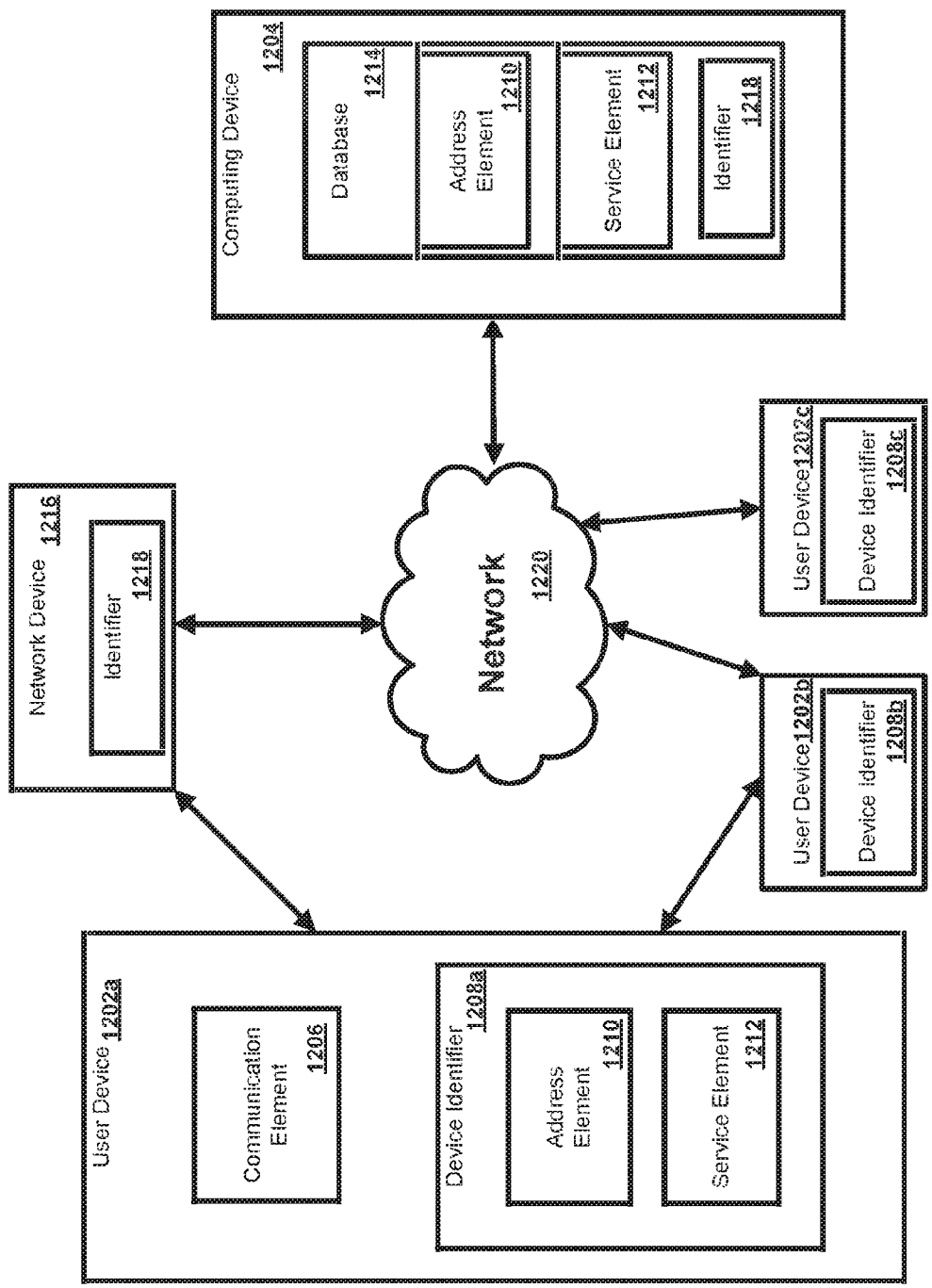
FIG. 12 illustrates an exemplary operating environment.

In one aspect of the disclosure, a system can be configured to provide services such as network-related services to a user device. FIG. 12 illustrates various aspects of an exemplary environment in which the present methods and systems can operate. The present disclosure is relevant to systems and methods for providing services to a user device, for example, electronic vapor devices which can include, but are not limited to, a vape-bot, micro-vapor device, vapor pipe, e-cigarette, hybrid handset and vapor device, and the like. Other user devices that can be used in the systems and methods include, but are not limited to, a smart watch (and any other form of "smart" wearable technology), a smartphone, a tablet, a laptop, a desktop, and the like. In an aspect, one or more network devices can be configured to provide various services to one or more devices, such as devices located at or near a premises. In another aspect, the network devices can be configured to recognize an authoritative device for the premises and/or a particular service or services available at the premises. As an example, an authoritative device can be configured to govern or enable connectivity to a network such as the Internet or other remote resources, provide address and/or configuration services like DHCP, and/or provide naming or service discovery services for a premises, or a combination thereof. Those skilled in the art will appreciate that present methods can be used in various types of networks and systems that employ both digital and analog equipment. One skilled in the art will appreciate that provided herein is a functional description and that the respective functions can be performed by software, hardware, or a combination of software and hardware.

The network and system can comprise a user device 1202a, 1202b, and/or 1202c in communication with a computing device 1204 such as a server, for example. The computing device 1204 can be disposed locally or remotely relative to the user device 1202a, 1202b, and/or 1202c. As an example, the user device 1202a, 1202b, and/or 1202c and the computing device 1204 can be in communication via a private and/or public network 1220 such as the Internet or a local area network. Other forms of communications can be used such as wired and wireless telecommunication channels, for example. In another aspect, the user device 1202a, 1202b, and/or 1202c can communicate directly without the use of the network 1220 (for example, via Bluetooth®, infrared, and the like).

In an aspect, the user device 1202a, 1202b, and/or 1202c can be an electronic device such as an electronic vapor device (e.g., vape-bot, micro-vapor device, vapor pipe, e-cigarette, hybrid handset and vapor device), a smartphone, a smart watch, a computer, a smartphone, a laptop, a tablet, a set top box, a display device, or other device capable of communicating with the computing device 1204. As an example, the user device 1202a, 1202b, and/or 1202c can comprise a communication element 1206 for providing an interface to a user to interact with the user device 1202a, 1202b, and/or 1202c and/or the computing device 1204. The communication element 1206 can be any interface for presenting and/or receiving information to/from the user, such as user feedback. An example interface can be communication interface such as a web browser (e.g., Internet Explorer, Mozilla Firefox, Google Chrome, Safari, or the like). Other software, hardware, and/or interfaces can be used to provide communication between the user and one or more of the user device 1202a, 1202b, and/or 1202c and the computing device 1204. In an aspect, the user device 1202a, 1202b, and/or 1202c can have at least one similar interface quality such as a symbol, a voice activation protocol, a graphical coherence, a startup sequence continuity element of sound, light, vibration or symbol. In an aspect, the interface can comprise at least one of lighted signal lights, gauges, boxes, forms, words, video, audio scrolling, user selection systems, vibrations, check marks, avatars, matrix', visual images, graphic designs, lists, active calibrations or calculations, 2D interactive fractal designs, 3D fractal designs, 2D and/or 3D representations of vapor devices and other interface system functions.

As an example, the communication element 1206 can request or query various files from a local source and/or a remote source. As a further example, the communication element 1206 can transmit data to a local or remote device such as the computing device 1204. In an aspect, data can be shared anonymously with the computing device 1204. The data can be shared over a transient data session with the computing device 1204. The transient data session can comprise a session limit. The session limit can be based on one or more of a number of puffs, a time limit, and a total quantity of vaporizable material. The data can comprise usage data and/or a usage profile. The computing device 1204 can destroy the data once the session limit is reached.

In an aspect, the user device 1202a, 1202b, and/or 1202c can be associated with a user identifier or device identifier 1208a, 1208b, and/or 1208c. As an example, the device identifier 1208a, 1208b, and/or 1208c can be any identifier, token, character, string, or the like, for differentiating one user or user device (e.g., user device 1202a, 1202b, and/or 1202c) from another user or user device. In a further aspect, the device identifier 1208a, 1208b, and/or 1208c can identify a user or user device as belonging to a particular class of users or user devices. As a further example, the device identifier 1208a, 1208b, and/or 1208c can comprise information relating to the user device such as a manufacturer, a model or type of device, a service provider associated with the user device 1202a, 1202b, and/or 1202c, a state of the user device 1202a, 1202b, and/or 1202c, a locator, and/or a label or classifier. Other information can be represented by the device identifier 1208a, 1208b, and/or 1208c.

In an aspect, the device identifier 1208a, 1208b, and/or 1208c can comprise an address element 1210 and a service element 1212. In an aspect, the address element 1210 can comprise or provide an internet protocol address, a network address, a media access control (MAC) address, an Internet address, or the like. As an example, the address element 1210 can be relied upon to establish a communication session between the user device 1202a, 1202b, and/or 1202c and the computing device 1204 or other devices and/or networks. As a further example, the address element 1210 can be used as an identifier or locator of the user device 1202a, 1202b, and/or 1202c. In an aspect, the address element 1210 can be persistent for a particular network.

In an aspect, the service element 1212 can comprise an identification of a service provider associated with the user device 1202a, 1202b, and/or 1202c and/or with the class of user device 1202a, 1202b, and/or 1202c. The class of the user device 1202a, 1202b, and/or 1202c can be related to a type of device, capability of device, type of service being provided, and/or a level of service. As an example, the service element 1212 can comprise information relating to or provided by a communication service provider (e.g., Internet service provider) that is providing or enabling data flow such as communication services to and/or between the user device 1202a, 1202b, and/or 1202c. As a further example, the service element 1212 can comprise information relating to a preferred service provider for one or more particular services relating to the user device 1202a, 1202b, and/or 1202c. In an aspect, the address element 1210 can be used to identify or retrieve data from the service element 1212, or vice versa. As a further example, one or more of the address element 1210 and the service element 1212 can be stored remotely from the user device 1202a, 1202b, and/or 1202c and retrieved by one or more devices such as the user device 1202a, 1202b, and/or 1202c and the computing device 1204. Other information can be represented by the service element 1212.

In an aspect, the computing device 1204 can be a server for communicating with the user device 1202a, 1202b, and/or 1202c. As an example, the computing device 1204 can communicate with the user device 1202a, 1202b, and/or 1202c for providing data and/or services. As an example, the computing device 1204 can provide services such as data sharing, data syncing, network (e.g., Internet) connectivity, network printing, media management (e.g., media server), content services, streaming services, broadband services, or other network-related services. In an aspect, the computing device 1204 can allow the user device 1202a, 1202b, and/or 1202c to interact with remote resources such as data, devices, and files. As an example, the computing device can be configured as (or disposed at) a central location, which can receive content (e.g., data) from multiple sources, for example, user devices 1202a, 1202b, and/or 1202c. The computing device 1204 can combine the content from the multiple sources and can distribute the content to user (e.g., subscriber) locations via a distribution system.

In an aspect, one or more network devices 1216 can be in communication with a network such as network 1220. As an example, one or more of the network devices 1216 can facilitate the connection of a device, such as user device 1202a, 1202b, and/or 1202c, to the network 1220. As a further example, one or more of the network devices 1216 can be configured as a wireless access point (WAP). In an aspect, one or more network devices 1216 can be configured to allow one or more wireless devices to connect to a wired and/or wireless network using Wi-Fi, Bluetooth or any desired method or standard.

In an aspect, the network devices 1216 can be configured as a local area network (LAN). As an example, one or more network devices 1216 can comprise a dual band wireless access point. As an example, the network devices 1216 can be configured with a first service set identifier (SSID) (e.g., associated with a user network or private network) to function as a local network for a particular user or users. As a further example, the network devices 1216 can be configured with a second service set identifier (SSID) (e.g., associated with a public/community network or a hidden network) to function as a secondary network or redundant network for connected communication devices.

In an aspect, one or more network devices 1216 can comprise an identifier 1218. As an example, one or more identifiers can be or relate to an Internet Protocol (IP) Address IPV4/IPV6 or a media access control address (MAC address) or the like. As a further example, one or more identifiers 1218 can be a unique identifier for facilitating communications on the physical network segment. In an aspect, each of the network devices 1216 can comprise a distinct identifier 1218. As an example, the identifiers 1218 can be associated with a physical location of the network devices 1216.

In an aspect, the computing device 1204 can manage the communication between the user device 1202a, 1202b, and/or 1202c and a database 1214 for sending and receiving data therebetween. As an example, the database 1214 can store a plurality of files (e.g., web pages), user identifiers or records, or other information. In one aspect, the database 1214 can store user device 1202a, 1202b, and/or 1202c usage information (including chronological usage), type of vaporizable and/or non-vaporizable material used, frequency of usage, location of usage, recommendations, communications (e.g., text messages, advertisements, photo messages), simultaneous use of multiple devices, and the like). The database 1214 can collect and store data to support cohesive use, wherein cohesive use is indicative of the use of a first electronic vapor devices and then a second electronic vapor device is synced chronologically and logically to provide the proper specific properties and amount of vapor based upon a designed usage cycle. As a further example, the user device 1202a, 1202b, and/or 1202c can request and/or retrieve a file from the database 1214. The user device 1202a, 1202b, and/or 1202c can thus sync locally stored data with more current data available from the database 1214. Such syncing can be set to occur automatically on a set time schedule, on demand, and/or in real-time. The computing device 1204 can be configured to control syncing functionality. For example, a user can select one or more of the user device 1202a, 1202b, and/or 1202c to never by synced, to be the master data source for syncing, and the like. Such functionality can be configured to be controlled by a master user and any other user authorized by the master user or agreement.

In an aspect, the computing device 1204 can generate recommendation data. The recommendation data can comprise a recommendation for a vaporizable material that a user has not used, a recommendation for a vaporizable material that a user has used, a recommendation for a mixture of two or more vaporizable materials that a user has not used, a recommendation for a mixture of two or more vaporizable materials that a user has used, a recommendation for a brand, a recommendation for a sale, a recommendation for a retailer, a recommendation for a manufacturer, a recommendation for an event, a recommendation for a social network, or a combination thereof. The central server can determine the recommendation data based on data received from at least one of a retailer, a manufacturer, an electronic device user, a vapor device user, a social network, or a combination thereof. The recommendation data can be generated in response to receiving usage data from the user device 1202a, 1202b, and/or 1202c and can be provided back to one or more of the user device 1202a, 1202b, and/or 1202c.

The computing device 1204 can utilize one or more recommendation systems/methods. For example, the computing device 1204 can utilize a non-personalized systems recommend products to individual consumers based on averaged information about the products provided by other consumers. Examples of non-personalized product recommendation systems are those of Amazon.com and Moviefinder.com. The same product recommendations are made to all consumers seeking information about a particular product(s) and all product recommendations are completely independent of any particular consumer.

The computing device 1204 can utilize an item-to-item systems recommend other products to an individual consumer based on relationships between products already purchased by the consumer or for which the consumer has expressed an interest. The relationships employed typically are brand identity, fragrance, sales appeal, market distribution, and the like. In all cases the information on which the relationships are based is implicit. In other words, no explicit input regarding what the consumer is looking for or prefers is solicited by these systems. Rather, techniques such as data mining are employed to find implicit relationships between products for which the individual consumer has expressed a preference and other products available for purchase. The actual performance of products or whether the consumer (or other consumers) ultimately did prefer the products purchased play no part in formulating recommendations with these types of systems.

The computing device 1204 can utilize an attribute-based recommendation systems utilize syntactic properties or descriptive "content" of available products to formulate their recommendations. In other words, attribute-based systems assume that the attributes of products are easily classified and that an individual consumer knows which classification he or she should purchase without help or input from the recommendation system.

The computing device 1204 can utilize a content-based filtering recommendation systems are based on a description of the item and a profile of the user's preference. In a content-based recommender system, keywords are used to describe the items and a user profile is built recommendation system indicate the type of item this user likes. In other words, these algorithms try to recommend items that are similar to those that a user liked in the past (or is examining in the present). In particular, various candidate items are compared with items previously rated by the user and the best-matching items are recommended.

The computing device 1204 can utilize a collaborative filtering (also referred to as social-information filtering) recommendation system that typically records an extended product preference set that can be matched with a collaborative group. In other words, collaborative filters recommend products that "similar users" have rated highly. Often the social-information is a similar pattern of product preferences.

In an aspect, data can be derived by system and/or device analysis. Such analysis can comprise at least by one of instant analysis performed by the user device 1202a, 1202b, and/or 1202c or archival data transmitted to a third party for analysis and returned to the user device 1202a, 1202b, and/or 1202c and/or computing device 1204. The result of either data analysis can be communicated to a user of the user device 1202a, 1202b, and/or 1202c to, for example, inform the user of their eVapor use and/or lifestyle options. In an aspect, a result can be transmitted back to at least one authorized user interface.

In an aspect, the database 1214 can store information relating to the user device 1202a, 1202b, and/or 1202c such as the address element 1210 and/or the service element 1212. As an example, the computing device 1204 can obtain the device identifier 1208a, 1208b, and/or 1208c from the user device 1202a, 1202b, and/or 1202c and retrieve information from the database 1214 such as the address element 1210 and/or the service elements 1212. As a further example, the computing device 1204 can obtain the address element 1210 from the user device 1202a, 1202b, and/or 1202c and can retrieve the service element 1212 from the database 1214, or vice versa. Any information can be stored in and retrieved from the database 1214. The database 1214 can be disposed remotely from the computing device 1204 and accessed via direct or indirect connection. The database 1214 can be integrated with the computing device 1204 or some other device or system. Data stored in the database 1214 can be stored anonymously and can be destroyed based on a transient data session reaching a session limit.

Figure 13:
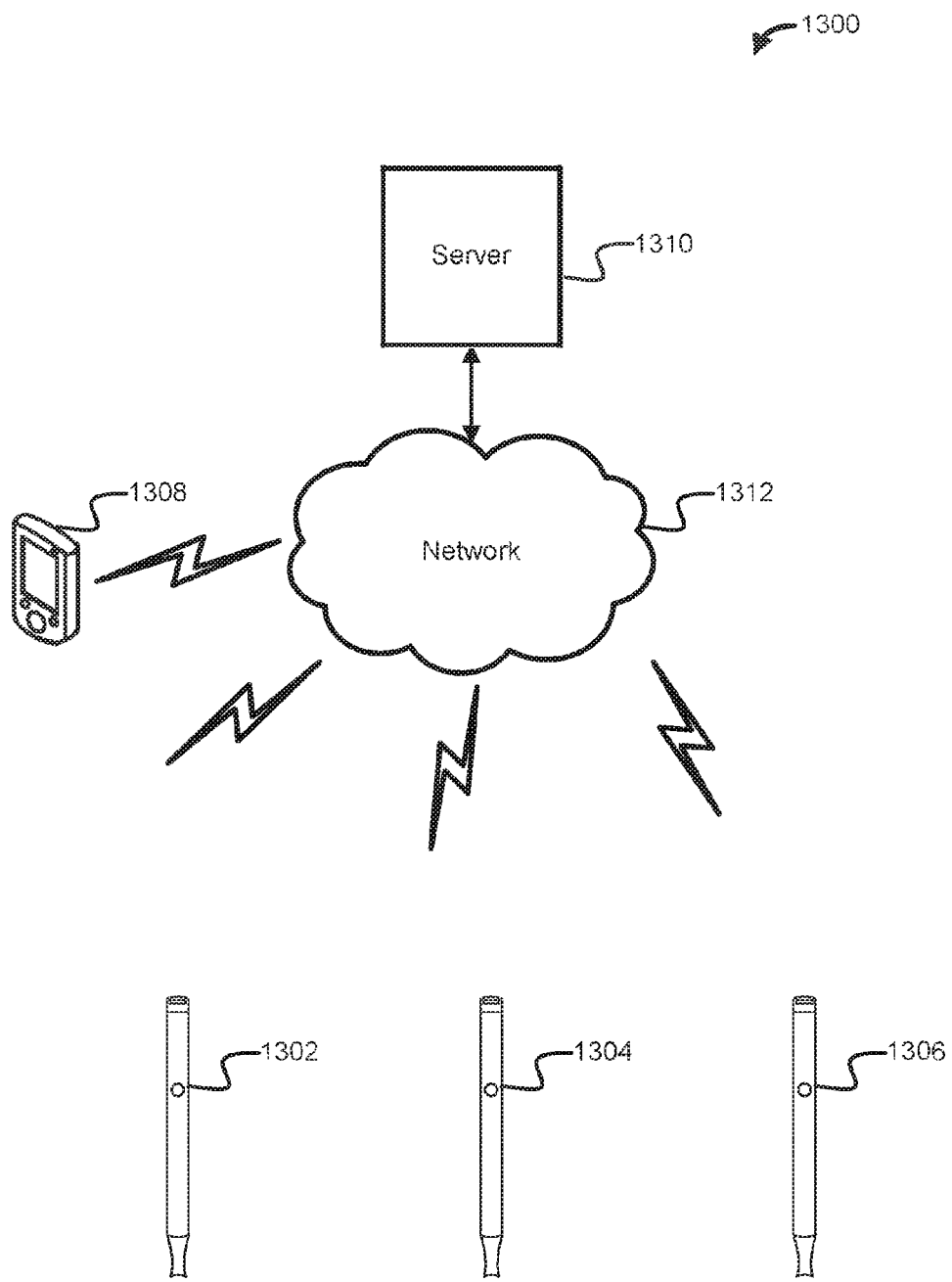
FIG. 13 illustrates another exemplary operating environment.

FIG. 13 illustrates an ecosystem 1300 configured for sharing and/or syncing data such as usage information (including chronological usage), type of vaporizable and/or non-vaporizable material used, frequency of usage, location of usage, recommendation data, communications (e.g., text messages, advertisements, photo messages), simultaneous use of multiple devices, and the like) between one or more devices such as a vapor device 1302, a vapor device 1304, a vapor device 1306, and an electronic communication device 1308. In an aspect, the vapor device 1302, the vapor device 1304, the vapor device 1306 can be one or more of an e-cigarette, an e-cigar, an electronic vapor modified device, a hybrid electronic communication handset coupled/integrated vapor device, a micro-sized electronic vapor device, or a robotic vapor device. In an aspect, the electronic communication device 1308 can comprise one or more of a smartphone, a smart watch, a tablet, a laptop, and the like.

In an aspect data generated, gathered, created, etc., by one or more of the vapor device 1302, the vapor device 1304, the vapor device 1306, and/or the electronic communication device 1308 can be uploaded to and/or downloaded from a central server 1310 via a network 1312, such as the Internet. Such uploading and/or downloading can be performed via any form of communication including wired and/or wireless. In an aspect, the vapor device 1302, the vapor device 1304, the vapor device 1306, and/or the electronic communication device 1308 can be configured to communicate via cellular communication, WiFi communication, Bluetooth® communication, satellite communication, and the like. The central server 1310 can store uploaded data and associate the uploaded data with a user and/or device that uploaded the data. The central server 1310 can access unified account and tracking information to determine devices that are associated with each other, for example devices that are owned/used by the same user. The central server 1310 can utilize the unified account and tracking information to determine which of the vapor device 1302, the vapor device 1304, the vapor device 1306, and/or the electronic communication device 1308, if any, should receive data uploaded to the central server 1310.

In an aspect, the uploading and downloading can be performed anonymously. The data can be shared over a transient data session with the central server 1310. The transient data session can comprise a session limit. The session limit can be based on one or more of a number of puffs, a time limit, and a total quantity of vaporizable material. The data can comprise usage data and/or a usage profile. The central server 1310 can destroy the data once the session limit is reached. While the transient data session is active, the central server 1310 can provide a usage profile to one of the vapor device 1302, the vapor device 1304, the vapor device 1306 to control the functionality for the duration of the transient data session.

For example, the vapor device 1302 can be configured to upload usage information related to vaporizable material consumed and the electronic communication device 1308 can be configured to upload location information related to location of the vapor device 1302. The central server 1310 can receive both the usage information and the location information, access the unified account and tracking information to determine that both the vapor device 1302 and the electronic communication device 1308 are associated with the same user. The central server 1310 can thus correlate the user's location along with the type, amount, and/or timing of usage of the vaporizable material. The central server 1310 can further determine which of the other devices are permitted to receive such information and transmit the information based on the determined permissions. In an aspect, the central server 1310 can transmit the correlated information to the electronic communication device 1308 which can then subsequently use the correlated information to recommend a specific type of vaporizable material to the user when the user is located in the same geographic position indicated by the location information.

In another aspect, the central server 1310 can provide one or more social networking services for users of the vapor device 1302, the vapor device 1304, the vapor device 1306, and/or the electronic communication device 1308. Such social networking services include, but are not limited to, messaging (e.g, text, image, and/or video), mixture sharing, product recommendations, location sharing, product ordering, and the like.

In an aspect, the vapor device 1302, the vapor device 1304, and/or the vapor device 1306 can be in communication with the electronic communication device 1308 to enable the electronic communication device 1308 to generate a user interface to display information about and to control one or more functions/features of the vapor device 1302, the vapor device 1304, and/or the vapor device 1306. The electronic communication device 1308 can request access to one or more of the vapor device 1302, the vapor device 1304, and/or the vapor device 1306 from the central server 1310. The central server 1310 can determine whether or not the electronic communication device 1308 (or a user thereof) is authorized to access the one or more of the vapor device 1302, the vapor device 1304, and/or the vapor device 1306. If the central server 1310 determines that access should be granted, the central server 1310 can provide an authorization token to the electronic communication device 1308 (or to the vapor device 1302, the vapor device 1304, and/or the vapor device 1306 on behalf of the electronic communication device 1308). Upon receipt of the authorization token, the one or more of the vapor device 1302, the vapor device 1304, and/or the vapor device 1306 can partake in a communication session with the electronic communication device 1308 whereby the electronic communication device 1308 generates a user interface that controls one or more functions/features of and displays information about the one or more of the vapor device 1302, the vapor device 1304, and/or the vapor device 1306.

Figure 14:
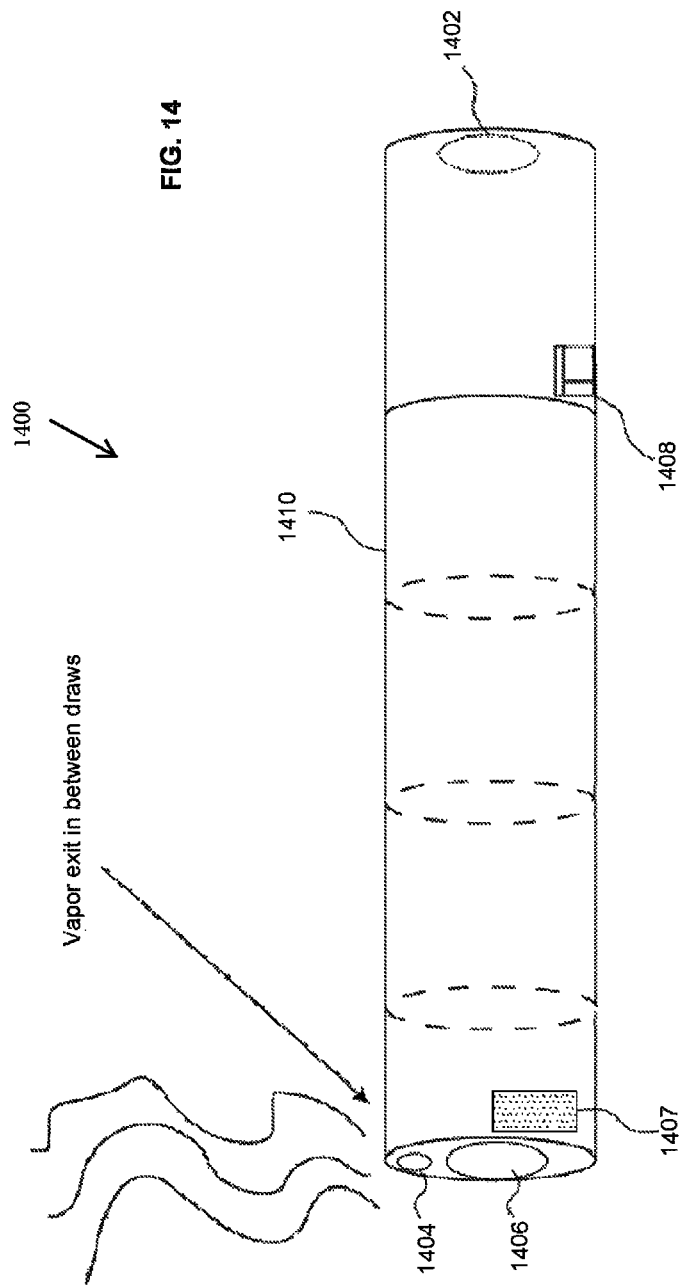
FIG. 14 is a schematic diagram illustrating aspects of a system or device for resembling a traditional smoking article.

FIG. 14 illustrates a personal vaporizer 1400 configured for simulating effects of a traditional smoking article. The personal vaporizer 1400 includes an outer casing 1410. The personal vaporizer 1400 can comprise any suitable component for providing vapor to a user. Generally, the personal vaporizer 1400 is an electronic device for use in providing a vapor output and typically includes a processor. The outer casing 1410 may be designed to resemble at least one of a cigarette, a cigar, a hookah, a bowl, a bong, a pipe, a water pipe, a one hitter, a joint, a blunt, a chillum or a steamroller. In some embodiments, the outer casing 1410 may be designed to resemble a wearable or other item such as a pendant, jewelry, a watch, an accessory or headphones. The outer casing 1410 may also define a main outlet 1402 and a secondary outlet 1404. The device 1400 may also include a heating element (such as a vaporizer, not shown) coupled to one or more containers (not shown). The vaporizer may be coupled to the main outlet 1402. A user may activate the vaporizer either via an input coupled to the outer casing 1410, a remote input, or by suction applied at the main outlet 1402.

When the main vaporizer is activated, it may vaporize or nebulize a vaporizable or non-vaporizable material held within the containers. The vapor may then be allowed to pass through the main outlet 1402 as suction is applied at the main outlet 1402 such that the vapor may simulate the look and the feel of traditional smoke.

Traditional smoking articles, however, produce smoke, light, and sound even when suction is not applied to the smoking device. For example, as a user stops drawing on a cigarette, the burning ember at the end of the cigarette generates smoke. Similarly, as a user is drawing on a cigarette, the burning embers become brighter and creates a "sizzling" sound effect. In order to replicate these effects, the device 1400 includes the second outlet 1404, a combustion or light-emitting element 1406, and a speaker 1407. A processor 1408 may control the vaporizer, a secondary vaporizer, and/or a switch to control the output of vapor through the second outlet 1404 to resemble a traditional smoking article. Also or instead, a valve may be controlled mechanically so that while suction is being applied to the main outlet 1402, the valve prevents or reduces the amount of vapor flowing to the second outlet 1404, and as the amount of suction applied to the main outlet 1402 is decreased, an amount of vapor flowing through the second outlet 1404 increases.

The processor 1408 may also be capable of controlling the combustion or light-emitting element 1406 and the speaker 1407. For example, as suction is applied through the main outlet 1402, the processor 1408 may control the combustion or light-emitting element 1406 and/or the speaker 1407 to resemble the glow and/or the "crackling" sound of a traditional smoking article. Thus, the device 1400 may be a vaporizer device capable of simulating major aspects of a traditional smoking article.

Figure 15:
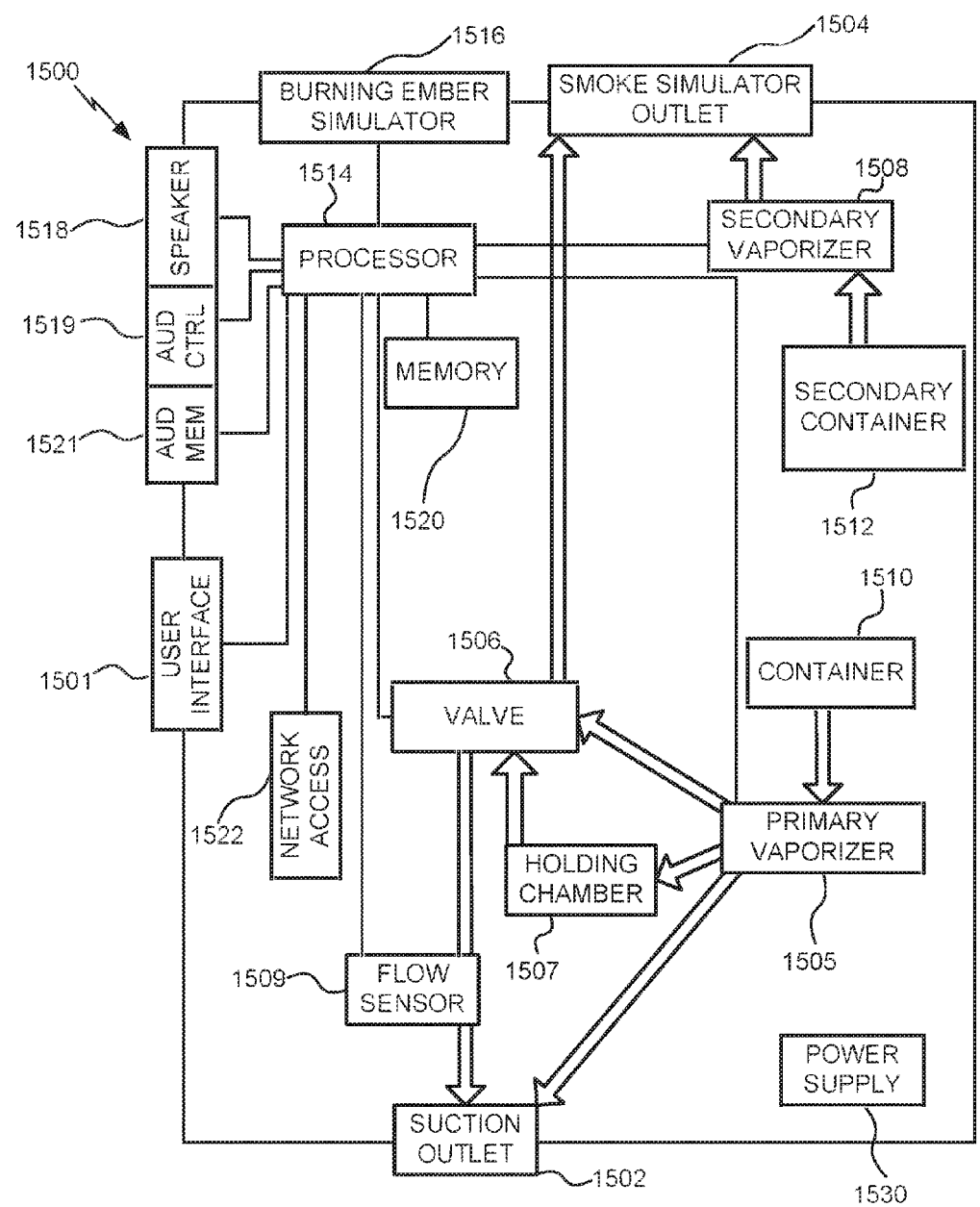
FIG. 15 is a block diagram of a vapor device illustrating aspects for resembling the look and sound of a traditional smoking article.

With reference now to FIG. 15, a smoking simulator vapor device 1500 may include similar features as the device 1400. FIG. 15 is a block diagram illustrating aspects of the smoking simulating vapor device 1500. The device 1500 may include a suction outlet, or main outlet, 1502 and a smoke simulator outlet, or secondary outlet, 1504. In various embodiments, the two outlets 1502, 1504 may be placed on opposite ends of the device 1500. In various embodiments, when the device 1500 has an outer casing resembling a smoking article having more than a longitudinal body, such as a pipe, the second outlet 1504 may be positioned near where the burning embers would be on the smoking article and the main outlet 1502 may be positioned where a user traditionally draws from the smoking article. The device 1500 may also include a power supply 1530. The power supply 1530 may supply power to all electronic components of the device 1500. For example, the power supply may include a battery or other power source capable of off-the-grid power, or may be connected to an external power source.

The device 1500 may also include a primary vaporizer 1505. The primary vaporizer 1505 may be coupled to one or more containers 1510. Each of the one or more containers 1510 may be configured to hold one or more vaporizable materials. The primary vaporizer 1505 may receive the vaporizable or non-vaporizable material from the one or more containers 1510 and heat the materials until they achieve a vapor state. In various embodiments, instead of heating the material, the primary vaporizer 1505 may nebulize or otherwise cause the material of the containers 1510 to become particulates. In various embodiments, the container may include a compressed liquid that is released to the primary vaporizer 1505 via a valve or another mechanism. In various embodiments, the container may include a wick (not shown) through which the material is drawn to the primary vaporizer 1505. The container 1510 may be made of any suitable structural material, such as, an organic polymer, metal, ceramic, composite, or glass material.

The processor 1514 may be, or may include, any suitable microprocessor or microcontroller, for example, a low-power application-specific controller (ASIC) and/or a field programmable gate array (FPGA) designed or programmed specifically for the task of controlling a device as described herein, or (less preferably) a general purpose central processing unit (CPU), for example, one based on 80×86 architecture as designed by Intel™ or AMD™, or a system-on-a-chip as designed by ARM™. The processor 1514 may be communicatively coupled to auxiliary devices or modules of the vaporizing apparatus 1500 using a bus or other coupling.

The device 1500 may include a memory device 1520 operatively coupled to the processor 1514. The memory device 1520 may include a random access memory (RAM) holding program instructions and data for rapid execution or processing by the processor 1514 during control of the device 1500. When the device 1500 is powered off or in an inactive state, program instructions and data may be stored in a long-term memory, for example, a non-volatile magnetic optical, or electronic memory storage device (not shown). Either or both of the RAM or the storage device may comprise a non-transitory computer-readable medium holding program instructions that, when executed by the processor 1514, cause the device 1500 to perform a method or operations described herein. Program instructions may be written in any suitable high-level language, for example, C, C++, C# or the Java™, and compiled to produce machine-language code for execution by the processor 1514.

The device 1500 may include a network access device 1522 allowing the device 1500 to be communicatively coupled to an ancillary device (not shown) such as via an access point (not shown) of a wireless telephone network, local area network, or other coupling to a wide area network, for example, the Internet. In that regard, the processor 1514 may share data with the ancillary device via the network access device 1522. The shared data may include usage data or operational data of the device 1500, the status of the device 1500, the status or operating condition of each of the components of the device 1500, or any other data. Similarly, the processor 1514 may receive control instructions from the ancillary device via the network access device 1522. For example, a configuration of the device 1500, operation of the device 1500, or other settings of the device 1500, may be controlled by the ancillary device via the network access device 1522.

The device 1500 may also include a user interface 1501 coupled to one or more of the processor 1514, the primary vaporizer 1505, the secondary vaporizer 1508, the valve 1506, the network access 1522, and/or any other electronic component of the device 1500. Input may be received from a user or another device and/or output may be provided to a user or another device via the user interface 1501. The user interface 1501 may comprise an interface port such as a wired interface, for example a serial port (not shown) such as a Universal Serial Bus (USB) port, an Ethernet port, or other suitable wired connection. The user interface 1501 may comprise a wireless interface, for example a transceiver (not shown) using any suitable wireless protocol, for example Wifi (IEEE 802.11), Bluetooth™, infrared, or other wireless standard. The user interface 1501 may also or instead include at least one of a touchscreen for both displaying output and receiving user input, a display and/or a speaker for outputting visual output, a button, knob, and/or a dial for receiving user input.

Input from the user interface 1501 may be result in the processor 1514 controlling the primary vaporizer 1505 and/or the secondary vaporizer 1508 to vaporize the vaporizable material. For example, a user may depress a button, causing the primary vaporizer 1505 to start vaporizing material. A user may then draw on the suction outlet 1502 to inhale the vapor. In various embodiments, the processor 1514 may control vapor production and flow to the suction outlet 1502 based on data detected by the flow sensor 1509. For example, as a user draws on the suction outlet 1502, the flow sensor 1509 may detect this pressure. In response, the processor 1514 may cause the primary vaporizer 1505 to begin vaporizing material.

Figure 16:
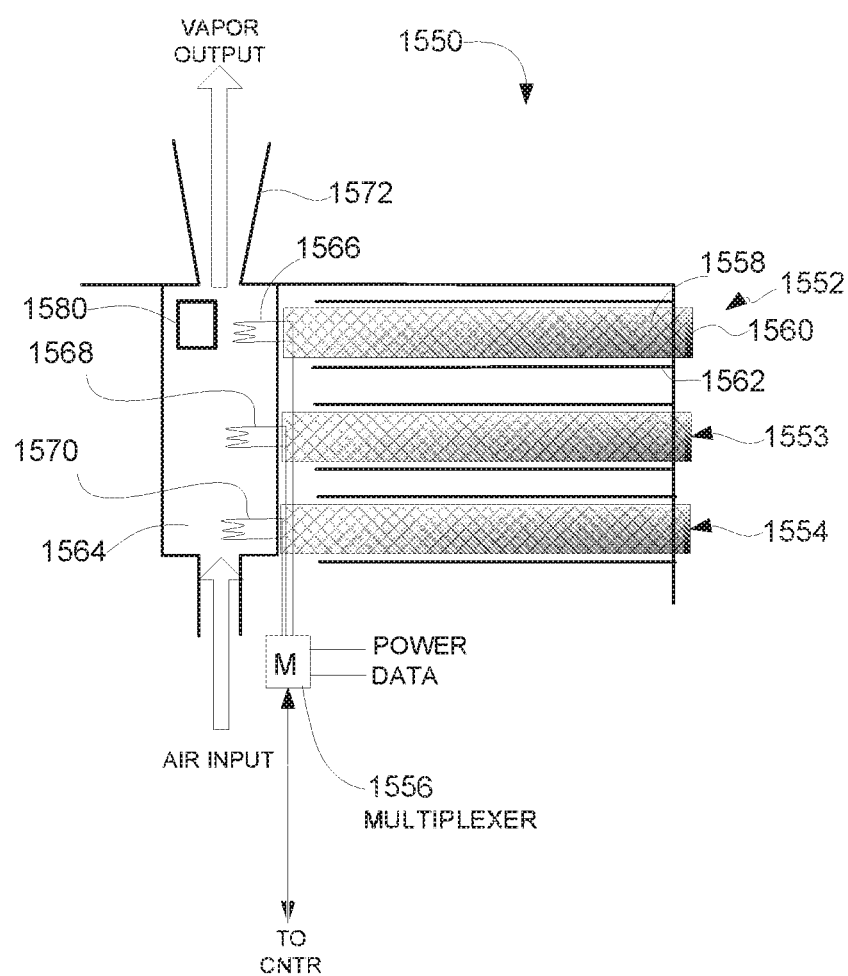
FIG. 16 illustrates an exemplary vaporizer.

With reference now to FIG. 15 and FIG. 16, another exemplary vaporizer 1550 is shown. The vaporizer 1550 may be used internally of the device 1500 or may be a separate device. Any vaporizer disclosed herein can be used. For example, the vapor device 1550 may in place of the primary vaporizer 1505 and/or the secondary vaporizer 1508. The vaporizer 1550 illustrates various aspects of using a personal vaporizer.

The vaporizer 1550 may include or be coupled to one or more containers 1560 containing a vaporizable material, for example a fluid. For example, coupling may be via a wick 1558, via a valve, or by some other structure. The coupling mechanism may operate independently of gravity, such as by capillary action or pressure drop through a valve. The vaporizer 1550 may be configured to vaporize the vaporizable material from one or more containers 1560 at controlled rates, in response to mechanical input from a component of the device 1500, and/or in response to control signals from the processor 1514 or another component. Vaporizable material (e.g., fluid) may be supplied by replaceable cartridges 1552, 1553, 1554. Each of the cartridges 1552, 1553, 1554 may include a container 1560 for a vaporizable material. If material is liquid, the cartridge may include a wick 1558 to aid in transporting the liquid to the vaporizing element 1566. In the alternative, some other transport mode may be used. Each of the cartridges 1552, 1553, 1554 may be configured to fit inside and engage removably with a receptacle (such as the container 1510 and/or the secondary container 1512) of the device 1500. In an alternative, or in addition, one or more fluid containers 1560 may be fixed in the device 1500 and configured to be refillable. In that regard, one or more materials may be vaporized at a single time by the vaporizer 1550. For example, some material may be vaporized and drawn through the suction outlet 1502 and/or some material may be vaporized and exhausted via the smoke simulator outlet 1504.

In operation, a heating element 1580 may vaporize or nebulize the vaporizable material in a mixing chamber 1564, producing an inhalable mist that is expelled via an exhaust port 1572. In embodiments, the heating element 1580 may include a heater coupled to a wick (or a heated wick) 1566, 1568, 1570 operatively coupled to (for example, in fluid communication with) the mixing chamber 1564. The heating element 1580 may include a nickel-chromium wire or the like, with a temperature sensor (not shown) such as a thermistor or thermocouple. Within definable limits, by controlling power to each of the heated wicks 1564, 1568, 1570, a rate of vaporization may be independently controlled at each wick. A multiplexer 1556 may receive power (P) from any suitable source and exchange data signals (D) with the processor 1514 for control of the vaporizers. At minimum, control may be provided between no power (off state) and one or more powered states. Other control mechanisms may also be suitable.

Returning to FIG. 15, the device 1500 may also include a flow sensor, or other sensor, 1509 capable of detecting a state of the device 1500. For example, the flow sensor 1509 may detect a rate of flow of material through the suction outlet 1502. In some embodiments, the flow sensor 1509 may include a pressure sensor capable of detecting a pressure applied at the suction outlet 1502.

In some embodiments, the processor 1514 may receive the data detected from the sensor 1509 and determine a state of the device 1500. The state may include, for example, whether the primary vaporizer 1505 is generating vapor, whether vapor is being drawn from the suction outlet 1502, whether the draw from the suction outlet 1502 is increasing or decreasing in pressure or velocity, whether draw from the suction outlet 1502 has recently begun or recently ended, whether the device 1500 is in an "on" state or an "off" state, whether the device 1500 has recently switched from the "off" state to the "on" state, and/or whether a predetermined amount of time has expired since the vapor device was last used. In some embodiments, the processor 1514 may determine the state of the device 1500 without use of the flow sensor 1509. For example, the processor 1514 may be coupled to the primary vaporizer 1505 and determine whether the vaporizer 1505 is vaporizing a material. In some embodiments, the device 1500 may include an input which a user selects when he wishes for the device 1500 to vaporize a material. The processor 1514 may be coupled to the input and may determine whether a user is requesting the primary vaporizer 1505 to vaporize a material, whether the user has requested that vapor production stop, or another indicator of the state of the vapor device 1500.

The device 1500 may also include a burning ember simulator 1516 which may include a lighting element and/or a combustion element. A lighting and/or combustion element may include, for example, a traditional light bulb, an LED, a microelectromechanical systems (MEMS) device, a coil or other resistive element coupled to a power supply and configured to output power in the form of heat and/or light, or other device capable of generating and outputting heat and/or light. The heat and/or light generated by the burning ember simulator 1516 may visually resemble the burning embers of a traditional smoking device.

In that regard, the processor 1514 may control the burning ember simulator 1516 based on the state of the device 1500 so that the burning ember simulator 1516 resembles burning embers of a traditional smoking article. For example, the processor 1514 may cause the burning ember simulator 1516 to generate a brighter light and/or additional heat when a user is drawing on the suction outlet 1502 than when no suction is applied at the suction outlet 1502. Likewise, as time since a previous draw increases, the processor 1514 may cause the burning ember simulator 1516 to output less light and/or heat.

The device 1500 may also include a speaker 1518 and an audio controller, or audio chip, 1519 capable of causing the speaker 1518 to output a "crackling" sound that resembles the sound of burning embers of a traditional smoking device. In some embodiments, the audio controller 1519 may be a micro sound chip. In some embodiments, the speaker 1518 may also be designed to output other sounds resembling smoking articles, or other unrelated sounds. For example, the speaker 1518 may also be designed to output a "bubbling" sound resembling use of a bong. In some embodiments, the speaker 1518 may be controlled by another device, such as a processor 1514.

In some embodiments, the audio controller 1519 and/or the device 1500 includes an audio memory 1521 containing instructions for playing predetermined sounds and/or containing one or more sound files to be output via the speaker 1518. Additionally or instead, the audio controller 1519 may be microcoded or hard-wired to play predetermined sounds. In some embodiments, the audio controller 1519 may cause the speaker 1518 to output sound as it is stored in the memory 1521, microcoded, and/or hard-wired. However, in some embodiments, the processor 1514 may instruct/cause the audio controller 1519 to output the sound with one or more adjusted characteristics. The characteristics can include, for example, a tone, a volume, a pitch, a number of harmonics, or a frequency of one or more harmonics.

In some embodiments, the audio controller 1519 may be able to adjust a characteristic of sound based on an input. For example, when a user begins to draw on the suction outlet 1502, the flow sensor 1509 may detect the draw. The processor may receive the data from the flow sensor 1509 and determine that the current state is a beginning of a draw and may cause the speaker 1518, directly or via the audio controller 1519, to output a "sizzling" sound that resembles a traditional smoking article. After a period of time, the flow sensor 1509 may detect that a rate of flow (or a negative pressure) is increasing. The processor may determine that the state of the device 1500 corresponds to an increased force of the draw. The processor 1514 may then cause the speaker 1518 to increase the volume, pitch, or other characteristic of the recorded "sizzling" sound.

In some embodiments, the memory 1520 may include instructions for generating sound and/or sound files, and in some embodiments the processor 1514 may be microcoded and/or hard-wired to play sound files. In that regard, the instructions may be performed by the processor 1514 which may directly control the speaker 1518 and/or may instruct the controller 1519 to control the speaker to output one or more sounds.

In some embodiments, the audio memory 1521 and/or the memory 1520 may include sounds other than "sizzling" sounds. For example, one or both memories 1520, 1521 may store musical notes, voices, music, or other unrelated sounds such as clapping, stomping, birds chirping, or the like. In some aspects, the processor 1514 may communicate with another device, such as another device similar to the device 1500, via the network access 1522 and/or user interface 1501. Data may be shared between the devices including synchronizing audio output. The device 1500 may transmit and/or receive data from one or more other devices indicating that a particular sound will be played in sync with other devices. For example, if more than one device is present at a concert or other audience event, one or more of the devices may be instructed, such as via a user input or data received from an ancillary device, to cause synchronous audio to be output. The devices may communicate so that the output audio will be synchronized and then each output the audio data. This can provide a source of entertainment at group events, may show an increased level of support (such as synchronous cheering or rally chants at a sporting event), may show pleasure with a performance (such as synchronous clapping at a play), or the like. In a related aspect, the processor 1514 can control the burning ember simulator 1516 in a similar manner so that many devices can output synchronized light and/or heat at an event, and/or the device 1500 so that vapor flows through the smoke simulator outlet 1504 in sync with other devices.

In some embodiments, the device 1500 may include a valve 1506 that is in operative communication with the smoke simulator outlet 1504 and the suction outlet 1502. The valve 1506 may receive the vaporized or nebulized material from the primary vaporizer 1505 and may allow the vaporized material to flow to one or more of the smoke simulator outlets 1504 or the suction outlets 1502 based on physical input (such as suction) and/or instructions from a processor 1514.

Based on the determined state of the device 1500, the processor 1514 may control the valve 1506 to direct air through one or more of the smoke simulator outlets 1504 or the suction outlets 1502 in order to simulate a traditional smoking article.

In various embodiments, the device 1500 may include additional components within the vapor systems than the primary vaporizer 1505 and the valve 1506 for controlling the amount of vapor flowing through the smoke simulator outlet 1504 and/or the suction outlet 1502. For example, the device 1500 may include a holding chamber 1507. The holding chamber 1507 may be a volume within the device 1500 capable of receiving vapor from the primary vaporizer 1505 and retaining the vapor until instructed otherwise. For example, as a user stops drawing via the suction outlet 1502, the valve 1506 may change states (either in response to mechanical or electrical input) such that the vapor from the holding chamber 1507 can flow to the smoke simulator outlet 1504. In a similar aspect, the primary vaporizer 1505 may continue to vaporize material after a user stops drawing or stops requesting that the vaporizer continue to generate vapor (such as by releasing a "trigger.") This additional vapor may be directed to the smoke simulator outlet 1504, such as via the valve 1506. In various embodiments, the primary vaporizer 1505 may be directly coupled to the suction outlet 1502 and/or the smoke simulator outlet 1504, and/or the holding chamber 1507.

In some embodiments, the device 1500 may include a secondary vaporizer 1508 in communication with the container 1510. The secondary vaporizer 1508 may be in operative communication with the smoke simulator outlet 1504. In that regard, the secondary vaporizer 1508 may receive a vaporizable or non-vaporizable material from the container 1510 and/or a secondary container 1512. Based on the state of the device 1500, the processor 1514 may control the secondary vaporizer 1508 to vaporize and/or stop vaporizing the material. In embodiments using the secondary vaporizer 1508, the primary vaporizer 1505 may be directly coupled to the suction outlet 1502. In that regard, the valve 1506 may be unnecessary as the vapor from the secondary vaporizer 1508 can flow directly to the smoke simulator outlet 1504 and the vapor from the primary vaporizer 1505 can flow directly to the suction outlet 1502.

In various embodiments, the valve 1506 may be controlled mechanically. For example, as suction is applied via the suction outlet 1502, the pressure applied by the suction may cause the valve 1506 to open a channel between the primary vaporizer 1505 and the suction outlet 1502 such as, for example, via the valve 1506 and/or the holding chamber 1507. For example, the valve may be a ball valve such that suction via the suction outlet 1502 causes the floating ball to move into a position which allows vapor to flow through the valve 1506 from the primary vaporizer 1505 to the suction outlet 1502. When suction is no longer applied at the suction outlet 1502, the lack of pressure may cause a channel to open from the primary vaporizer 1505 and/or the holding chamber 1507 to the smoke simulator outlet 1504. In that regard, the additional vapor generated by the primary vaporizer 1505 and/or the vapor held within the holding chamber 1507 may be allowed to exit the device via the smoke simulator outlet 1504. Continuing the ball valve example, as no more suction is applied at the suction outlet 1502, the lack of pressure may cause the floating ball of the ball valve to return to a position in which the suction outlet 1502 is sealed from the primary vaporizer 1505 and the additional vapor from the primary vaporizer 1505 and/or the holding chamber 1507 may flow to and out of the smoke simulator outlet 1504. In embodiments using the mechanically controlled valve, the processor 1514 may or may not be included in the device 1500.

Whichever device or system is used to cause vapor to flow through the smoke simulator outlet 1504, this vapor may resemble smoke from a burning ember of a traditional smoking article. The vapor may resemble the smoke with regards to at least one of density, color, patterns, or additional effects.

As a user begins to draw via the suction outlet 1502, the processor 1514 may control the valve 1506 to stop or reduce an amount of vapor flowing to the smoke simulator outlet 1504 and to increase an amount of vapor flowing to the suction outlet 1502. At the same time, the processor 1514 may control the burning ember simulator 1516 to output brighter light and/or a higher temperature, as well as control the speaker 1518 to begin to output, or increase a volume of, the "crackling" or other related sound. As another example, when the device 1500 is turned on, the processor 1514 may control the valve 1506 to allow vapor to flow through the smoke simulator outlet 1504, may control the burning ember simulator 1516 to generate light and/or heat, and to instruct the speaker 1518 to output the "crackling" sound.

When a user stops drawing on the suction outlet 1502, the processor 1514 may control the device 1500 so that vapor flows out of the device 1502, and/or so that an amount of vapor flowing out of the device via the smoke simulator outlet 1504, increases. The processor 1514 may do so by controlling the valve 1506, the secondary vaporizer 1508, or another component of the device 1500. The processor 1514 may also control the speaker 1518 to reduce a volume of the produced sizzling sound and/or control the burning ember simulator 1516 to generate less light or heat and/or the speaker 1518 to output no sound or sound at a lower volume, pitch or the like.

The processor 1514 may also compare levels of draw (i.e., an amount of suction or a rate of flow through the suction outlet 1502). For example, during a relatively heavy draw (i.e., more suction applied to the suction outlet 1502), the processor 1514 may cause the speaker 1518 to output the "sizzling" sound at a higher volume than during a relatively light draw. Similarly, the processor 1514 may control the burning ember simulator 1516 to output light/heat at a greater level during a relatively heavy draw than during a relatively light draw. The processor 1514 may at times allow or cause vapor to flow through the smoke simulator outlet 1504 during a draw. In that regard, the processor 1514 may allow or cause less vapor to flow through the smoke simulator outlet 1504 during a relatively heavy draw than during a relatively light draw.

When a user has not stopped drawing but is applying less suction, the processor 1514 may control the device 1500 to such that some vapor can flow to the smoke simulator outlet 1504, but not as much as when no draw is occurring. At the same time, the processor 1514 may control the speaker 1518 to output the sizzling sound at a lower volume than during a full draw and the burning ember simulator 1516 to output the light or heat at a lower level than during a full draw. Likewise, when a draw is increasing but not yet full, the processor 1514 may control the device 1500 so that some vapor can flow to the smoke simulator outlet 1504, but not as much as when no draw is occurring. The processor 1514 may also control the speaker 1518 to output the sizzling sound at a lower volume than during a full draw and the burning ember simulator 1516 to output the light or heat at a lower level than during a full draw.

In some embodiments, the processor 1514 may control the amount of heat/light produced, the volume of the "sizzling" sound, and the amount of vapor allowed to flow through the smoke simulator outlet 1504 based on other factors. For example, the processor 1514 may instruct the burning ember simulator 1516 to increase an amount of light/heat as the draw continues so that longer draws result in brighter/hotter ember simulation. Similarly, the processor 1514 may allow or control the device 1500 so that more vapor flows through the smoke simulator outlet 1504 after a longer draw than after a shorter draw.

In some embodiments, the processor 1514 may control the amount of vapor flowing through the smoke simulator outlet 1504 based on an amount of time that has expired since the last draw. For example, as the time from the last draw increases, the processor 1514 may cause less vapor to flow through the smoke simulator outlet 1504. Similarly, the processor 1514 may also control the speaker 1518 to output the "sizzling" sound at a lower volume and the burning ember simulator 1516 to generate a lesser amount of light/heat than immediately after a draw.

In some embodiments, the processor 1514 may also control the device 1500 when a user is blowing through the suction outlet 1502 as opposed to drawing from the suction outlet 1502. For example, as a user blows into the suction outlet 1502, the processor 1514 may cause the device 1500 so that a relatively large amount of vapor (larger than when no draw is occurring) can flow through the smoke simulator outlet 1504 to simulate blowing through a cigarette or other traditional smoking article. Similarly, the processor 1514 may control the burning ember simulator 1516 to output heat/light and, in some embodiments, may control the burning ember simulator 1516 to have a "flashing" effect that resembles the burning ash leaving a traditional smoking article as it is being blown through. The processor 1514 may also control the speaker 1518 to output the "sizzling" sound.

In some embodiments, a user may blow through the suction outlet 1502 in order to reduce an amount of material in at least one of the container 1510 or the secondary container 1512. For example, if the material in a container is almost out, the user may wish to completely empty the container prior to refilling it with another material. In that regard, while the user is blowing through the suction outlet 1502, the processor 1514 may allow a relatively large amount of material to be vaporized by the primary vaporizer 1505 and/or the secondary vaporizer 1508. In some embodiments, the user may select from which container 1510, 1512 material is to be vaporized during an inhalation event (while suction is applied to the suction outlet 1502) and during a blowing event.

Figure 17:
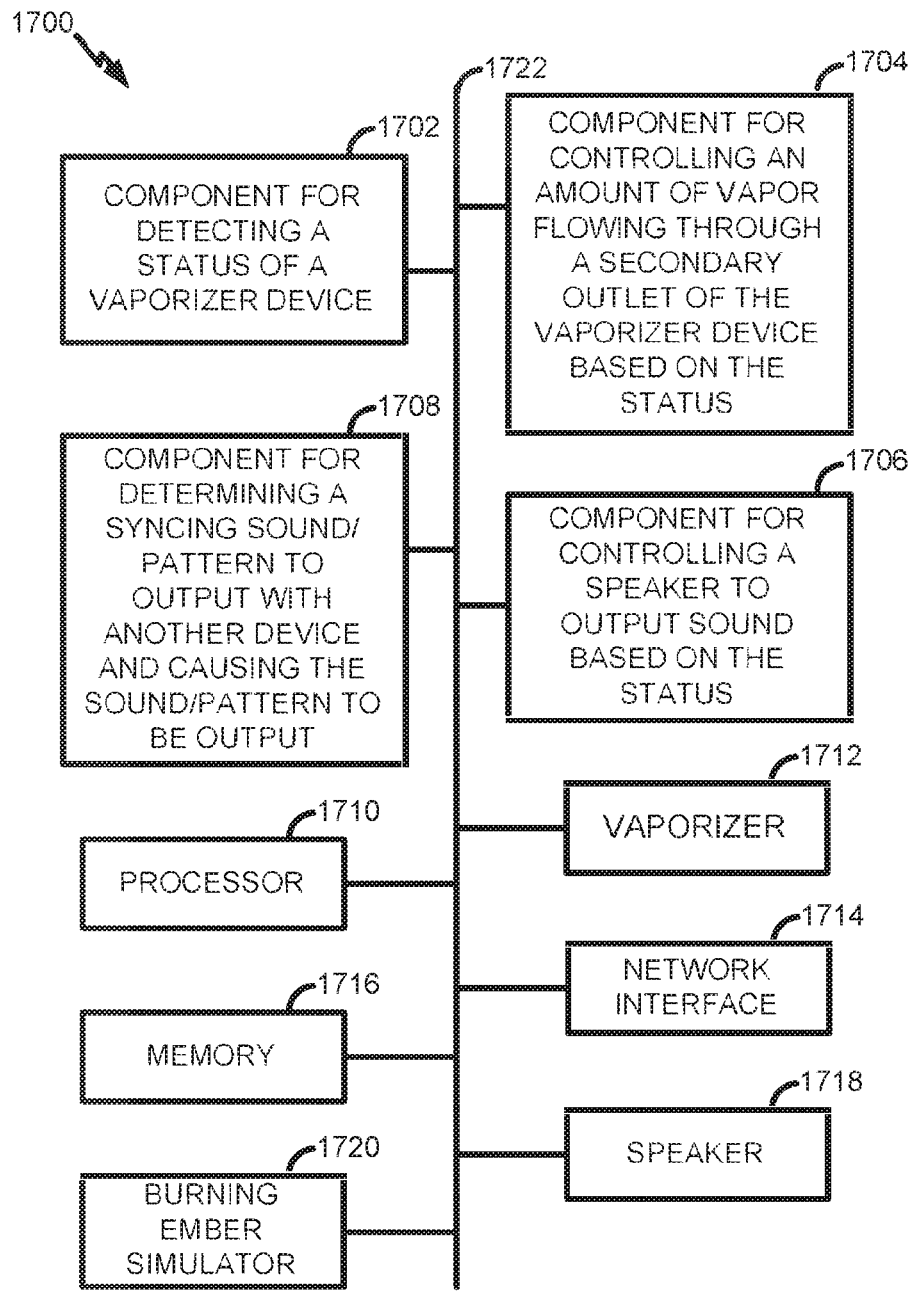
FIG. 17 is a block diagram illustrating aspects of an apparatus used to resemble the sound and look of a traditional smoking article.

FIG. 17 is a block diagram illustrating components of an apparatus or system 1700 for controlling an apparatus to resemble the look and feel of a traditional smoking article, in accord with the foregoing examples. The apparatus or system 1700 may include additional or more detailed components as described herein. For example, the processor 1710 and memory 1716 may contain an instantiation of a controller for a device as described herein. As depicted, the apparatus or system 1700 may include functional blocks that can represent functions implemented by a processor, software, or combination thereof (e.g., firmware).

As illustrated in FIG. 17, the apparatus or system 1700 may comprise an electrical component 1702 for detecting a status of the apparatus. For example, the component may include a flow sensor and/or pressure sensor. The component 1702 may be, or may include, a means for detecting pressure/flow at an outlet of the apparatus 1700. Said means may include the processor 1710 coupled to the memory 1716, and to the network interface 1714 and a filter, vaporizer, air intake device, etc, the processor executing an algorithm based on program instructions stored in the memory. Such algorithm may include a sequence of more detailed operations pertaining to resembling a traditional smoking article.

The apparatus or system 1700 may further comprise an electrical component 1704 for controlling an amount of vapor flowing through a secondary outlet of the vaporizer device based on the status. For example, the component 1704 may include a controllable valve or a similar device. The component 1704 may be, or may include, a means for re-directing a flow of vapor. Said means may include the processor 1710 coupled to the memory 1716, to vaporizer 1712, and to the network interface 1714, the processor executing an algorithm based on program instructions stored in the memory. Such algorithm may include a sequence of more detailed operations pertaining to controlling vapor output of the device, for example, using any of the methods as described herein.

The apparatus or system 1700 may further comprise an electrical component 1706 for controlling a speaker to output sound based on the status of the apparatus 1700. For example, the component 1706 may include an audio controller coupled to the speaker 1718. The component may be relatively small so that it can fit within a personal vaporizer. The component 1706 may be, or may include, a means controlling the speaker 1718. Said means may include the processor 1710 coupled to the memory 1716, and to the network interface 1714, the processor executing an algorithm based on program instructions stored in the memory. Such algorithm may include a sequence of more detailed operations pertaining to controlling vapor output of the device, for example, using any of the methods as described herein.

The apparatus or system 1700 may further comprise an electrical component 1708 for determining a sound and/or heat/light pattern to output in sync with another device, and for causing the sound/light/heat to be output. The component 1708 may be, or may include, a means for determining how to sync the audio and for causing the audio to be output. Said means may include the processor 1710 coupled to the memory 1716, to the burning ember simulator 1720, to the speaker 1718, and to the network interface 1714, the processor executing an algorithm based on program instructions stored in the memory. Such algorithm may include a sequence of more detailed operations pertaining to controlling vapor output of the device, for example, using any of the methods as described herein.

The apparatus 1700 may include a processor module 1710 having at least one processor, in the case of the apparatus 1700 configured as a controller configured to operate vaporizer 1712, speaker 1718, burning ember simulator 1720, and other components of the apparatus. The processor 1710, in such case, may be in operative communication with the memory 1716, interface 1714, or dispenser/vaporizer 1712, vaporizer 1712, speaker 1718, and/or burning ember simulator 1720 via a bus 1722 or similar communication coupling. The processor 1710 may effect initiation and scheduling of the processes or functions performed by electrical components 1702-1708.

In related aspects, the apparatus 1700 may include a network interface module 1714 operable for communicating with a server over a computer network. In further related aspects, the apparatus 1700 may optionally include a module for storing information, such as, for example, a memory device/module 1716. The computer readable medium or the memory module 1716 may be operatively coupled to the other components of the apparatus 1700 via the bus 1722 or the like. The memory module 1716 may be adapted to store computer readable instructions and data for enabling the processes and behavior of the modules 1702-1708, and subcomponents thereof, or of any methods disclosed herein. The memory module 1716 may retain instructions for executing functions associated with the modules 1702-1708. While shown as being external to the memory 1716, it is to be understood that the modules 1702-1708 can exist within the memory 1716.

Figure 18:
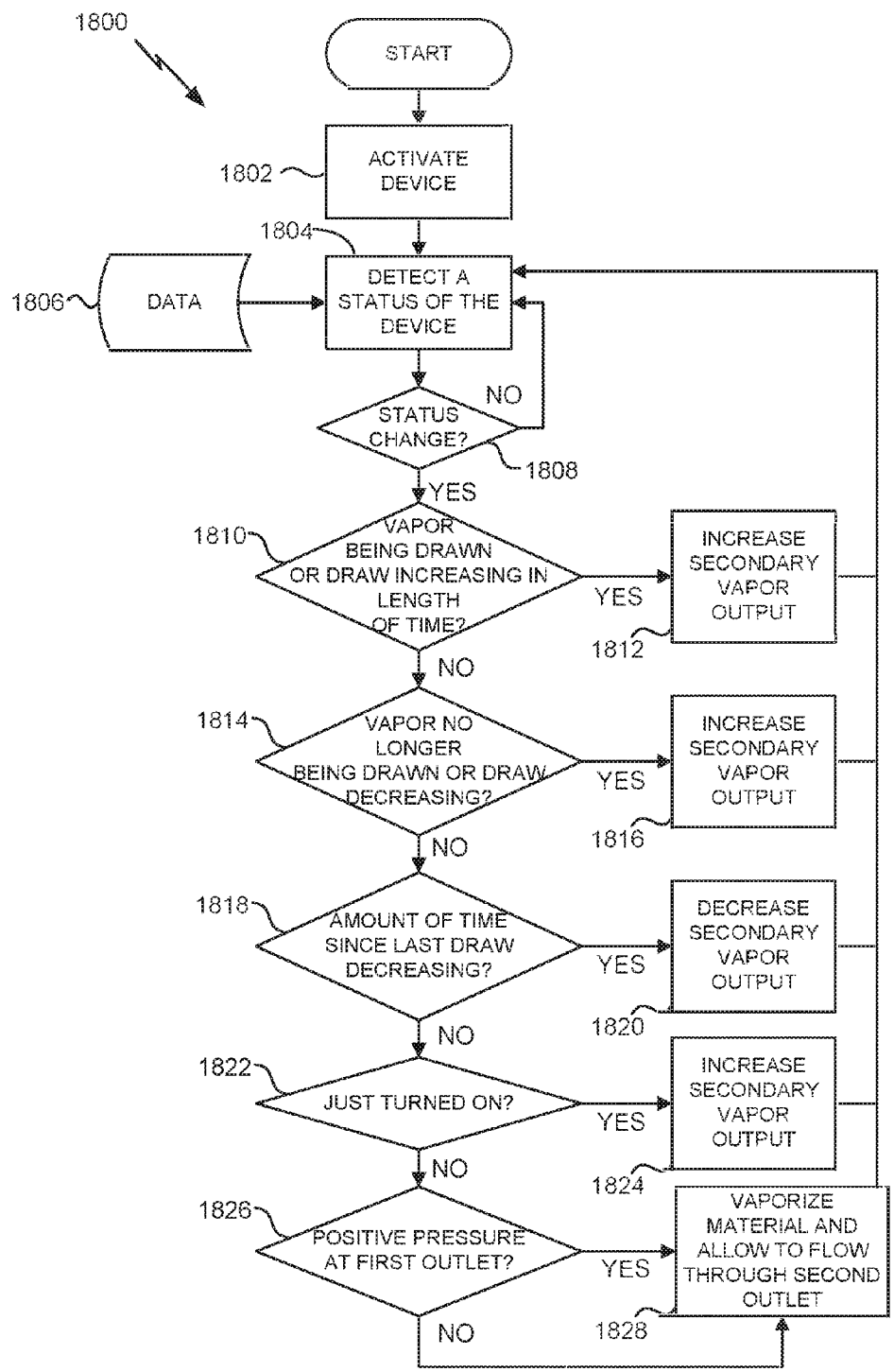
FIG. 18 is a flow diagram illustrating a control algorithm for use by a vapor device for controlling vapor flow through a second outlet of a vapor device to resemble smoke from a traditional smoking article.

With reference now to FIG. 18, aspects of a method 1800 for use by a processor or other controller of a vaporizer device for simulating smoke from a traditional smoking article is illustrated. The method 1800 may be performed by a processor or a controller and may be used to simulate smoking of a traditional smoking article.

In block 1802, the device may be activated. For example, a user may draw on the device, causing a sensor to detect the suction and the processor, coupled to the sensor, to instruct the vaporizer to begin vaporizing material. Alternatively, a user may press an on button or an on switch, causing the device to switch to an "on" state. In yet other embodiments, the device may receive an input from an ancillary device instruction the device to become activated.

In block 1804, a sensor may detect a status of the vaporizer device. The sensor may include at least one of a flow sensor, a pressure sensor, or another sensor capable of detecting a rate of flow or a pressure or negative pressure applied to a suction outlet of the vapor device. The sensor may also include a switch or other logic device of a processor that can detect such information as whether a vaporizer is vaporizing material, whether the device is in an on state or an off state, or the like. The processor may compare the detected status of the device to data 1806 stored in a memory to determine the state of the device. For example, the processor may compare a pressure value from a sensor to data in memory and determine that vapor is being drawn at a particular rate based on the detected pressure. Using this data, the processor can determine whether the vaporizer device is generating vapor, whether vapor is being drawn, whether the draw is increasing or decreasing, whether the draw has recently begun, whether the draw has recently ended, whether the device is in an "on" state or an "off" state, whether the vapor device has recently switched from the "on" state to the "off" state or vice versa, or whether a predetermined amount of time has expired since the vapor device was last used.

In block 1808, the processor may determine whether the status of the device has changed based on the detected new status. If the status has not changed, the process may return to block 1804 to continue detecting the status until the processor determines that the status has changed in block 1808.

In block 1810, the processor may determine, based on the detected status, whether vapor is being drawn or the amount of draw is increasing from the vaporizer device. If vapor is being drawn, the device may determine to reduce an amount of vapor output through the secondary, or smoke simulating, vapor outlet. Similarly, if the amount of draw from the vapor device is increasing, the processor may decrease the amount of vapor flowing through the secondary outlet in block 1812.

In block 1814, the processor may determine whether vapor is no longer being drawn or the amount of draw is decreasing. If vapor is no longer being drawn, and/or the amount of draw is decreasing, the processor may instruct the device to increase the amount of vapor flowing through the secondary outlet in block 1816.

In block 1818, the processor may determine the amount of time since the last draw and determine whether it is increasing and/or has increased to a predetermined amount of time. If so, the processor may decrease the secondary vapor output in block 1820.

In block 1822, the processor may determine whether the vapor device has recently turned on. If so, the processor may instruct the device to increase vapor flowing through the secondary outlet in order to simulate the device being ignited at 1824.

In block 1826, the processor may determine whether positive pressure is detected at the first outlet. In some embodiments, the processor may also or instead detect positive pressure at the second outlet, or at any point between the first outlet and the second outlet. The pressure may be caused by a user blowing into the first outlet and/or the user drawing on the second outlet. If positive pressure is detected, the processor may cause material to be vaporized and allowed to flow through the second outlet at 1828. For example, the processor may control a valve and/or the valve may automatically move to a position so that the first outlet and the second outlet are in fluid communication. This may allow a user to empty at least one of a primary container or a secondary container in order to refill without mixing materials. This may also allow the user to inhale vapor if he accidentally draws on the wrong outlet.

In view of the foregoing, and by way of additional example, disclosed are methods for simulating a traditional smoking article by a vaporizer device, as may be performed by a vaporizer device as described herein.

Figure 19:
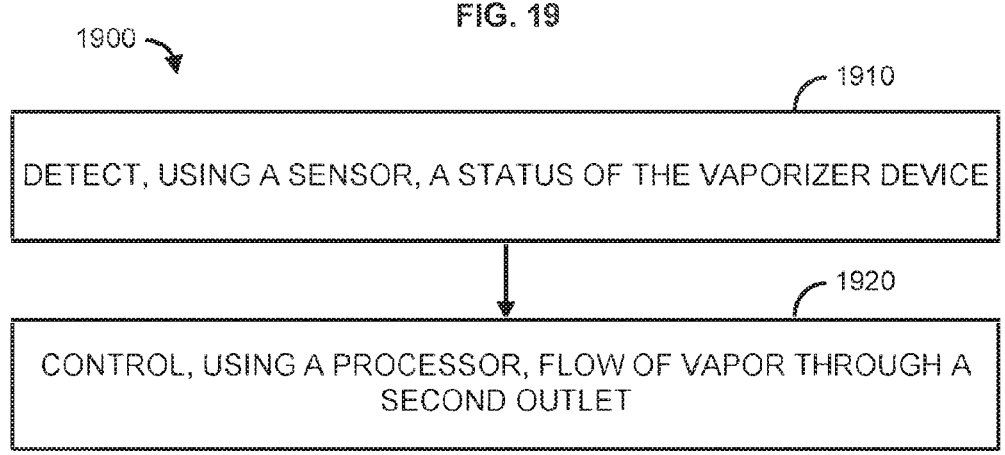
FIG. 19 illustrates an exemplary method.

With reference now to FIG. 19, a method 1900 may include, at 1910, detecting, using a sensor, a status of the vaporizer device. This may include, for example, detecting a flow rate or a pressure using a sensor coupled to the suction outlet, determining the state of a heating or vaporizer device using a processor coupled to the vaporizer, determining an amount of time of the length of a draw, determining an amount of time since a previous draw, or the like. The method 1900 may also include, at 1920, controlling, by a processor, the flow of vapor through a secondary outlet. This may include, for example, controlling a secondary vaporizer coupled to the secondary outlet, controlling a valve coupled to at least one of the suction outlet or the secondary outlet, allowing vapor to flow to/from a holding chamber, or the like.

Figure 20:
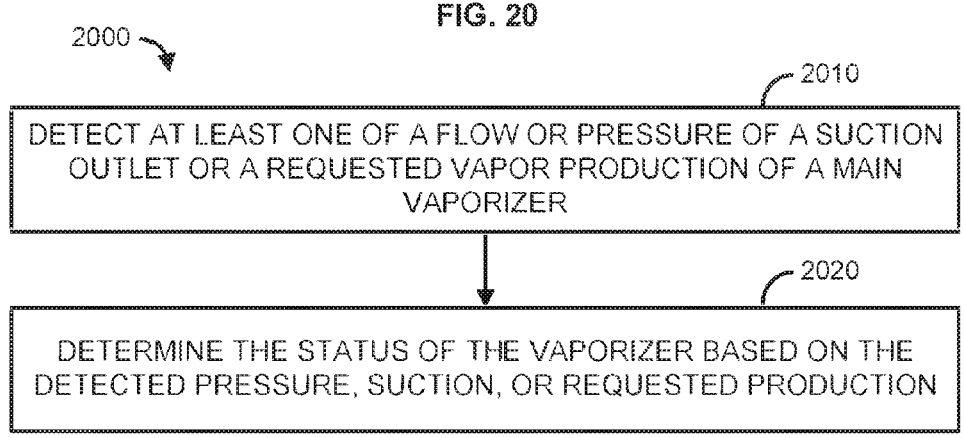
FIG. 20 illustrates an exemplary method.

With reference now to FIG. 20, a method 2000 may include, at 2010, detecting at least one of a flow or pressure of a suction outlet for a requested vapor production of a main vaporizer. For example, the vaporizer device may include a pressure sensor coupled to a suction outlet. As suction is applied to the suction outlet, the pressure sensor may detect the suction. Similarly, if a user blows through the suction outlet, the sensor may detect this positive pressure. In another aspect, the vaporizer device may include a flow rate sensor coupled to the suction outlet. The flow rate sensor may detect a rate at which fluid is flowing through the suction outlet. Additionally or instead, the processor may determine a requested vapor production of a main vaporizer in block 2010, such as by receiving control signals from a user. For example, the user may depress a "vaporize" button requesting that the vaporizer or heating element begin to vaporize or nebulize the material. In some embodiments, the vaporizer device may have an adjustable input. For example, a button may output a first signal when depressed with a first force and a second signal when depressed with a second force that is different than the first force. The second signal may indicate that more vapor is desired than the first signal. Thus, the processor can determine whether the vaporizer device should or should not be vaporizing or nebulizing a material, and/or a rate of vaporization or nebulization of the material.

The method 2000 may also include, at 2020, determining the status of the vaporizer based on the detected pressure, suction, or requested vapor production. For example, a processor may compare the detected pressure, rate of flow, and/or measured times to a database in the memory to determine which state is indicated by the detected or measured values. The processor may then find a match of the detected value and a value stored in memory that corresponds to a particular state, and may then associate the current state with the particular state found in the memory.

Figure 21:
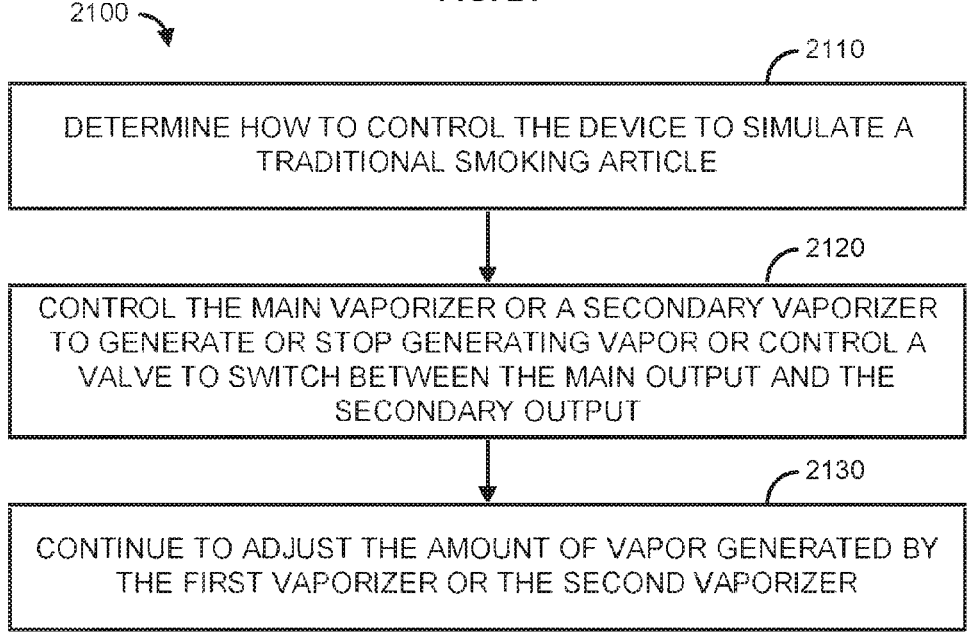
FIG. 21 illustrates an exemplary method.

With reference now to FIG. 21, a method 2100 may include, at 2110, determining how to control the vaporizer device to simulate a traditional smoking article. For example, the device or processor may compare the current state to memory, and/or apply the current state or detected values to a formula, to determine whether and how much vapor should be released via the smoke simulator outlet. At 2120, the processor may control the main vaporizer or a secondary vaporizer to generate a different amount of vapor being produced by each. Additionally or instead, the processor may control a valve to allow some or all vaporized material to flow out via the suction outlet and/or the smoke simulator outlet. In some aspects, the processor may cause vapor to be received by a holding chamber and/or allow vapor stored within a holding chamber to be released via the smoke simulator outlet. At 2130, the method 2100 includes continuing to adjusting the amount of vapor generated by the first vaporizer or the second vaporizer and/or an amount of vapor caused or allowed to flow through the smoke simulator outlet and/or the suction outlet. The state of the vaporizer device may constantly change, for example, when a user is not drawing, the state may change as the amount of time since the last draw increases, or as a user is drawing, the state may change as the length of time of the draw increases. The processor may continue to adjust the amount of vapor generated by the first vaporizer and/or second vaporizer, and/or adjust an amount of vapor caused or allowed to flow through the smoke simulator outlet and/or the suction outlet.

Figure 22:
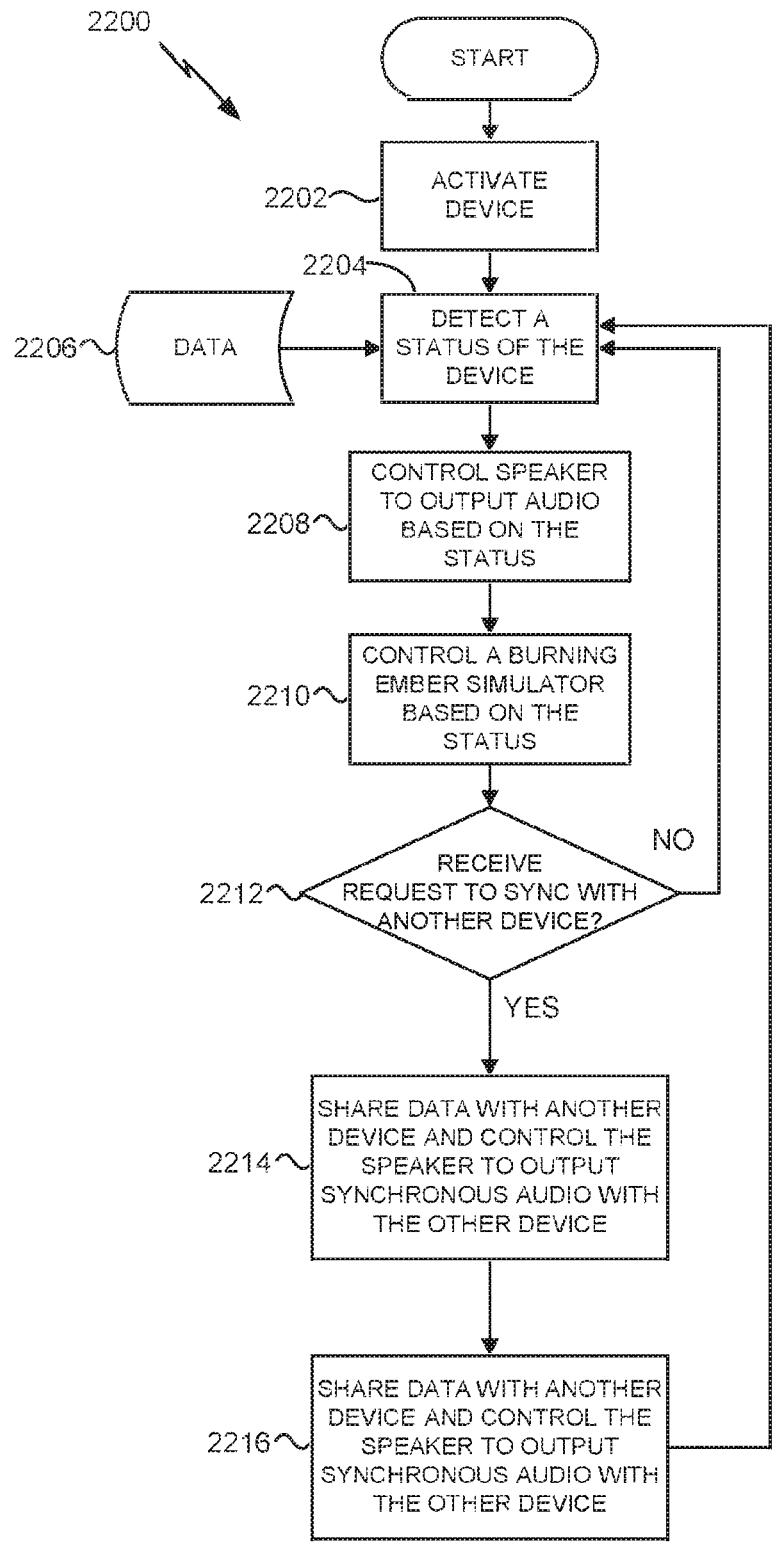
FIG. 22 is a flow diagram illustrating a control algorithm for use by a vapor device for controlling sounds and/or light/heat to resemble sounds and/or light/heat of a traditional smoking article, as well as to synchronously output vapor/heat/light with at least another vapor device.

With reference now to FIG. 22, aspects of a method 2200 for use by a processor or other controller of a vaporizer device for simulating smoke from a traditional smoking article is illustrated. The method 2200 may be performed by a processor or a controller and may be used to simulate sounds, heat, and/or light from a traditional smoking article, such as a cigarette, cigar, pipe, or the like. At 2202, the processor determines that the devices has been activated. At 2204, the processor detects a status of the device. This can be performed in a similar manner as block 1804 of FIG. 18 and, thus can compare detected data to data 2206 stored in a memory.

At 2208, the processor may control a speaker to output audio based on the detected status. The audio to be output may resemble sounds of a traditional smoking article, such as a "sizzling" sound of a cigarette, a "gurgling" sound of a bong, or the like.

At 2210, the processor may control a burning ember simulator based on the status of the device. The burning ember simulator may resemble heat and/or light generated by a lit or burning traditional smoking article. For example, the burning ember simulator may resemble burning embers at the end of a cigarette.

At 2212, the processor determines whether a request to sync with another device has been received.

At 2214, if the device is to sync with another device, the processor may communicate with another device to share information such as precise clock timing, which sound to play, what characteristics of the sound should be applied, or the like. The processor may also control the speaker and/or audio controller to output the synchronous audio with the other device. For example, at a concert, one or more users of similar devices may determine that it would be cool to have many similar devices generating smoke and/or light. They may provide an input to their device, which may then share the input with the other devices. The present device may receive this request and communicate with the other devices to determine what sound to play, when to play it, and/or characteristics of the sound.

At 2216, the processor may communicate with another device to determine information such as precise clock timing and/or any characteristics of the light to be output. The processor may also control the burning ember simulator to output heat/light based on the determined information.

In view of the foregoing, and by way of additional example, methods are disclosed for simulating a traditional smoking article by a vaporizer device and for synchronously outputting audio, light, and/or heat, as may be performed by a vaporizer device as described herein.

Figure 23:
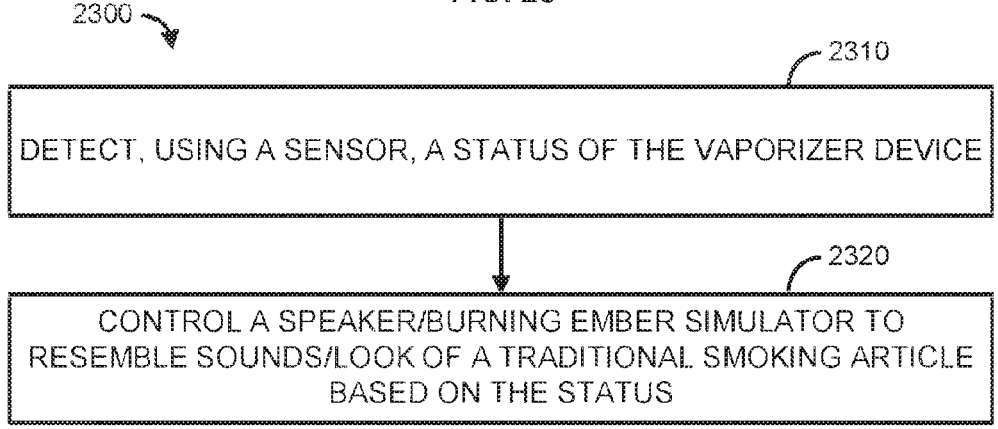
FIG. 23 illustrates an exemplary method.

With reference now to FIG. 23, a method 2300 for resembling sounds and/or light/heat of a traditional smoking article begins at 2310, where a sensor and/or a processor may detect and/or determine a status of the vaporizer device. For example, the status may be detected by a pressure or flow sensor, which may then share the detected data with the processor. The processor may then determine the status of the vaporizer, such as whether a user is drawing on the device, based on the detected data.

At 2320, the processor may control a speaker/audio controller and/or a burning ember simulator to resemble the sounds and/or look and feel of a traditional smoking article based on the status. For example, as a user is drawing on a device, the processor may control the speaker to output a sound at a relatively high volume and the burning ember simulator to output a relatively large amount of light/heat.

Figure 24:
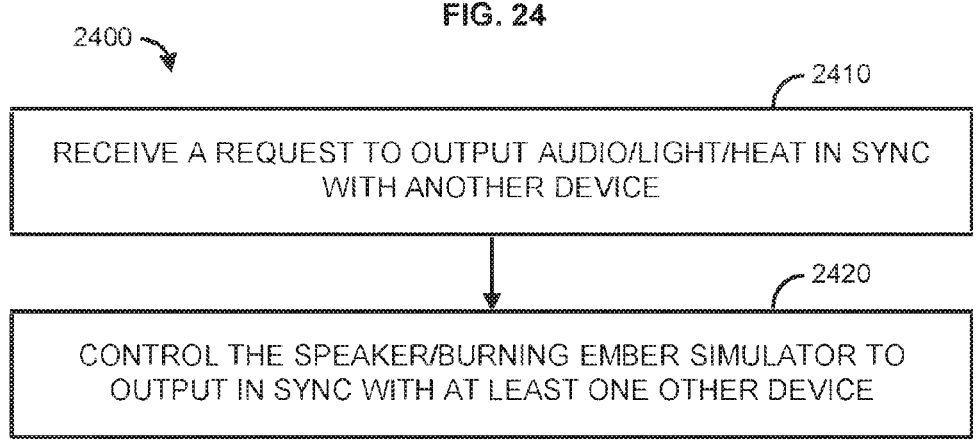
FIG. 24 illustrates an exemplary method.

With reference now to FIG. 24, a method 2400 for outputting audio and/or light/heat in sync with one or more additional devices begins at 2410, where a processor may receive a request to output audio and/or light/heat synchronously with one or more other devices. For example, a user may make this request via an input directly or indirectly connected to the device. For example, the user may depress a button corresponding to a sync mode and/or may input the instruction on a smartphone coupled to the device. The user may also be able to select a sound and/or light/heat, and characteristics thereof, to be output by the devices. As another example, a user of another device may input this information and it can be received by a network interface or other port of the device.

At 2420, the processor may control the speaker and/or burning ember simulator to output sound and/or light/heat synchronously with at least one other device.

Figure 25:
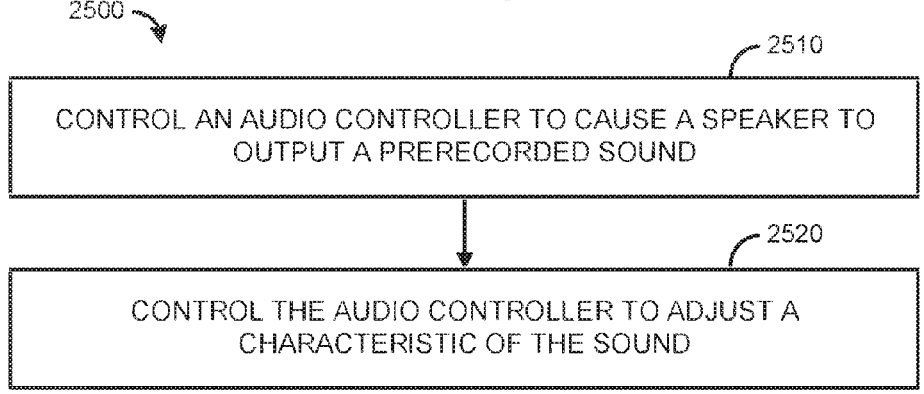
FIG. 25 illustrates an exemplary method.

With reference now to FIG. 25, a method 2500 for outputting audio corresponding to sounds of a traditional smoking article begins at 2510, where a processor can control an audio controller to output a prerecorded sound.

At 2520, the processor may control the audio controller to adjust a characteristic of the prerecorded sound. For example, the audio controller may include a memory having one or more predetermined sounds. The processor may then provide instructions to the audio controller to cause the sound to be output having various characteristics, such as a different volume, a different tone, or the like.

Figure 26:
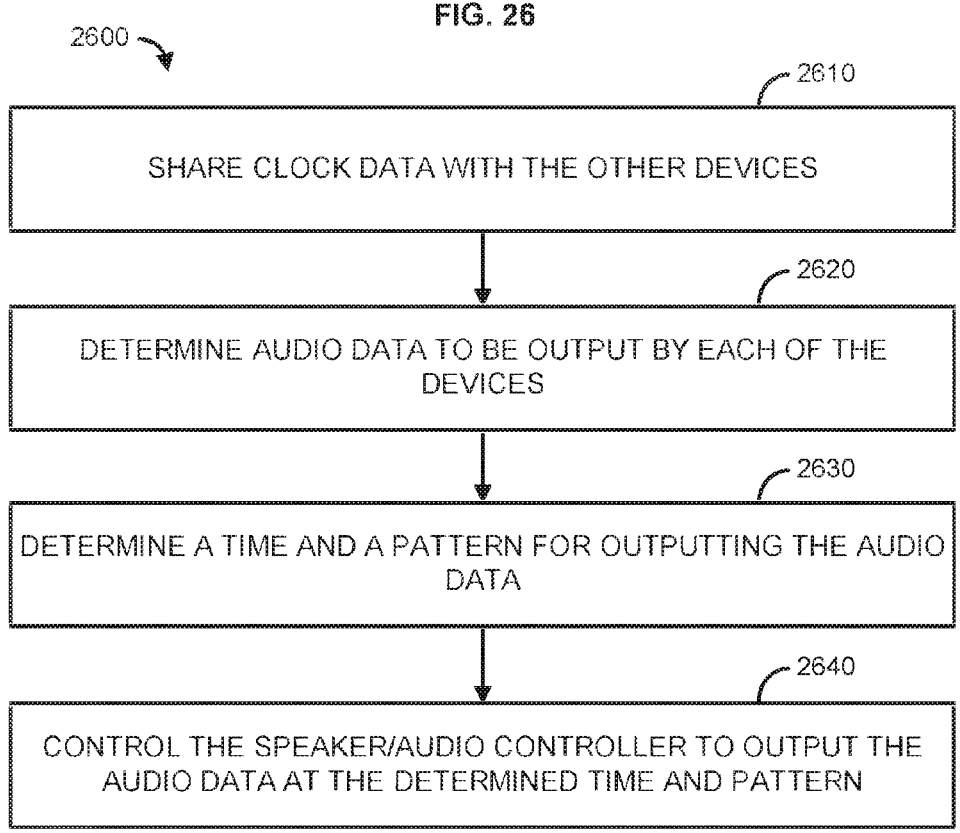
FIG. 26 illustrates an exemplary method.

With reference now to FIG. 26, a method 2600 for controlling the speaker and/or burning ember simulator to output sound and/or light/heat in sync with another device begins at 2610, where the processor may share clock data with one or more other devices. For example, each device may have a clock that is set to a different time. Each device may share its time, and/or a direction-providing device may share its time so that other devices can adjust their timing accordingly.

At 2620, the processor may determine audio data (such as a prerecorded sound) to output. In some embodiments, the direction-providing device may share a sound with the other devices via, for example, a network interface. In some embodiments, each device may have the sound prerecorded in a memory and the direction-providing device may instruct the other devices of the sound to be played.

At 2630, the processor may determine a time and a pattern for outputting the audio data. This may include, for example, the direction-providing device providing a time relative to its clock for the audio to be output. The direction-providing device may also provide desired characteristics of the sound, such as volume, tone, etc. This information may be shared via a network interface or another interface.

At 2640, the processor may control the speaker/audio controller to output the audio data at the determined time and pattern.

In an aspect, a noise generating vapor device is disclosed comprising a sensor for detecting a current state of the noise generating vapor device and an audio component for outputting audio based on the detected current state of the noise generating vapor device.

The noise generating vapor device can further comprise a vaporizer for vaporizing a material and wherein the current state of the noise generating device includes at least one of whether the vaporizer is vaporizing the material, whether vapor is being drawn from the noise generating vapor device, whether the draw from the noise generating vapor device is tapering up or down, whether the draw has recently begun, whether the draw has recently ended, whether the noise generating vapor device is in an "on" state, whether the whether the noise generating vapor device is in an "on" state, whether the noise generating vapor device has recently switched from the "on" state to an "off" state, whether the noise generating vapor device has recently switched from the "off" state to the "on" state, or whether a predetermined amount of time has expired since the noise generating vapor device was last used.

The sensor can include at least one of a pressure sensor, a flow sensor, an electrical sensor, or a logic device for detecting a signal. The noise generating vapor device can further comprise a processor and wherein the logic device includes at least one of hardware or logical instructions stored in a non-transitory memory and is configured to receive a signal from the processor indicating the current state of the noise generating vapor device.

The audio can resemble a sound generated by smoking at least one of a cigarette, a cigar, a hookah bowl, a bong, a pipe, a water pipe, a one-hitter, a joint, a blunt, a chillum, or a steamroller. The audio component can include an audio controller and a speaker in communication via at least one of a wireless or wired connection. The audio controller can include a memory for storing audio data to be output by the speaker. The audio can resemble a sound generated by smoking at least one of a cigarette, a cigar, a hookah bowl, a bong, a pipe, a water pipe, a one-hitter, a joint, a blunt, a chillum, or a steamroller.

The noise generating vapor device can further comprise a processor and wherein the audio controller is configured to adjust a characteristic of audio output by the speaker based on data received from the processor. The characteristic can be at least one of a tone, a volume, a pitch, a number of harmonics, or a frequency of the harmonics. The noise generating vapor device can further comprise a memory for storing a plurality of sounds and a processor for causing the speaker to output one of the plurality of sounds based on the current state of the noise generating vapor device. The noise generating vapor device can further comprise an outlet on a first end of the noise generating vapor device for allowing vapor to pass therethrough, and wherein the speaker is positioned at a second end of the noise generating vapor device that is different than the first end. The audio chip can include a micro sound chip.

The noise generating vapor device can further comprise a housing and a light element coupled to the housing and configured to generate light based on the current state of the noise generating vapor device. The light element can be designed to resemble a burning ember pattern corresponding to a burning ember of at least one of a cigarette, a cigar, a hookah bowl, a bong, a pipe, a water pipe, a one-hitter, a joint, a blunt, a chillum, or a steamroller. The noise generating vapor device can further comprise a network communication device configured to communicate with a remote device, and a processor in communication with the network communication device and configured to control at least one of the audio component or the light element based on data received by the network communication device.

The noise generating vapor device can further comprise a housing that can be classified as at least one of a vape-bot, a micro-vapor device, a vapor pipe, an e-cigarette, a hybrid handset, a modular vaporizer device, a pen vaporizer, or a combined vapor device. The combined vapor device can include at least one of a pendant, jewelry, a watch, an accessory, headphones, or other combination vapor device. The noise generating vapor device can further comprise a vaporizer configured to vaporize a vaporizable or non-vaporizable material such that the vaporized material resembles smoke from at least one of a cigarette, a cigar, a hookah bowl, a bong, a pipe, a water pipe, a one-hitter, a joint, a blunt, a chillum, or a steamroller. The vaporized material can resemble the smoke with regards to at least one of density, color, patterns, or additional effects.

Figure 27:
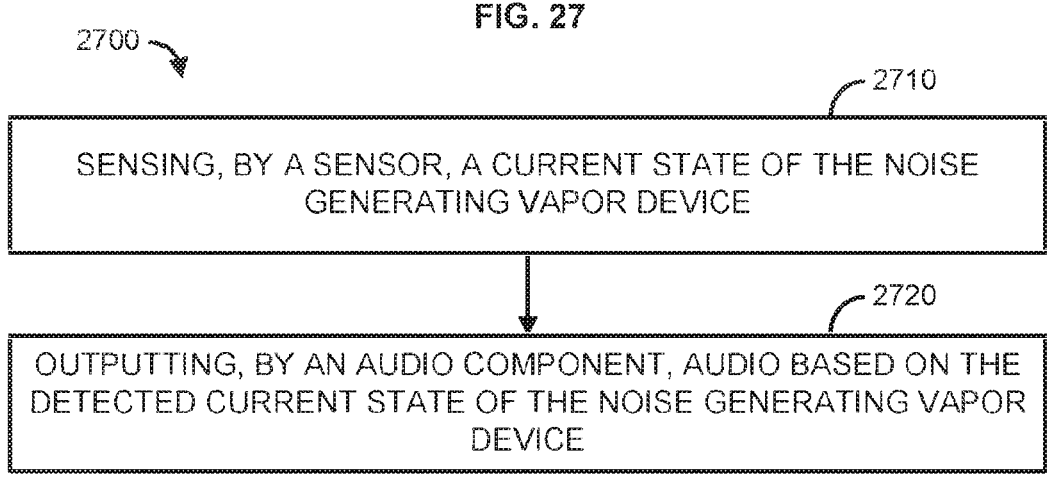
FIG. 27 illustrates an exemplary method.

In an aspect, illustrated in FIG. 27, a method 2700 for use with a noise generating vapor device is disclosed comprising sensing, by a sensor, a current state of the noise generating vapor device at 2710 and outputting, by an audio component, audio based on the detected current state of the noise generating vapor device at 2720.

The current state of the noise generating vapor device includes at least one of whether a vaporizer is vaporizing a material, whether vapor is being drawn from the noise generating vapor device, whether the draw from the noise generating vapor device is tapering up or down, whether the draw from the noise generating vapor device has recently begun, whether the draw from the noise generating vapor device has recently ended, whether the noise generating vapor device is in an "on" state, whether the whether the noise generating vapor device is in an "on" state, whether the noise generating vapor device has recently switched from the "on" state to an "off" state, whether the noise generating vapor device has recently switched from the "off" state to the "on" state, or whether a predetermined amount of time has expired since the noise generating vapor device was last used.

The audio can resemble a sound generated by smoking at least one of a cigarette, a cigar, a hookah bowl, a bong, a pipe, a water pipe, a one-hitter, a joint, a blunt, a chillum, or a steamroller. The sensor can include at least one of a pressure sensor, a flow sensor, an electrical sensor, or a logic device for detecting a signal. The method can further comprise receiving, by the logic device and from a processor, a signal indicating the current state of the noise generating vapor device, wherein the logic device includes at least one of hardware or logical instructions stored in a non-transitory memory. The audio component can include an audio chip and a speaker in communication via at least one of a wireless or wired connection.

The method can further comprise allowing, via an outlet at a first end of the noise generating vapor device, vapor to pass, and wherein the speaker is positioned at a second end that is different than the first end. The audio chip can include a micro sound chip. The method can further comprise generating, by a light element coupled to a housing of the noise generating vapor device, light based on the current state of the noise generating vapor device. The light element can be designed to resemble a burning ember pattern corresponding to a burning ember of at least one of a cigarette, a cigar, a hookah bowl, a bong, a pipe, a water pipe, a one-hitter, a joint, a blunt, a chillum, or a steamroller.

The method can further comprise receiving, by a processor from a network communication device, data and controlling, by the processor, at least one of the audio component or the light element based on the data received from the network communication device. The noise generating vapor device can include a housing that can be classified as at least one of a vape-bot, a micro-vapor device, a vapor pipe, an e-cigarette, a hybrid handset, a modular vaporizer device, a pen vaporizer, or a combined vapor device. The combined vapor device can include at least one of a pendant, jewelry, a watch, an accessory, headphones, or other combination vapor device. The method can further comprise vaporizing, by a vaporizer, a vaporizable or non-vaporizable material such that the vaporized material resembles smoke from at least one of a cigarette, a cigar, a hookah bowl, a bong, a pipe, a water pipe, a one-hitter, a joint, a blunt, a chillum, or a steamroller. The vaporized material can resemble the smoke with regards to at least one of density, color, patterns, or additional effects.

In an aspect, an apparatus is disclosed comprising a first vapor outlet, a container for storing a vaporizable material, a vaporizer component coupled to the container, configured for vaporizing the vaporizable material to generate a vapor and for providing the vapor to the first vapor outlet, a sensor coupled to the container for sensing a status of the vaporizer component, a memory, configured for storing a plurality of audio files, an audio output device, configured for outputting one or more of the plurality of audio files, and a processor, configured for, receiving the status of the vaporizer component, determining a first audio file of the plurality of audio files based on the status, determining a first characteristic based on the status, and causing the audio output device to output the first audio file according to the first characteristic.

The vaporizer component can comprise a heating element for vaporizing the first vaporizable material, a vibrating mesh for nebulizing the first vaporizable material into a mist, an atomizer for atomizing the first vaporizable material into an aerosol, or an ultrasonic nebulizer for nebulizing the first vaporizable material into a mist.

The status of the vaporizer component can comprise at least one of whether the vaporizer component is vaporizing the material, whether vapor is being drawn from the vaporizer component, whether vapor is being draw from the vaporizer component at an increasing or decreasing rate, whether vapor is being draw from the vaporizer component and the draw started within a predetermined amount of time, whether vapor was being draw from the vaporizer component and the draw ended within a predetermined amount of time, whether the vaporizer component is in an "on" status, whether the vaporizer component switched from an "on" status to an "off" status within a predetermined amount of time, whether the vaporizer component switched from an "off" status to an "on" status within a predetermined amount of time, or whether a predetermined amount of time has expired since the vaporizer component was last used. The sensor can comprise at least one of a pressure sensor, a flow sensor, or an electrical sensor.

The plurality of audio files can comprise audio files that resemble one or more of, a sound generated by smoking at least one of a cigarette, a cigar, a hookah bowl, a bong, a pipe, a water pipe, a one-hitter, a joint, a blunt, a chillum, or a steamroller.

The first characteristic can comprise at least one of a tone, a volume, a pitch, a number of harmonics, a frequency of harmonics, a fade in, or a fade out. The audio output device can be positioned at an end opposite the first vapor outlet. The apparatus can further comprise a light element positioned at an end opposite the first vapor outlet. The processor can be further configured for determining a second characteristic based on the status and causing the light element to emit light based on the second characteristic. The second characteristic can comprise at least one of a color, an intensity, a pattern, a fade in, or a fade out. The light element can be configured to emit light that resembles a burning ember pattern corresponding to a burning ember of at least one of a cigarette, a cigar, a hookah bowl, a bong, a pipe, a water pipe, a one-hitter, a joint, a blunt, a chillum, or a steamroller. The apparatus can further comprise a second vapor outlet element positioned at an end opposite the first vapor outlet. The processor can be further configured for causing the vaporizer component to generate the vapor based on the status and causing the vapor to be routed to the second vapor outlet. The status can comprise vapor is not being drawn from the vapor component.

Figure 28:
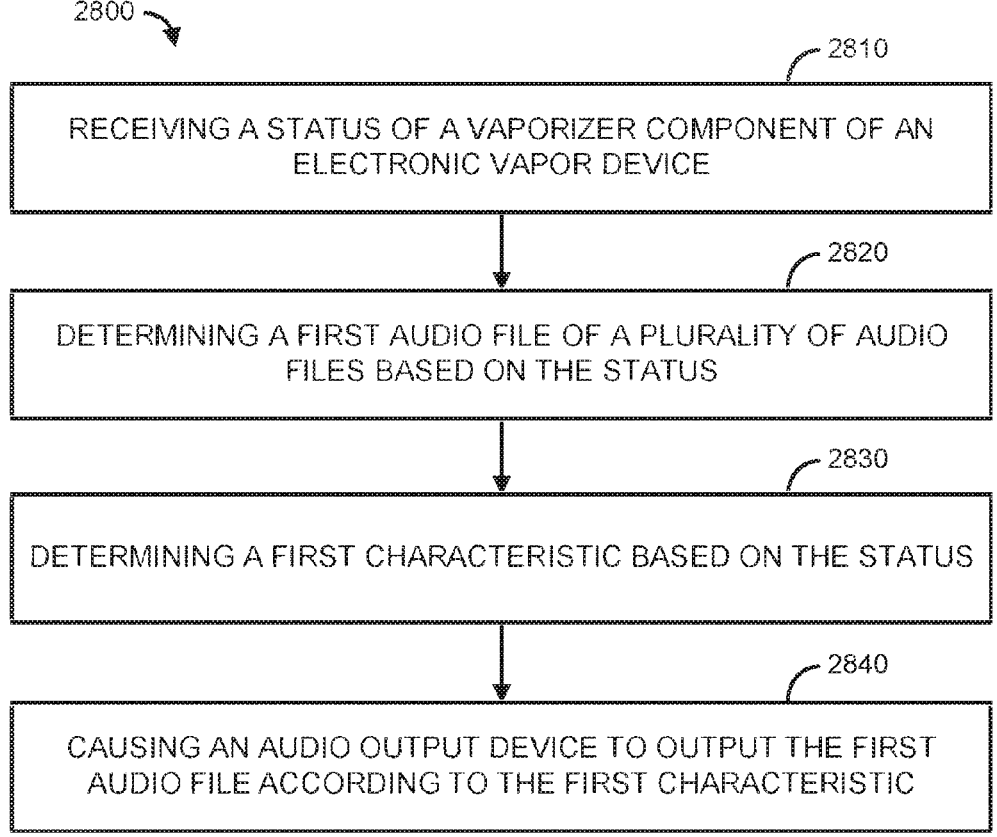
FIG. 28 illustrates an exemplary method.

In an aspect, illustrated in FIG. 28, a method 2800 is disclosed comprising receiving a status of a vaporizer component of an electronic vapor device at 2810, determining a first audio file of a plurality of audio files based on the status at 2820, determining a first characteristic based on the status at 2830, and causing an audio output device to output the first audio file according to the first characteristic at 2840.

The status of the vaporizer component can comprise at least one of whether the vaporizer component is vaporizing the material, whether vapor is being drawn from the vaporizer component, whether vapor is being draw from the vaporizer component at an increasing or decreasing rate, whether vapor is being draw from the vaporizer component and the draw started within a predetermined amount of time, whether vapor was being draw from the vaporizer component and the draw ended within a predetermined amount of time, whether the vaporizer component is in an "on" status, whether the vaporizer component switched from an "on" status to an "off" status within a predetermined amount of time, whether the vaporizer component switched from an "off" status to an "on" status within a predetermined amount of time, or whether a predetermined amount of time has expired since the vaporizer component was last used.

The plurality of audio files can comprise audio files that resemble one or more of, a sound generated by smoking at least one of a cigarette, a cigar, a hookah bowl, a bong, a pipe, a water pipe, a one-hitter, a joint, a blunt, a chillum, or a steamroller. The first characteristic can comprise at least one of a tone, a volume, a pitch, a number of harmonics, a frequency of harmonics, a fade in, or a fade out. Causing the audio output device to output the first audio file according to the first characteristic can comprise outputting the first audio file from a speaker positioned at an end of the electronic vapor device opposite a first vapor outlet.

The method 2800 can further comprise determining a second characteristic based on the status and causing a light element to emit light based on the second characteristic. Causing the light element to emit light based on the second characteristic can comprise activating a light emitting diode positioned at an end of the electronic vapor device opposite a first vapor outlet. The second characteristic can comprise at least one of a color, an intensity, a pattern, a fade in, or a fade out. The light element can be configured to emit light that resembles a burning ember pattern corresponding to a burning ember of at least one of a cigarette, a cigar, a hookah bowl, a bong, a pipe, a water pipe, a one-hitter, a joint, a blunt, a chillum, or a steamroller.

The method 2800 can further comprise causing the vaporizer component to generate the vapor based on the status and causing the vapor to be routed to a second vapor outlet at an end of the electronic vapor device opposite a first vapor outlet. The status can comprise vapor is not being drawn from the vapor component.

In view of the exemplary systems described supra, methodologies that can be implemented in accordance with the disclosed subject matter have been described with reference to several flow diagrams. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks can be required to implement the methodologies described herein. Additionally, it should be further appreciated that the methodologies disclosed herein are capable of being stored on an article of manufacture to facilitate transporting and transferring such methodologies to computers.

Those of skill would further appreciate that the various illustrative logical blocks, modules, circuits, and algorithm steps described in connection with the aspects disclosed herein can be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

As used in this application, the terms "component," "module," "system," and the like are intended to refer to a computer-related entity, either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components may reside within a process and/or thread of execution and a component can be localized on one computer and/or distributed between two or more computers.

As used herein, a "vapor" includes mixtures of a carrier gas or gaseous mixture (for example, air) with any one or more of a dissolved gas, suspended solid particles, or suspended liquid droplets, wherein a substantial fraction of the particles or droplets if present are characterized by an average diameter of not greater than three microns. As used herein, an "aerosol" has the same meaning as "vapor," except for requiring the presence of at least one of particles or droplets. A substantial fraction means 10% or greater; however, it should be appreciated that higher fractions of small (<3 micron) particles or droplets can be desirable, up to and including 100%. It should further be appreciated that, to simulate smoke, average particle or droplet size can be less than three microns, for example, can be less than one micron with particles or droplets distributed in the range of 0.01 to 1 micron. A vaporizer may include any device or assembly that produces a vapor or aerosol from a carrier gas or gaseous mixture and at least one vaporizable material. An aerosolizer is a species of vaporizer, and as such is included in the meaning of vaporizer as used herein, except where specifically disclaimed.

Various aspects presented in terms of systems can comprise a number of components, modules, and the like. It is to be understood and appreciated that the various systems may include additional components, modules, etc. and/or may not include all of the components, modules, etc. discussed in connection with the figures. A combination of these approaches can also be used.

In addition, the various illustrative logical blocks, modules, and circuits described in connection with certain aspects disclosed herein can be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor can be a microprocessor, but in the alternative, the processor can be any conventional processor, controller, microcontroller, system-on-a-chip, or state machine. A processor may also be implemented as a combination of computing devices, e.g., a combination of a DSP and a microprocessor, a plurality of microprocessors, one or more microprocessors in conjunction with a DSP core, or any other such configuration.

Operational aspects disclosed herein can be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, a DVD disk, or any other form of storage medium known in the art. An exemplary storage medium is coupled to the processor such the processor can read information from, and write information to, the storage medium. In the alternative, the storage medium can be integral to the processor. The processor and the storage medium may reside in an ASIC or may reside as discrete components in another device.

Furthermore, the one or more versions can be implemented as a method, apparatus, or article of manufacture using standard programming and/or engineering techniques to produce software, firmware, hardware, or any combination thereof to control a computer to implement the disclosed aspects. Non-transitory computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick). Those skilled in the art will recognize many modifications can be made to this configuration without departing from the scope of the disclosed aspects.

The previous description of the disclosed aspects is provided to enable any person skilled in the art to make or use the present disclosure. Various modifications to these aspects will be readily apparent to those skilled in the art, and the generic principles defined herein can be applied to other embodiments without departing from the spirit or scope of the disclosure. Thus, the present disclosure is not intended to be limited to the embodiments shown herein but is to be accorded the widest scope consistent with the principles and novel features disclosed herein.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

The invention claimed is:

1. An electronic vapor device comprising:
   a housing configured to at least partially surround the electronic vapor device;
   a device processor operable for controlling the electronic vapor device;
   at least one container configured to store a vaporizable material;
   a vaporizing component operatively coupled to the device processor and controlled in part by the device processor, wherein the vaporizing component is in fluid communication with the at least one container for receiving a selected amount of vaporizable material therefrom, wherein the vaporizing component is operable to vaporize the vaporizable material received therein;
   at least one sensing component operatively coupled to the device processor and controlled in part by the device processor, wherein the at least one sensing component is configured to detect a plurality of status data associated with at least one operational characteristic of the electronic vapor device;

a first vapor outlet positioned at one end of the housing, wherein the first vapor outlet is coupled to the vaporizing component and configured to receive at least a portion of vapor generated by the vaporizing component, wherein the first vapor outlet is operable to expel the received vapor from the electronic vapor device in response to a negative pressure being applied to the first vapor outlet;

a second vapor outlet positioned at an end of the housing opposite the first vapor outlet, wherein second vapor outlet is coupled to the vaporizing component and configured to receive at least a portion of vapor generated by the vaporizing component, wherein the second vapor outlet is operable to expel the received vapor from the electronic vapor device in response to at least a portion of the detected status data;

an audio output component operatively coupled to the device processor and controlled in part by the device processor, wherein the audio output component is operable to output a plurality of sounds therefrom, wherein the audio output component is operable to output at least one sound of the plurality of sounds; and at least one power source operatively coupled to the vaporizing component, wherein the at least one power source is operable to generate a supply of power for operation of at least the vaporizing component;

wherein the device processor is further operable to receive at least a portion of the detected status data from the at least one sensing component, determine, based on at least a portion of the plurality of detected status data, at least one operational status of the electronic vapor device; and generate, based on the at least one determined operational status, at least one audio output control signal for controlling an output parameter of at least one sound of the plurality of sounds.

2. The electronic vapor device of claim 1, wherein the at least one audio output control signal controls at least one of: a type of sound emitted from the audio output component, an audio characteristic of a sound emitted from the audio output component, a timing of a sound emitted from the audio output component, and combinations thereof.

3. The electronic vapor device of claim 2, wherein the audio output component comprises:

an audio memory operable for storing a plurality of audio files, each audio file containing audio data representative of at least one sound;

an audio controller operable to access audio data contained in at least one of the plurality of audio files, wherein the audio controller is operable to generate, based on at least a portion of the accessed audio data, at least one audio output control signal for controlling at least one of: a type of sound emitted from the audio output component, an audio characteristic of a sound emitted from the audio output component, a timing of a sound emitted from the audio output component, and combinations thereof; and at least one speaker operatively coupled to the audio controller and controlled in part by the audio controller, wherein the at least one speaker is operable to output at least one sound in accordance with the at least one audio output control signal.

4. The electronic vapor device of claim 3, wherein at least one of the audio files comprises audio data representative of at least one sound generated by smoking at least one of: a cigarette, a cigar, a hookah bowl, a bong, a pipe, a water pipe, a one-hitter, a joint, a blunt, a chillum, a steamroller, and combinations thereof.

5. The electronic vapor device of claim 3, wherein the at least one audio characteristic of at least one sound emitted from the audio output component includes at least one of: a tone, a volume, a pitch, a number of harmonics, a frequency of harmonics, a fade in, a fade out, and combinations thereof.

6. The electronic vapor device of claim 1, wherein the detecting a plurality of status data associated with at least one operational characteristic of the electronic vapor device comprises detecting data associated with at least one of: a positive pressure applied to the first vapor outlet, a negative pressure applied to the first vapor outlet, a length of time that a negative pressure has been applied to the first vapor outlet, an amount of negative pressure that has been applied to the first vapor outlet, a rate at which generated vapor is being expelled from the first vapor outlet, a rate at which vaporizable material is being vaporized by the vaporizing component, a power status of the vaporizing component, a predetermined amount of time since the negative pressure was applied to the first vapor outlet, a predetermined amount of time since the vaporizing component vaporized at least a portion of vaporizable material received therein, and combinations thereof.

7. The electronic vapor device of claim 1, wherein the audio output component is positioned at an end of the housing opposite the first vapor outlet.

8. The electronic vapor device of claim 1, wherein the at least one sensing component is selected from the sensing components consisting of: a flow sensor, a pressure sensor, an electrical sensor, and combinations thereof.

9. The electronic vapor device of claim 1, wherein the device processor is further operable to generate, based on the at least one determined operational status, at least one vaporizing control signal for controlling at least one vaporization parameter of the vaporizing component for vaporizing at least a portion of the vaporizable material received therein.

10. The electronic vapor device of claim 1, further comprising:

at least one light-emitting component positioned at an end of the housing opposite the first vapor outlet, wherein the at least one light-emitting component is operatively coupled to the device processor and controlled in part by the device processor, wherein the at least one light-emitting component is operable to output light therefrom;

wherein the device processor is operable to generate, based on the at least one determined operational status, at least one lighting control signal for controlling at least one of: a power state of the at least one light-emitting component, an illumination state of the at least one light-emitting component, and combinations thereof.

11. The electronic vapor device of claim 1, wherein the device processor is further operable to generate, based on the at least one determined operational status, at least one control signal for controlling an amount of vapor to be provided to the second vapor outlet from the vaporizing component.

12. A method for vaporizing at least one vaporizable material by an electronic vapor device, wherein the electronic vapor device comprises (a) a device processor for controlling the electronic vapor device, (b) at least one container configured to store a vaporizable material; (c) a vaporizing component operable to vaporize a plurality of vaporizable materials received therein, (d) at least one sensing component operable to detect a plurality of status data associated with at least one operational characteristic of the electronic vapor device, (e) a first vapor outlet operable for receiving at least a portion of vapor generated by the vaporizing component and expelling the received vapor from the electronic vapor device in response to a negative pressure applied thereto, (f) a second vapor outlet located opposite the first vapor outlet, wherein the second vapor outlet is operable for receiving at least a portion of vapor generated by the vaporizing component and expelling the received vapor from the electronic vapor device, and (g) an audio output component operable to output a plurality of sounds therefrom, the method comprising:

receiving, by the device processor, at least one command to activate the electronic vapor device;

vaporizing at least a portion of vaporizable material received within the vaporizing component and transferring at least a portion of the generated vapor to the first vapor outlet for expelling generated vapor therefrom;

detecting, by the at least one sensing component, a plurality of status data associated with at least one operating characteristic of the electronic vapor device;

determining, based on at least a portion of the plurality of detected status data, at least one operational status of the electronic vapor device;

generating, based on the at least one determined operational status, at least one audio output control signal for controlling an output parameter of at least one sound of the plurality of sounds;

generating, based on the at least one determined operational status, at least one vapor control signal for controlling an amount of vapor to be provided to the second vapor outlet from the vaporizing component;

outputting at least one sound in accordance with the at least one audio output control signal; and expelling at least a portion of the generated vapor via at least one of the first vapor outlet and the second vapor outlet in accordance with the at least one vapor control signal.

13. The method of claim 12, wherein the at least one audio output control signal controls at least one of: a type of sound emitted from the audio output component, an audio characteristic of a sound emitted from the audio output component, a timing of a sound emitted from the audio output component, and combinations thereof.

14. The method of claim 13, further comprising:

storing a plurality of audio files, wherein each audio file contains audio data representative of at least one sound;

accessing, by the audio output component, audio data contained in at least one of the plurality of audio files and generating, based on at least a portion of the accessed audio data, at least one audio output control signal for controlling at least one of: a type of sound emitted from the audio output component, an audio characteristic of a sound emitted from the audio output component, a timing of a sound emitted from the audio output component, and combinations thereof; and outputting at least one sound in accordance with the at least one audio output control signal.

15. The method of claim 14, wherein the at least one of the plurality of audio files comprises audio data representative of at least one sound generated by smoking at least one of: a cigarette, a cigar, a hookah bowl, a bong, a pipe, a water pipe, a one-hitter, a joint, a blunt, a chillum, a steamroller, and combinations thereof.

16. The method of claim 13, wherein the at least one audio characteristic of at least one sound emitted from the audio output component includes at least one of: a tone, a volume, a pitch, a number of harmonics, a frequency of harmonics, a fade in, a fade out, and combinations thereof.

17. The method of claim 12, wherein the detecting a plurality of status data associated with at least one operational characteristic of the electronic vapor device comprises detecting data associated with at least one of: a positive pressure applied to the first vapor outlet, a negative pressure applied to the first vapor outlet, a length of time that a negative pressure has been applied to the first vapor outlet, an amount of negative pressure that has been applied to the first vapor outlet, a rate at which generated vapor is being expelled from the first vapor outlet, a rate at which vaporizable material is being vaporized by the vaporizing component, a power status of the vaporizing component, a predetermined amount of time since the negative pressure was applied to the first vapor outlet, a predetermined amount of time since the vaporizing component vaporized at least a portion of vaporizable material received therein, and combinations thereof.

18. The method of claim 12, further comprising generating, based on the at least one determined operational status, at least one vaporizing control signal for controlling at least one vaporization parameter of the vaporizing component for vaporizing at least a portion of the vaporizable material received therein.

19. The method of claim 12, wherein the electronic vapor device comprises at least one light-emitting component positioned at an end of the housing opposite the first vapor outlet and operable to output light therefrom, the method further comprising generating, based on the at least one predetermined operational status, at least one lighting control signal for controlling at least one of: a power state of the at least one light-emitting component, an illumination state of the at least one light-emitting component, and combinations thereof.

* * * * *